United States Patent
Jones

(10) Patent No.: US 11,240,967 B2
(45) Date of Patent: *Feb. 8, 2022

(54) CONTROL SYSTEM FOR A CROP PACKAGE ACCUMULATOR AND METHOD OF USING SAME

(71) Applicant: Deere & Company, Moline, IL (US)

(72) Inventor: Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/417,995

(22) Filed: May 21, 2019

(65) Prior Publication Data
US 2020/0367435 A1    Nov. 26, 2020

(51) Int. Cl.
  *A01D 87/12* (2006.01)
  *A01D 90/08* (2006.01)
  *A01D 85/00* (2006.01)

(52) U.S. Cl.
  CPC .......... *A01D 87/125* (2013.01); *A01D 85/005* (2013.01); *A01D 90/08* (2013.01); *A01D 2085/007* (2013.01); *A01D 2090/086* (2013.01)

(58) Field of Classification Search
  CPC .... A01D 87/125; A01D 85/005; A01D 90/08; A01D 2085/007; A01D 2090/086; A01D 2085/008; Y10S 56/15
  See application file for complete search history.

(56) References Cited

U.S. PATENT DOCUMENTS

| | | | | |
|---|---|---|---|---|
| 2,799,129 A | * | 7/1957 | Huntley | A01D 85/005 |
| | | | | 56/473.5 |
| 3,289,821 A | * | 12/1966 | Bosse | B65G 25/08 |
| | | | | 198/744 |

(Continued)

FOREIGN PATENT DOCUMENTS

| | | |
|---|---|---|
| EP | 2974589 A1 | 1/2016 |
| EP | 2974590 A1 | 1/2016 |

(Continued)

OTHER PUBLICATIONS

European Search Report issued in counterpart application No. 20174736.7 dated Oct. 23, 2020 (08 pages).

(Continued)

*Primary Examiner* — Gregory W Adams
(74) *Attorney, Agent, or Firm* — Klintworth & Rozenblat IP LLP

(57) ABSTRACT

A control system and method are provided for accumulating bales processed by an agricultural baler. The accumulator has a base frame and a carriage laterally movable thereon. The control system includes at least one actuator mounted to the frame and configured to move the carriage relative to the frame or to move the carriage in response to a bale engaging an upstanding end of the carriage, at least one sensor configured to detect a position of one or more of the carriage and the at least one actuator relative to the frame, and a controller configured to receive position signals and control the at least one actuator to move at least the carriage relative to the frame to sequentially accumulate multiple bales on the carriage. A crop package receiving area of the carriage has a fixed lateral width during all lateral movement of the carriage.

18 Claims, 26 Drawing Sheets

(56) References Cited

U.S. PATENT DOCUMENTS

| | | | | |
|---|---|---|---|---|
| 3,589,534 | A * | 6/1971 | Brown | A01D 87/122 414/592 |
| 4,075,949 | A * | 2/1978 | Davis | A01G 9/143 104/162 |
| 5,320,213 | A * | 6/1994 | McIntosh | B65G 25/10 198/468.9 |
| 5,829,238 | A * | 11/1998 | Branson | A01D 90/08 56/475 |
| 9,578,811 | B2 | 2/2017 | Kraus et al. | |
| 9,622,420 | B2 | 4/2017 | Kraus et al. | |
| 9,635,814 | B2 | 5/2017 | Kraus | |
| 10,653,067 | B1 * | 5/2020 | Jones | A01D 85/005 |
| 2007/0217893 | A1 | 9/2007 | Parrish | |
| 2012/0328401 | A1 | 12/2012 | Sieben | |
| 2016/0014966 | A1 | 1/2016 | Kraus et al. | |
| 2016/0014967 | A1 | 1/2016 | Kraus et al. | |
| 2016/0014968 | A1 | 1/2016 | Kraus et al. | |
| 2016/0014971 | A1 * | 1/2016 | Kraus | A01F 15/0765 701/50 |
| 2016/0366832 | A1 | 12/2016 | Kraus et al. | |
| 2016/0374269 | A1 | 12/2016 | Jones et al. | |
| 2017/0089363 | A1 | 3/2017 | Jones et al. | |
| 2017/0290266 | A1 | 10/2017 | Jones et al. | |
| 2017/0290267 | A1 | 10/2017 | O'Brien et al. | |
| 2017/0290269 | A1 | 10/2017 | Jones et al. | |
| 2017/0290271 | A1 | 10/2017 | Jones et al. | |
| 2018/0020621 | A1 * | 1/2018 | Jones | A01F 15/0883 56/341 |
| 2018/0352745 | A1 | 12/2018 | Lynch | |
| 2020/0367435 | A1 * | 11/2020 | Jones | A01F 15/0883 |

FOREIGN PATENT DOCUMENTS

| | | | |
|---|---|---|---|
| EP | 20150176518 A1 | 1/2016 | |
| EP | 3231274 A1 | 10/2017 | |
| EP | 3461324 A1 | 4/2019 | |
| FR | 2679410 A1 * | 1/1993 | A01D 85/005 |
| FR | 2679410 A1 | 1/1993 | |

OTHER PUBLICATIONS

European Search Report issued in counterpart application No. 20175466.0 dated Oct. 29, 2020 (07 pages).

* cited by examiner

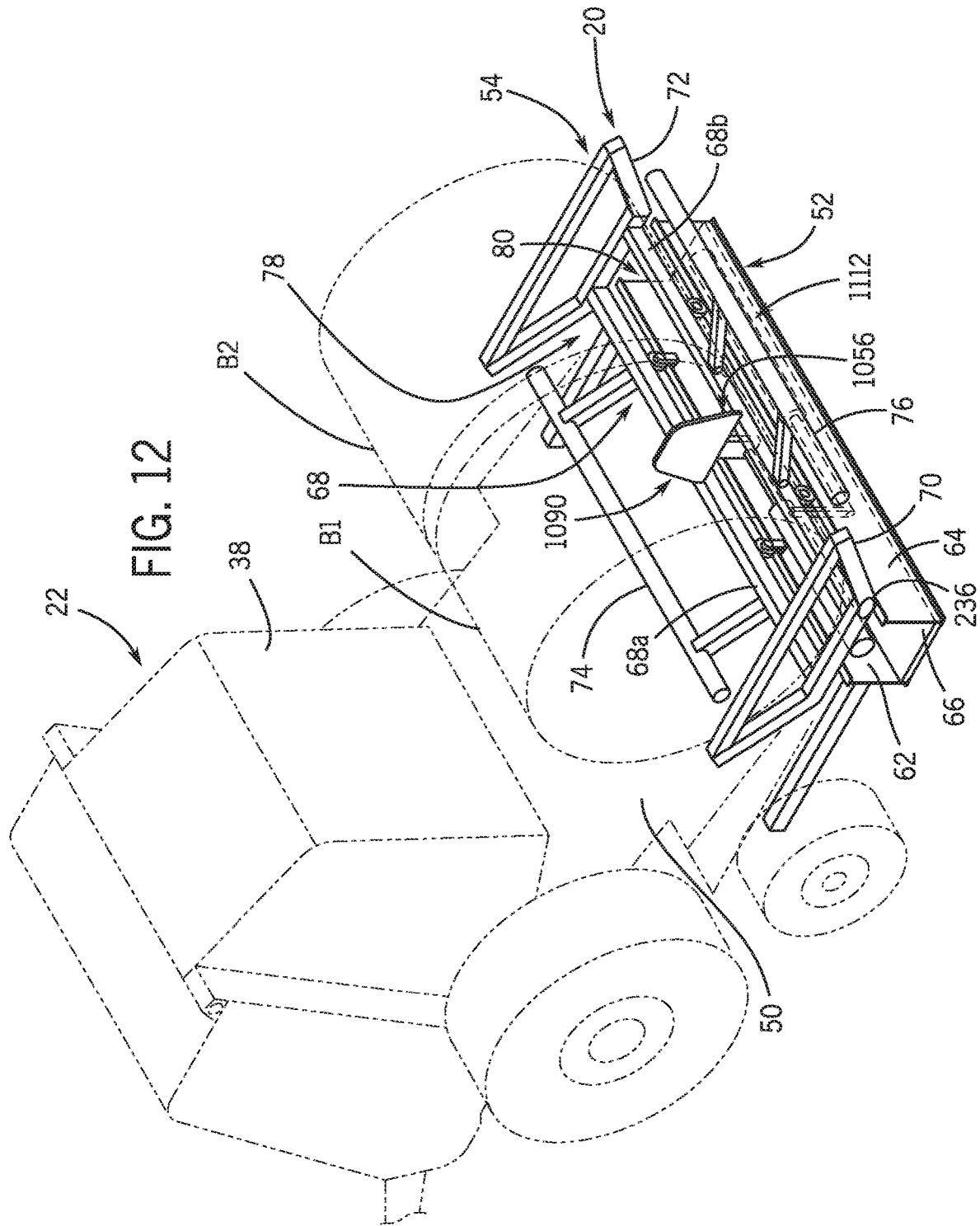

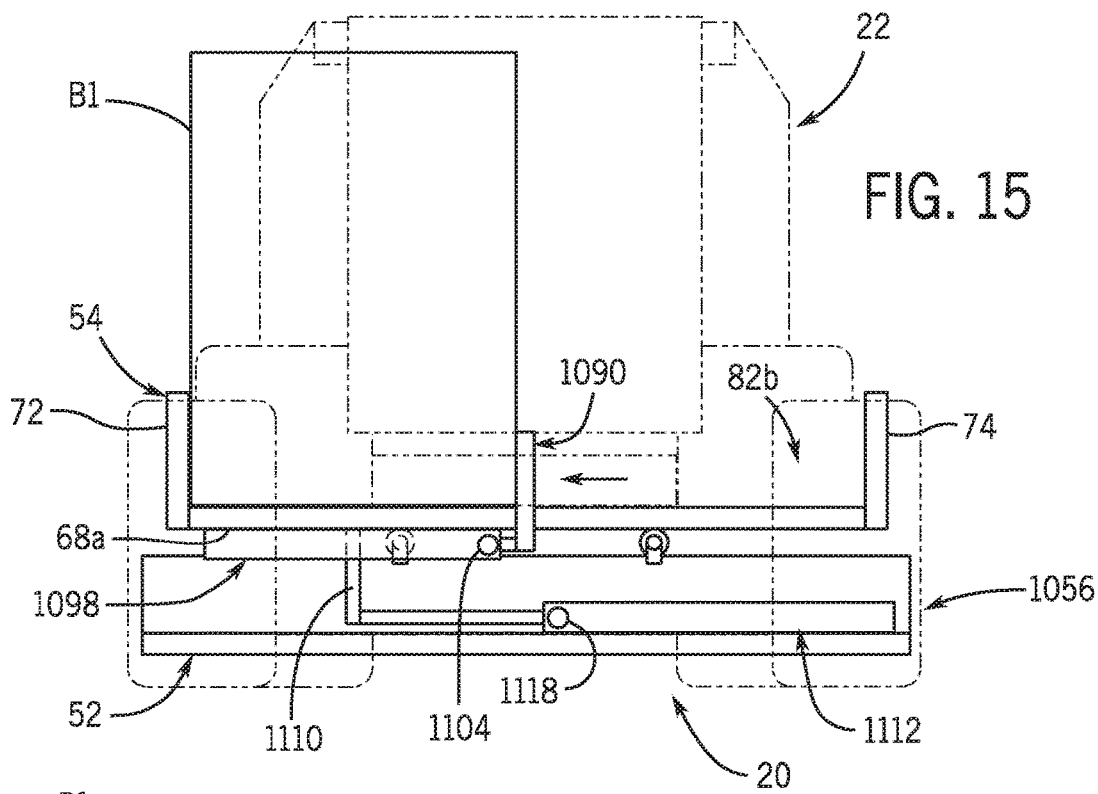
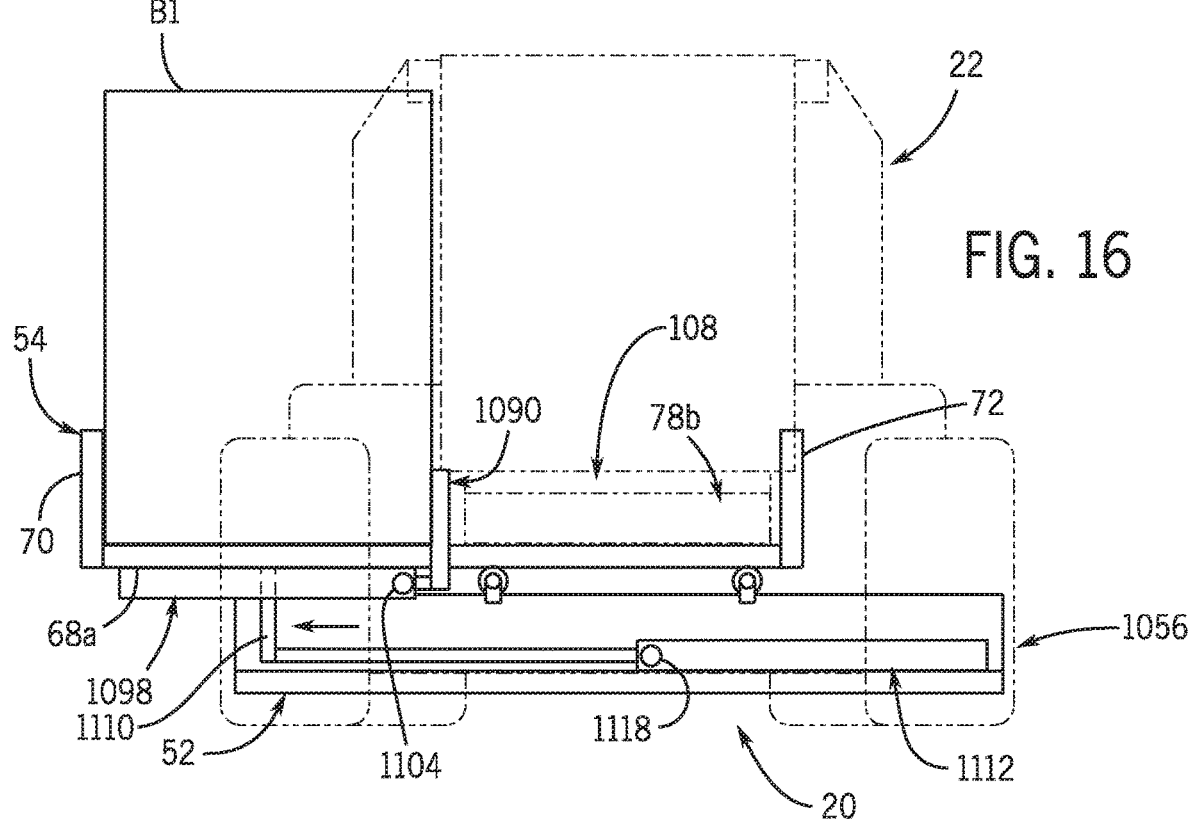

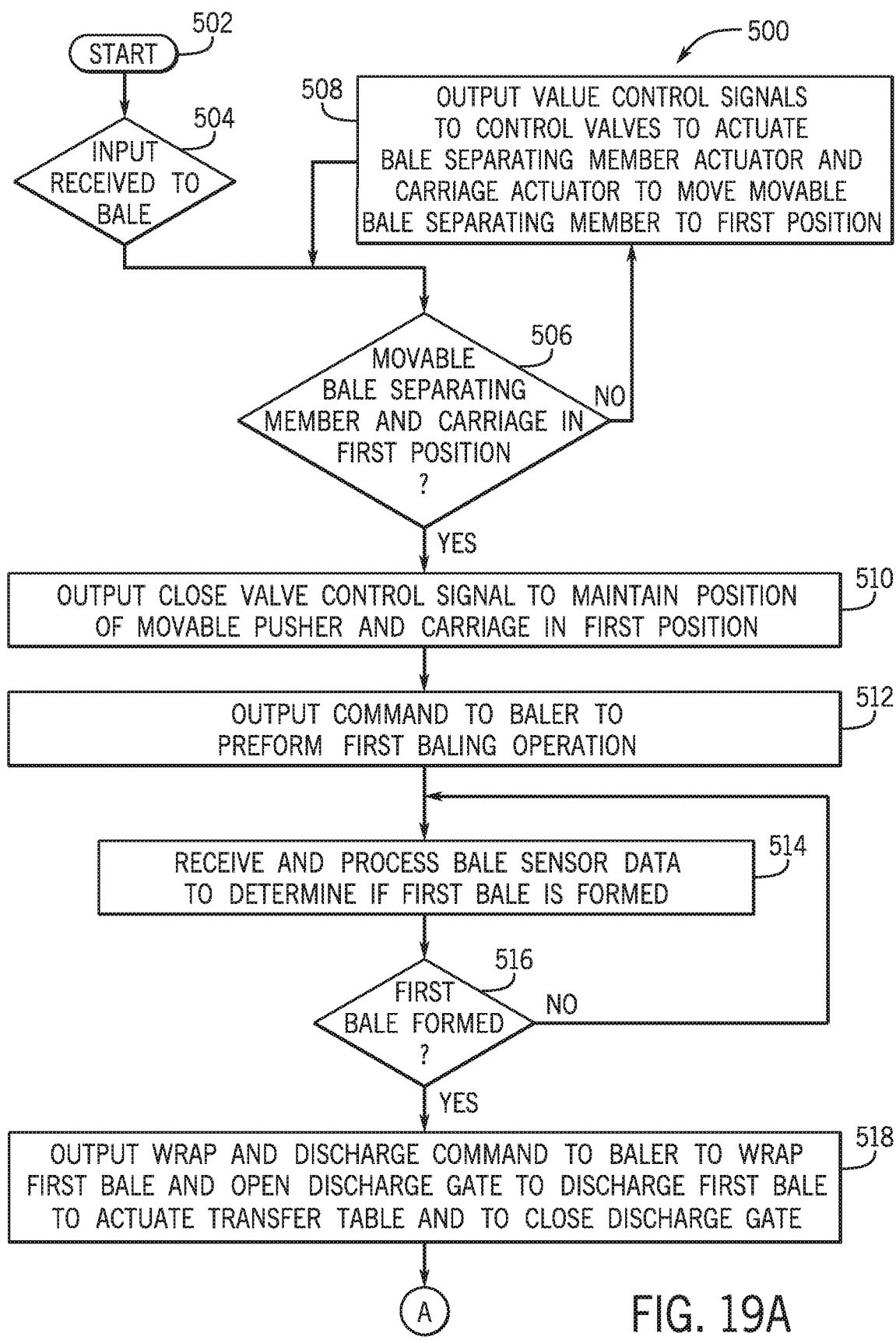

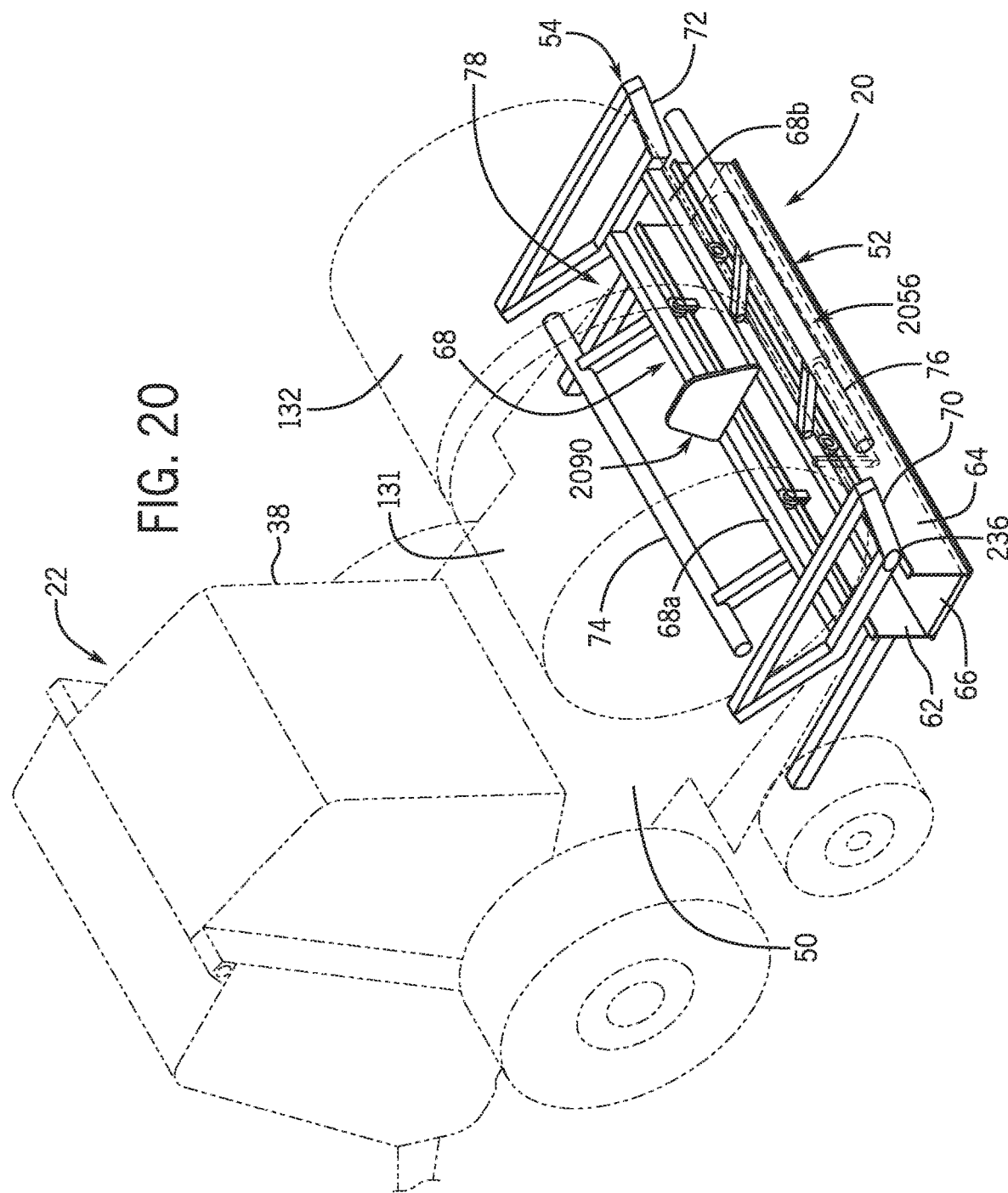

CONTROL SYSTEM FOR A CROP PACKAGE ACCUMULATOR AND METHOD OF USING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The present disclosure relates generally to a control system for a crop package accumulator for an agricultural baler, and a method of using same.

BACKGROUND OF THE DISCLOSURE

A cut and raked crop that has been dried or otherwise prepared in a field, such as hay, straw or other agricultural material is often gathered, compressed and shaped into a cylindrical crop package, commonly called bales, by an agricultural baler. The bales can be bound with netting, strapping, wire by the baler. Bales are formed by the baler in a series of processes including lifting crop material from a field, hereinafter referred to as hay, by way of a pickup portion of the baler. The hay is then moved into a chamber of the baler in which the hay is cut and compressed. Once a predetermined amount of hay has been gathered in the chamber, the hay is bound by the baler to form a bale. The bales can be bound with netting, strapping, wire by the baler. The bale is then moved out of the rear of the baler and loaded onto a bale accumulator.

Variable-chamber balers typically produce bales from 48 to 72 inches in diameter and up to approximately 62 inches in width. The bales can weigh from 1,000 to 2,220 pounds, depending upon size, material, and moisture content. The accumulator may carry one or more bales thereon while the baling operation is underway. When the accumulator is full, it is common to dump the multiple harvested bales in that location, thereby potentially reducing the travel time and field impact required to collect the deposited bales. However, configuring and controlling the accumulator in cooperation with the baler and tractor to effectively and efficiently form, collect, manipulate, and transport multiple bales may be challenging.

SUMMARY OF THE DISCLOSURE

The disclosure provides a control system for accumulating bales processed by an agricultural baler. The accumulator has a base frame and a carriage laterally movable on the base frame. The control system includes at least one actuator mounted to the base frame and configured to move the carriage relative to the base frame or to move the carriage in response to a bale engaging an upstanding end of the carriage, at least one sensor configured to detect a position of one or more of the carriage and the at least one actuator relative to the base frame, and a controller, having a processor and memory architecture, configured to receive position signals from the at least one sensor and control the at least one actuator based on the received position signals to move at least the carriage in the lateral direction relative to the base frame to sequentially accumulate multiple bales on the carriage. A crop package receiving area of the carriage has a fixed lateral width during all movement of the carriage relative to the base frame.

In another aspect, the disclosure provides a method for sequentially accumulating multiple bales processed by an agricultural baler on an accumulator. The method includes sensing, by a controller receiving position signals from at least one sensor, a position of one or more of a carriage and a bale separating member relative to a base frame, the carriage being laterally movable relative to the base frame, the carriage having a platform and first and second upstanding side walls defining a crop package receiving area therebetween, the bale separating member extending into the crop package receiving area; actuating, by the controller after processing the received position signals, one or more actuators to move one or more of the bale separating member and the carriage relative to the base frame into position to accept a first bale from the baler with the bale separating member positioned outside of a first bale receiving area of the crop package carrying area; and actuating, by the controller after processing the received position signals, the one or more actuators to move the bale separating member and the carriage relative to the base frame into a position to accept a second bale from the baler in a second bale receiving area of the crop package carrying area with the bale separating member and the first bale outside of the second bale receiving area, wherein the crop package receiving area has a fixed lateral width during all movement of the carriage relative to the base frame.

In yet another aspect, the disclosure provides a method for sequentially accumulating multiple bales processed by an agricultural baler on an accumulator. The method includes sensing, by a controller receiving position signals from at least one sensor, a position of one or more of a carriage and at least one actuator relative to a base frame, the carriage being laterally movable relative to the base frame, the carriage having a platform and first and second upstanding side walls defining a crop package receiving area therebetween; actuating, by the controller after processing the received position signals, one or more actuators to move the carriage relative to the base frame into position to accept a first bale from the baler; and actuating, by the controller after processing the received position signals, the one or more actuators to move the carriage relative to the base frame into a position to accept a second bale from the baler, wherein the crop package receiving area has a fixed lateral width during all movement of the carriage relative to the base frame.

The details of one or more embodiments are set forth in the accompanying drawings and the description below. Other features and advantages will become apparent from the description, the drawings, and the claims.

BRIEF DESCRIPTION OF THE DRAWINGS

FIG. 12 is a perspective view of the accumulator having an actuating mechanism thereon in accordance with a second embodiment, with the baler and bales shown in phantom lines;

FIGS. 13-18 are rear elevation views showing example positions of the accumulator having the actuating mechanism of FIG. 12 during use;

FIGS. 19A and 19B show a flowchart having example steps for use of the accumulator having the actuating mechanism of FIG. 12;

FIG. 20 is a perspective view of the accumulator having an actuating mechanism thereon in accordance with a third embodiment, with the baler and bales shown in phantom lines;

Like reference symbols in the various drawings indicate like elements.

DETAILED DESCRIPTION

Figure 1:
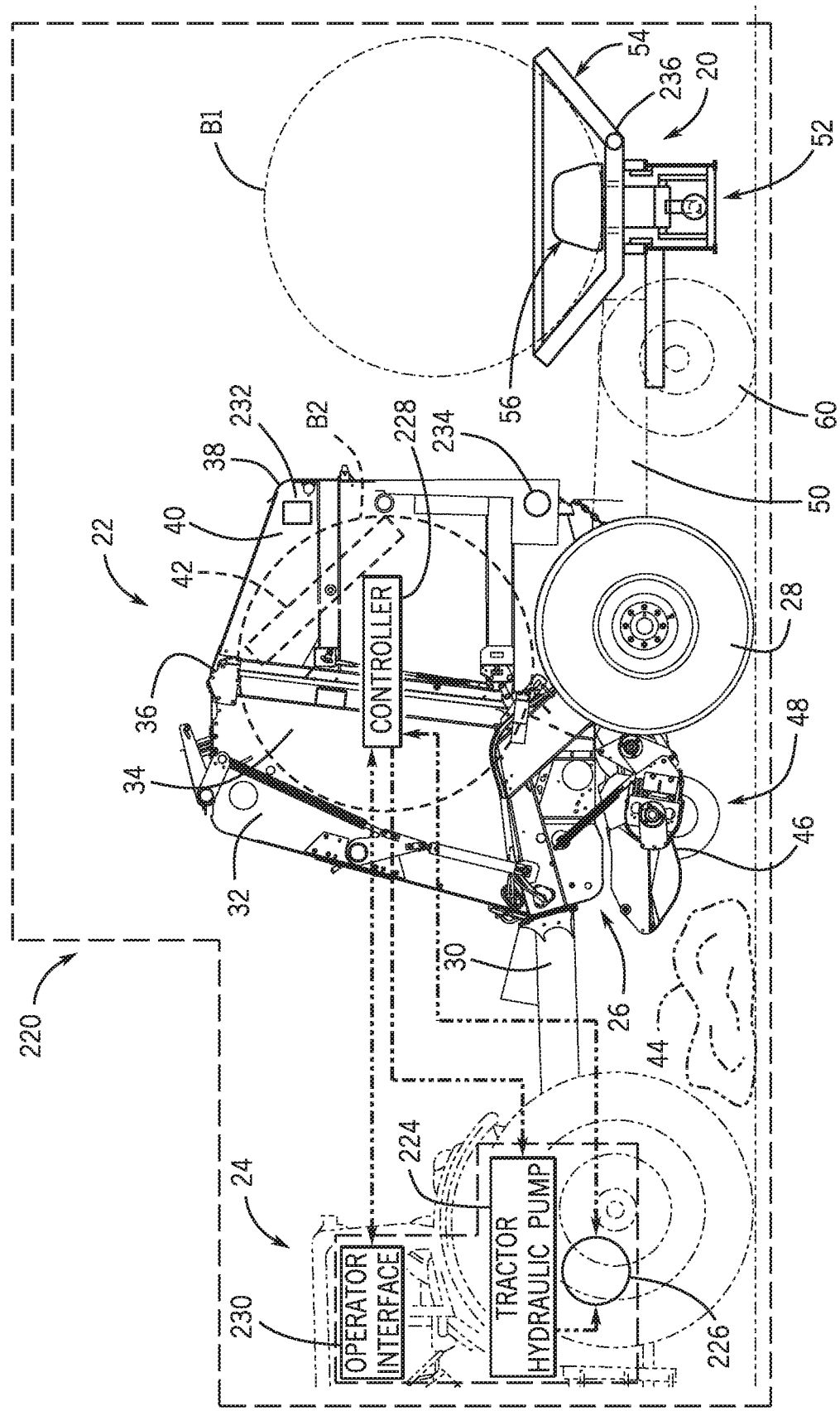
FIG. 1 is a plan view of an example agricultural equipment train that includes a tractor, an agricultural baler and a crop package accumulator in which this disclosure may be incorporated with the discharge gate of the baler being in a closed position.

The following describes one or more example embodiments of the disclosed method and system for accumulating bales on an accumulator, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

The following describes one or more example implementations of the disclosed system for a control system for a crop accumulator and a method of using same. The control system and method are used to accumulate at least two bales on an accumulator which is discharged from a baler that is, in turn, towed behind a tractor.

The accumulator has a fixed lateral width carriage laterally movably mounted on a base frame such that the entire carriage moves transverse to a direction of travel across a field of the accumulator. In an embodiment, a first bale can be formed by the baler, deposited onto the carriage, the carriage moved relative to the base frame, a second bale can be formed by the baler, and then deposited onto the carriage. In an embodiment, a bale separating member, which is movable relative to the carriage, moves the first bale relative to the base frame and then causes movement of the carriage relative to the base frame. In an embodiment, both the carriage and the bale separating member are actuated to cause movement of the first bale relative to the base frame. In an embodiment, the bale separating member is affixed to the carriage, and only the carriage is moved relative to the base frame. In an embodiment, the bale separating member is eliminated and only the carriage is moved relative to the base frame.

In some embodiments, the present disclosure provides for an accumulator which can align the center of gravity of the bales loaded onto the accumulator with the center of gravity of the baler. In some embodiments, if a situation arises wherein the accumulator is traversing an inclined surface, the carriage can be moved off center from the baler so that the center of gravity of the loaded accumulator aligns with the inclined surface.

Figure 2:
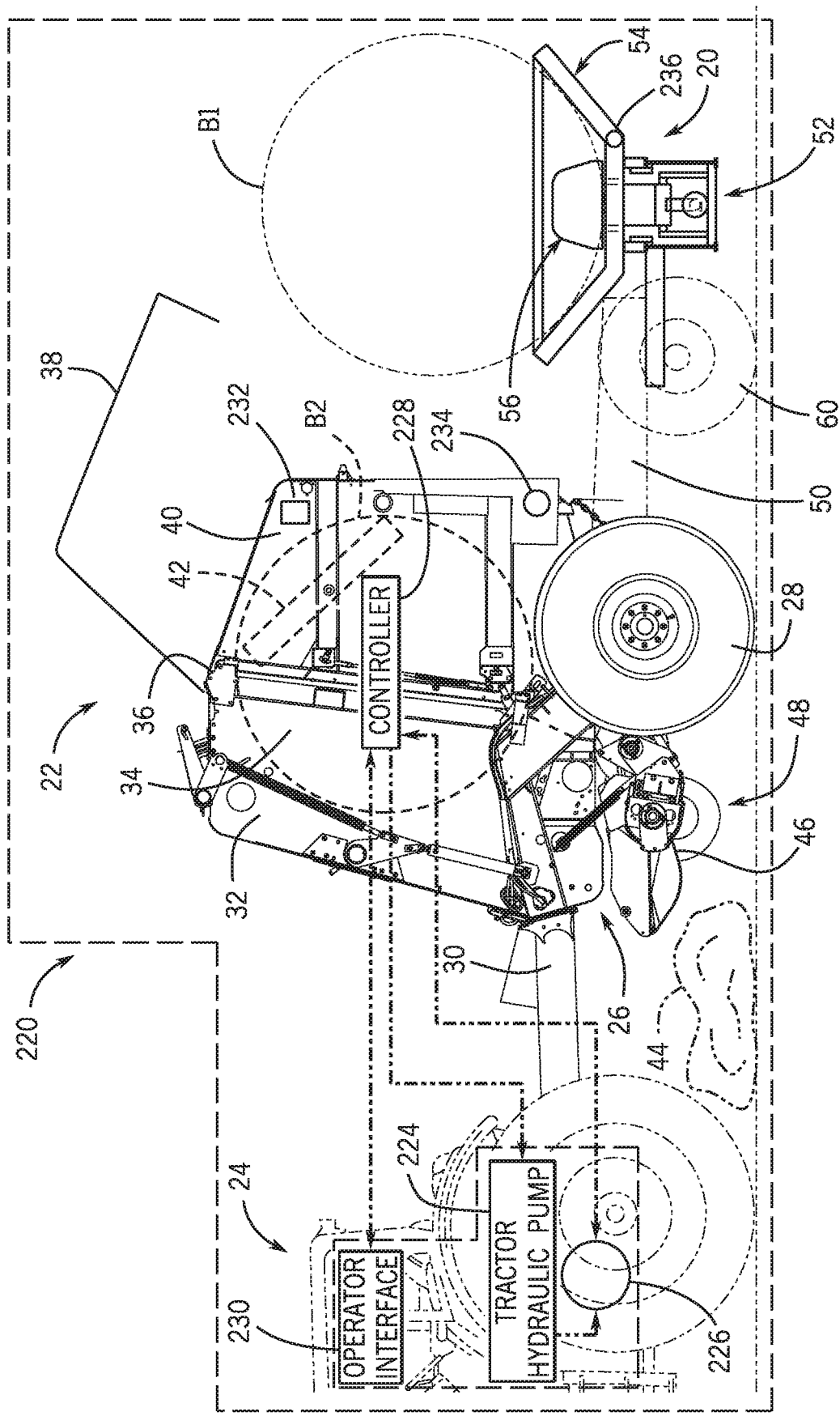
FIG. 2 is a plan view of the example agricultural equipment train of FIG. 1 with the discharge gate of the baler being in an open position.

As noted above, with reference to FIGS. 1 and 2, an accumulator 20 described herein may be employed with respect to a variety of crop-packaging devices, such as a baler 22. The baler 22 may be configured to be towed by a tractor 24 in a direction of travel across a field, or the baler 22 may be self-propelled in a direction of travel across a field. The accumulator 20 is towed by the baler 22. Collectively, the baler 22 and accumulator 20 (and the tractor 24 if provided) may be considered an agricultural equipment train 10. As described in greater detail below, various components of the accumulator 20 and the baler 22 (and the tractor 24 if provided) may cooperate to form an accumulation control system 220 for efficiently selectively forming a first bale B1 in the baler 22; discharging the first bale B1 from the baler 22; collecting the first bale B1 on the accumulator 20; forming a second bale B2 in the baler 22; discharging the second bale B2 from the baler 22; collecting the second bale B2 on the accumulator 20; and preparing the bales B1, B2 for transport on the accumulator 20 and subsequent deposition on the ground. In the view of FIGS. 1 and 2, the first bale B1 has been formed and positioned on the accumulator 20 and the second bale B2 is being formed in the baler 22. Additional details about the accumulation control system 220 will be provided below after a brief description of the associated elements of the baler 22 and the accumulator 20, and of the tractor 24 if provided).

If the tractor 24 if used, any suitable work machine tractor 24 may be used to pull the baler 22 and accumulator 20. Generally, the tractor 24 includes an engine (not shown) and driveline (not shown) to propel the tractor 24.

The tractor 24 or the baler 22 may further include a human-machine or operator interface 230 to enable an operator to interact with the elements of the accumulation control system 220 and other aspects of the agricultural equipment train 10. Although the operator interface 230 is depicted as being associated with the tractor 24 or the baler 22, the operator interface 230 may be positioned on the accumulator 20, and/or remote from the equipment train 10. In one example, the operator interface 230 may be disposed inside a cab of the tractor 24 for easy access by the operator. The operator interface 230 may be configured in a variety of ways. In some embodiments, the operator interface 230 may include one or more joysticks, various switches or levers, one or more buttons, a touchscreen interface that may be overlaid on a display, a keyboard, a speaker, a microphone associated with a speech recognition system, or various other human-machine interface devices.

The baler 22 may have a main frame 26 supported on a pair of ground wheels 28. In an embodiment where the baler 22 is towed by the tractor 24, the main frame 26 includes a draft tongue 30 extending in a forward direction to a forward end defined by a clevis arrangement (not shown) adapted for being coupled to a drawbar (not shown) of the tractor 24. A pair of upright side walls 32 may be fixed to the main frame 26 to define forward regions of opposite side walls of a bale forming chamber 34. Mounted for pivoting vertically about a horizontal pivot arrangement 36 located at an upper rear location of the side walls 32 is a discharge gate 38 including opposite upright side walls 40, which define opposite sides of a rear region of the bale forming chamber 34. The discharge gate 38 is coupled to a rear end of the main frame 26. One or more gate hydraulic cylinders 42 may be coupled between the main frame 26 and the opposite side walls 40 of the discharge gate 38 and are selectively operable for moving the discharge gate 38 between a lowered baling position and an opened discharge position. It is understood that while one hydraulic cylinder is shown, two or more hydraulic cylinders may be used to open and close the discharge gate 38. The baler 22 as shown is of a variable chamber design and thus comprises a plurality of longitudinally extending side-by-side belts (not shown) supported on a plurality of rollers (not shown). At least one of the rollers is driven, via a chain drive coupled to a motor or other arrangement, to drive the belts about the bale forming chamber 34.

The tractor 24 and/or the baler 22 includes one or more driven pumps 224. Flow from the pumps 224 may be routed through various control valves 226 and various conduits (e.g., flexible hoses and lines) to control various components. Flow from the pumps 224 may also power various other components of the baler 22, the accumulator 20, and the tractor 24 (if provided). In some embodiments, various sensors (e.g., pressure, flow or other sensors) may be disposed near the pumps 224 and control valves 226.

The baler 22 may also include one or more controllers 228, such as electronic controller unit (ECU), to control various aspects of the baler 22, as well as characteristics of the tractor 24 (if provided) and/or accumulator 20. In other embodiments, the controller 228 may be implemented on the tractor 24, the accumulator 20, or a remote device, or the controller 228 may be distributed across the tractor 24, baler 22, and/or accumulator 20. Generally, the controller 228 may be configured as computing devices with associated processor devices and memory architectures, as hydraulic, electrical or electro-hydraulic controllers, or otherwise. As such, the controller 228 may be configured to execute various computational and control functionality with respect to the baler 22 (and other machinery). The controller 228 may be in electronic, hydraulic, or other communication with various other systems or devices of the baler 22, as well as the tractor 24 (if provided) and accumulator 20. For example, the controller 228 may be in electronic or hydraulic communication with various actuators, sensors, and other devices within (or outside of) the baler 22, including various devices associated with the bale forming chamber 34 and related mechanisms. The controller 228 may communicate with other systems or devices (including other controllers) in various known ways, including via a CAN bus (not shown) of the baler 22, the accumulator 20, or the tractor 24 (if provided) (e.g., control valves 226), via wireless or hydraulic communication means, or otherwise. Additionally, one or more electro-hydraulic control valves (not shown) may be a part of a baler hydraulic system and interposed in hydraulic lines connecting the gate hydraulic cylinders 42 with a hydraulic supply associated with the accumulator 20. The electro-hydraulic control valve may be electrically activated according to signals from the controller 228 and may be configured to control the flow of hydraulic fluid between the hydraulic supply, the gate hydraulic cylinders 42 and various components of the accumulator 20. Moreover, the one or more hydraulic pumps 224 and the one or more control valves 226 described above, along with various lines, hoses, conduits, define a hydraulic circuit that supplies hydraulic fluid to the hydraulic cylinders 42 based on one or more control signals from the controller 228. In some embodiments, the controller 228 may be configured to receive input commands and to interface with an operator via the human-machine interface or operator interface 230.

In its general operation, the baler 22 traverses through a field. Crop material 44 is fed into a crop inlet 46 of the bale forming chamber 34 from a windrow of crop on the ground by a pickup 48. In the bale forming chamber 34, the crop material 44 is rolled in spiral fashion into cylindrical bales B1, B2. In this example, the baler 22 illustrated is a variable chamber design wherein crop is rolled up in a spiral fashion in a nip formed between oppositely moving adjacent loops of belts. The space between adjacent loops of belts grows as the forming bale B1 or B2 grows larger. Upon completion, the bale B1 or B2 is discharged by actuation of the gate hydraulic cylinders 42 that open the discharge gate 38 permitting the completed bale B1 or B2 to be discharged from the baler 22 onto the accumulator 20. As noted above, in the view of FIG. 1, the first bale B1 is positioned on the accumulator 20 and the second bale B2 is being formed in the baler 22. Various sensors 232 may also be disposed on or near the baler 22 in order to measure parameters, such as to determine when a bale B1 or B2 within the bale forming chamber 34 is fully formed (for example by measuring the diameter), and so on. Additionally, a gate sensor 234 is in communication with the controller 228 of the baler 22 which detects a position of the discharge gate 38, to detect whether the discharge gate 38 is opening or closing, or to detect whether the discharge gate 38 is opening or closing.

The accumulator 20 includes a transfer mechanism 50, a base frame 52 coupled to the transfer mechanism 50, a fixed-width carriage 54 which is laterally movably mounted on the base frame 52 by an actuating mechanism 56, 1056, 2056, 3056. The base frame 52 remains laterally stationary during the movement of the carriage 54 relative to the baler 22. The transfer mechanism 50 may take the form of a table, a tilting ramp and the like. Bales B1, B2 are accumulated on the carriage 54 as described herein. As described in greater detail below, the actuating mechanism 56, 1056, 2056, 3056 may be implemented in a number of ways. In various embodiments, the transfer mechanism 50 comprises the platform described in U.S. Pat. No. 9,622,420.

The accumulator 20 is coupled to the baler 22 for movement with the baler 22 as the baler 22. As will be discussed, the accumulator 20 receives the bales B1, B2 that are discharged by the discharge gate 38. The base frame 52 is towed directly behind the baler 22, and the transfer mechanism 50 guides the bales B1, B2 from the discharge gate 38 of the baler 22 onto the carriage 54. The base frame 52 is configured as a rigid metal frame. The base frame 52 is flexibly or rigidly coupled to the baler 22 and is at least partially supported on at least one pair of ground wheels 60.

Figure 3:
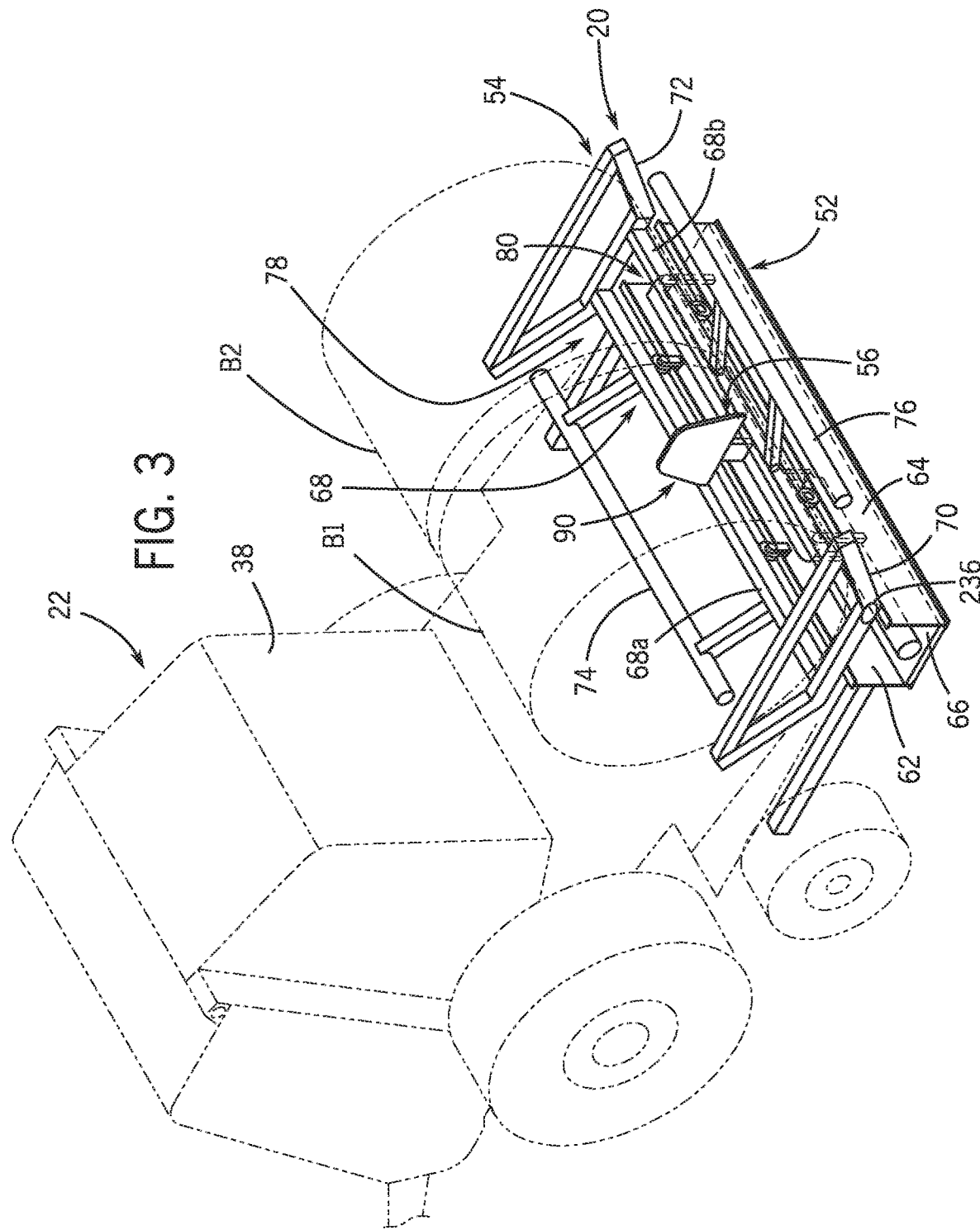
FIG. 3 is a perspective view of the accumulator having an actuating mechanism thereon in accordance with a first embodiment, with the baler and bales shown in phantom lines.

Initially referring to FIG. 3, the base frame 52 has front and rear upright flanges 62, 64 and an intermediate web 66 extending between the upright flanges 62, 64. In an embodiment, the base frame 52 is formed of an I-beam. The base frame 52 is mounted in a behind the baler 22. The base frame 52 may be in a fixed orientation relative to the baler 22, or may be flexibly mounted behind the baler 22 such as for example by a ball joint which allows for some movement of the base frame 52 relative to the baler 22. The flanges 62, 64 extend horizontally and in a direction that is substantially perpendicular to the direction of travel of the accumulator 20. The base frame 52 has a width W1 which is defined between ends 52.1, 52.2 thereof. In some embodiments, the width W1 is the same as, or less than the width W2 of the baler 22 which is defined between sides 22.1, 22.2 of the baler 22. In some embodiments, the width W1 is the greater than the width W2 of the baler 22.

The carriage 54 is configured as a rigid metal frame. The carriage 54 includes a platform 68, a left upright side wall 70 (when viewed from the rear of the accumulator 20) at a left side of the platform 68, a right upright side wall 72 (when viewed from the rear of the accumulator 20) at a right side of the platform 68, a front rail 74 extending between front ends of the side walls 70, 72, and a rear rail 76 extending between rear ends of the side walls 70, 72 to form a crop package carrying area 78 in the form of a trough that naturally retains the bales B1, B2 in the carriage 54 during transport through the field. The platform 68 includes a front rail or plate 68a extending between the side walls 70, 72 and a rear rail or plate 68b extending between the side walls 70, 72 on which bales B1 and B2 will sit, and an elongated slot 80 extending between the side walls 70, 72 and between the front and rear rails 68a, 68b. The rails 68a, 68b and slot 80 extend horizontally and in a direction that is perpendicular or substantially perpendicular to the direction of travel of the accumulator 20. The crop package carrying area 78 supports the bales B1, B2 received from the bale forming chamber 34. The front rail 74 may be designed to rotate or move out of the way when the bales B1, B2 are deposited into the crop package carrying area 78, and the rear rail 76 may be designed to rotate or move out of the way when the bales B1, B2 are dumped out of the crop package carrying area 78. In an embodiment, the crop package carrying area 78 defines a width W4 which is slightly larger than the width of two bales B1, B2. The carriage 54 has a fixed lateral width such that the width W4 is fixed, that is, the width W4 remains constant during all movements of the carriage 54.

The carriage 54 has a predetermined width W3 defined at the outermost sides 70.1, 72.1 of the side walls 70, 72 such that the crop package carrying area 78 has a fixed dimension between the side walls 70, 72. In some embodiments, the width W3 of the carriage 54 is the same as, or less than the width W2 of the baler 22. In other embodiments, the width W3 of the carriage 54 is the greater than the width W2 of the baler 22.

The entire carriage 54 is laterally slidable relative to the base frame 52 parallel to a first direction 84 and a second direction 86 along a lateral axis which is transverse to the direction of travel. It is to be understood that the use of the term "transverse" means within a range of angles relative to 90 degrees, such as for example 85 degrees to 105 degrees. In an embodiment, wheels 88, slide pads, bearing and like are provided on lower surfaces of the rails 68a, 68b of the carriage 54 which ride along upper surfaces of the flanges 62, 64 of the base frame 52.

The bale B1 or B2 is discharged from the discharge gate 38 of the baler 22 and the transfer mechanism 50 transfers the bale B1 or B2 onto the carriage 54 and into the crop package carrying area 78 as described herein.

In FIGS. 3-9, a first embodiment of the actuating mechanism 56 for use with the accumulation control system 220 is shown. The actuating mechanism 56 includes a bale separating member 90 coupled to a bale separating member actuator 92. The front and rear rails 74, 76 are not shown in FIGS. 4-9 for clarity.

The bale separating member 90 includes a lower flange 94 coupled to an upper flange 96. The lower flange 94 extends through the slot 80 in the platform 68 of the carriage 54, and is fixedly coupled to the bale separating member actuator 92 which is mounted on an upper surface of the web 66 of the base frame 52. The upper flange 96 extends upwardly from the platform 68 to divide the crop package carrying area 78 into first and second bale receiving areas 78a, 78b. The bale separating member 90 can be laterally slid relative to the carriage 54 by the bale separating member actuator 92 in the directions 84, 86. In an embodiment, the crop package carrying area 78 defines a width which is slightly larger than the width of two bales B1, B2 and a width of the bale separating member 90.

In an embodiment, the bale separating member actuator 92 includes a hydraulic cylinder 98 which is attached to an endless loop 100 around sprockets 102 that are rotatably mounted to the web 66 of the base frame 52. In an embodiment, the hydraulic cylinder 98 has an extendable and retractable piston rod 98a mounted in a housing 98b. The endless loop 100 may be formed of a roller chain, a cable, a rope, or the like. The lower flange 94 of the bale separating member 90 is fixedly attached to the endless loop 100 between the sprockets 102. The hydraulic cylinder 98 is fluidly coupled to the hydraulic system of the baler 22 and/or the tractor 24 (if a tractor 24 is provided). For example, the bale separating member actuator 92 may include one or more hydraulic lines that connect the hydraulic cylinder 98 with the hydraulic supply, including the control valves 226 and hydraulic pumps 224. One or more electro-hydraulic control valves of the hydraulic system of the baler 22 may be in fluid communication with the bale separating member actuator 92 and electrically activated according to signals from the controller 228, as an example, to control the flow of hydraulic fluid between the hydraulic supply and the hydraulic cylinder 98. The hydraulic cylinder 98 is responsive to the hydraulic fluid received from the hydraulic system to move the bale separating member 90. In an embodiment, the bale separating member actuator 92 includes a worm gear or a rack and pinion system which is attached to the endless loop 100. Extension of the bale separating member actuator 92 moves the endless loop 100 in the first direction 84, which moves the bale separating member 90 in the first direction 84 and toward the left side wall 70. Retraction of the bale separating member actuator 92 moves the endless loop 100 in the second direction 86, which moves the bale separating member 90 in the second direction 86 and toward the right side wall 72. Other actuating mechanisms are within the scope of the present disclosure, provided movement of the bale separating member 90 relative to the carriage 54 and the base frame 52 is provided.

Sensor(s) 104 are provided on the bale separating member actuator 92 or on the carriage 54 which sense the position of the bale separating member 90 relative to the carriage 54 or the carriage 54 relative to the base frame 52. These sensor(s) 104 can trigger movement of subsequent mechanisms or simply provide feedback to the controller 228 for information or diagnostics.

Operation of the accumulator 20 is now described with regard to the accumulator 20 receiving two bales B1 and B2. For ease in description, the positioning of the bale separating member 90 is described to that shown in FIGS. 3-8.

Figure 4:
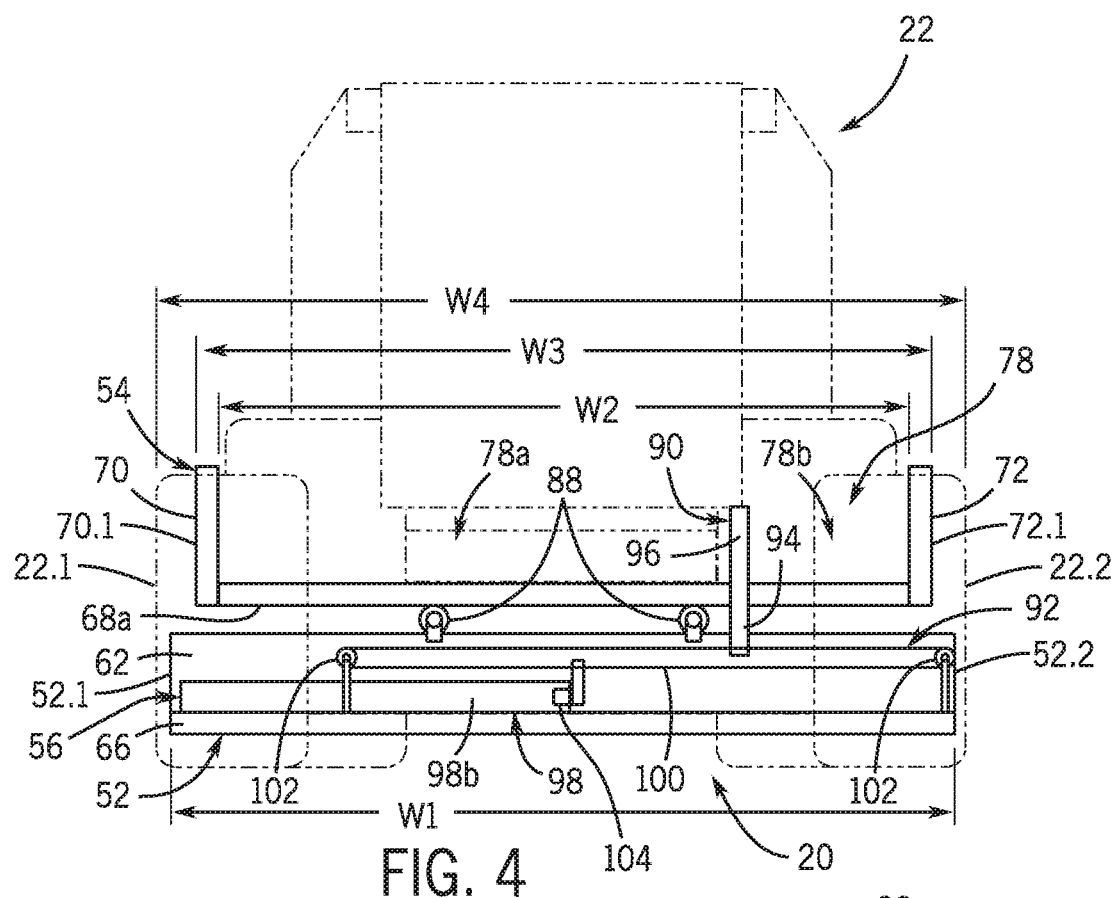
FIGS. 4-9 are rear elevation views showing example positions of the accumulator having the actuating mechanism of FIG. 3 during use.
Figure 5:
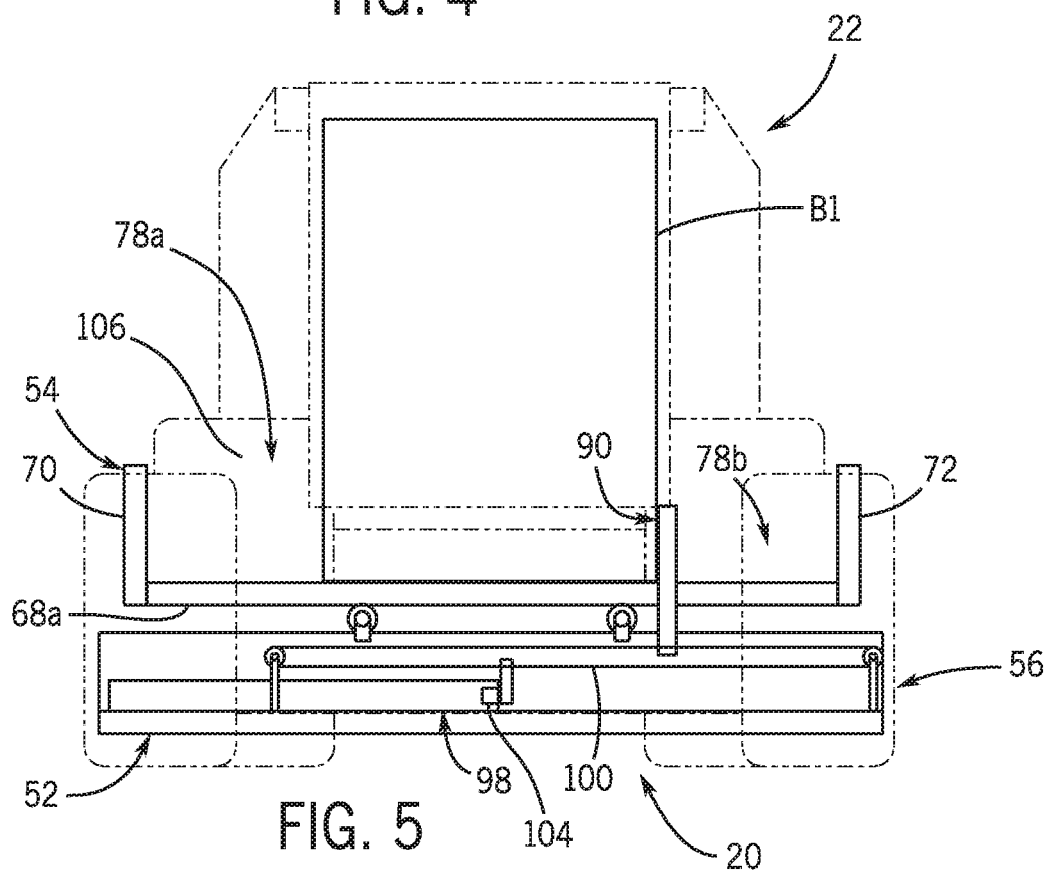

Initially, as shown in FIG. 4, the bale separating member 90 and the carriage 54 are positioned a first position relative to the base frame 52 such that the bale separating member 90 is positioned off to one side of the discharge gate 38 such that the crop package carrying area 78 is partitioned into the first and second bale receiving areas 78a, 78b. As such, in the first position, the bale separating member 90 is positioned to the right of the center of the carriage 54 as shown in FIG. 4. The sensor(s) 104 sense the position of the bale separating member 90 relative to the carriage 54. If the bale separating member 90 is not in the first position, then the bale separating member actuator 92 is actuated to move the bale separating member 90 until the bale separating member 90 is in the first position.

The baler 22 forms a first bale B1 in a manner known in the art, the discharge gate 38 is opened, the front rail 74 is moved downward, and the first bale B1 is transferred into the first bale receiving area 78a by the transfer mechanism 50. Once the bale B1 is clear of the discharge gate 38, the discharge gate 38 is closed and the baler 22 commences forming a second bale B2 in the bale forming chamber 34. The first bale B1 is deposited onto the carriage 54 into the first bale receiving area 78a, see FIG. 5, which is proximate to the left side of the bale separating member 90, and thereafter the front rail 74 is moved upward. A space 106 having a width which is equal to approximately half of the width of the first bale B1 is formed in the first bale receiving area 78a and is provided between the left end of the first bale B1 and the left side wall 70 of the carriage 54.

Figure 6:
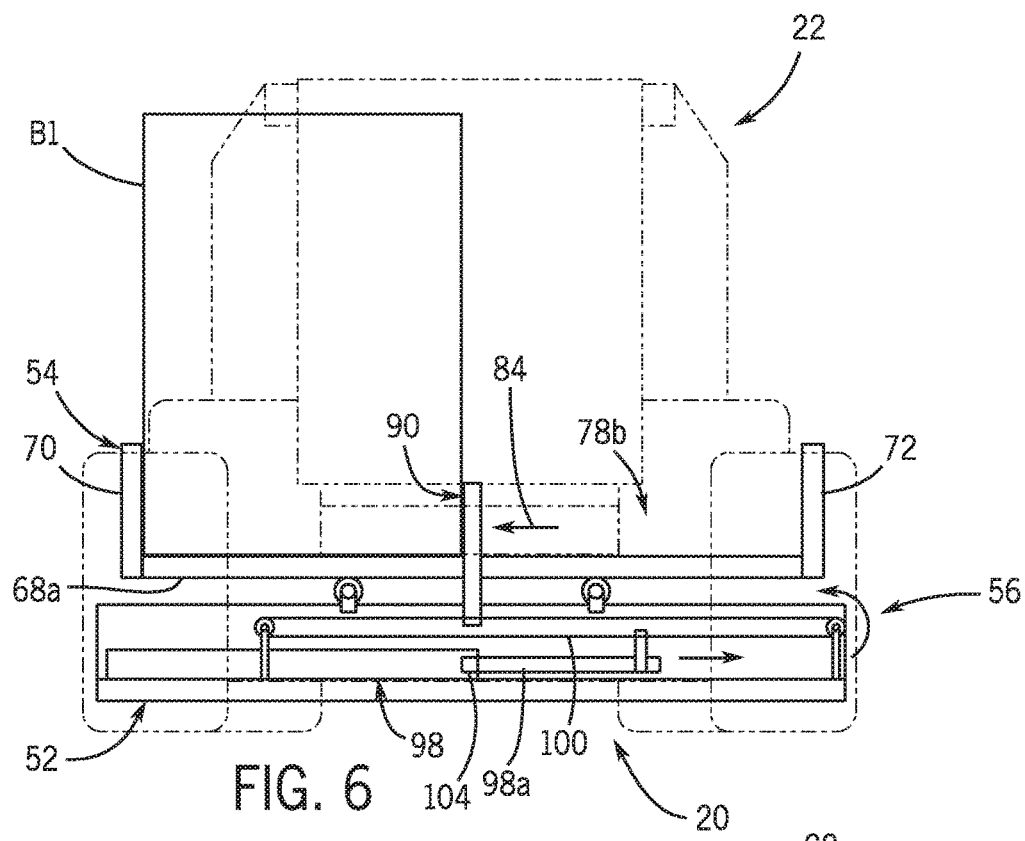
Figure 7:
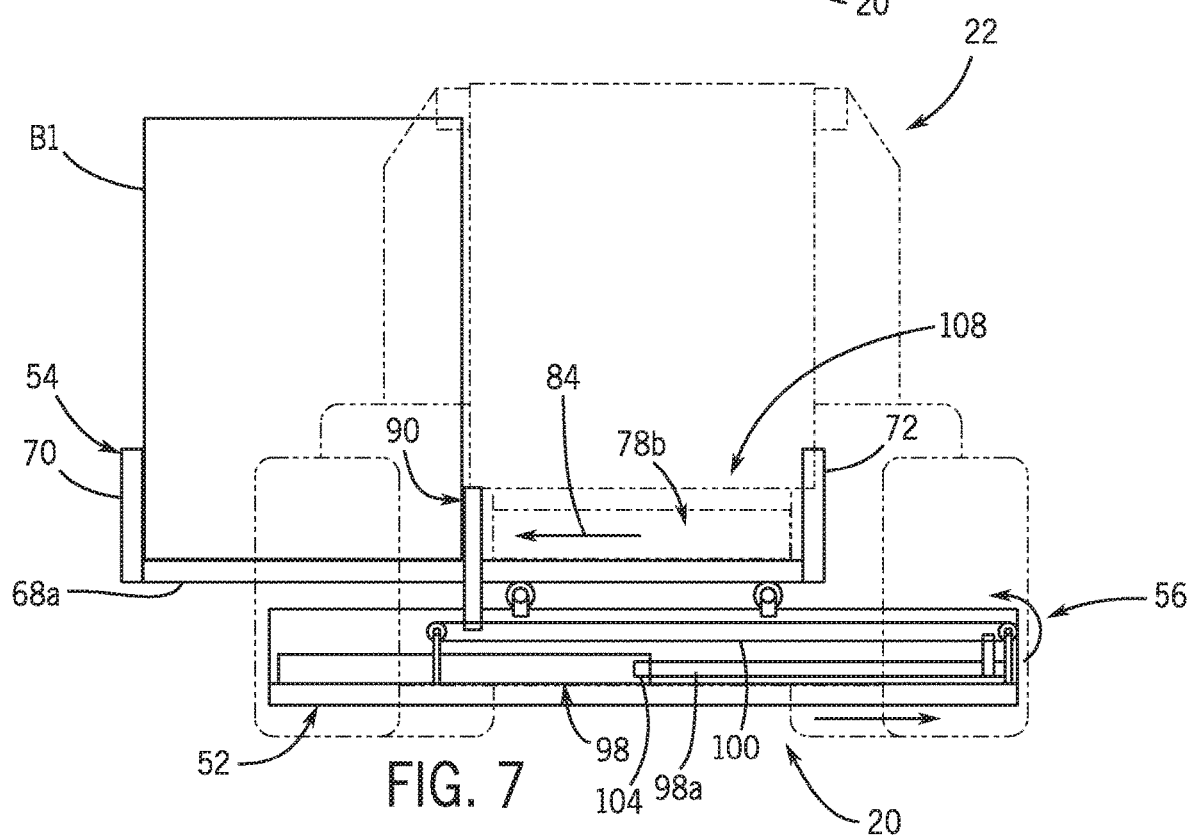

After the bale B1 has been deposited onto the carriage 54 into the first bale receiving area 78a, the bale separating member actuator 92 is actuated to move the bale separating member 90 laterally to the left in the first direction 84 as shown in FIG. 6. When the bale separating member 90 is moved laterally to the left, the bale separating member 90 first contacts the side of the first bale B1 and slides the first bale B1 into the space 106, see FIG. 5. The bale separating member 90 continues to move in the first direction 84, see FIG. 6, thereby pushing the first bale B1 against the left side wall 70 which causes the carriage 54 to move laterally relative to the base frame 52. This lateral movement is continued until the bale separating member 90 is positioned at a second position which is on the left side of the discharge gate 38, and a space 108 is formed in the second bale receiving area 78b between the bale separating member 90 and the right side wall 72 rearwardly of the discharge gate 38, see FIG. 7. The bale separating member 90 is moved until the bale separating member 90 is positioned laterally outwardly of where a second bale B2 is discharged from the discharge gate 38 and such that the space 108 is provided between the right side of the bale separating member 90 and the right side wall 72 which is wide enough to accommodate the second bale B2. The sensor(s) 104 sense the position of the bale separating member 90 relative to the carriage 54 and when the second position is sensed by the sensor(s) 104, the bale separating member actuator 92 is deactivated so that movement of the bale separating member 90 is stopped. Mechanical hard stops (not shown) may be provided to prevent further movement of the bale separating member actuator 92 in the first direction 84, thereby preventing the bale separating member actuator 92 from squeezing and deforming the first bale B1. Alternatively, the further movement of the bale separating member actuator 92 in the first direction 84 may be limited by the stroke of the cylinder 98.

Figure 8:
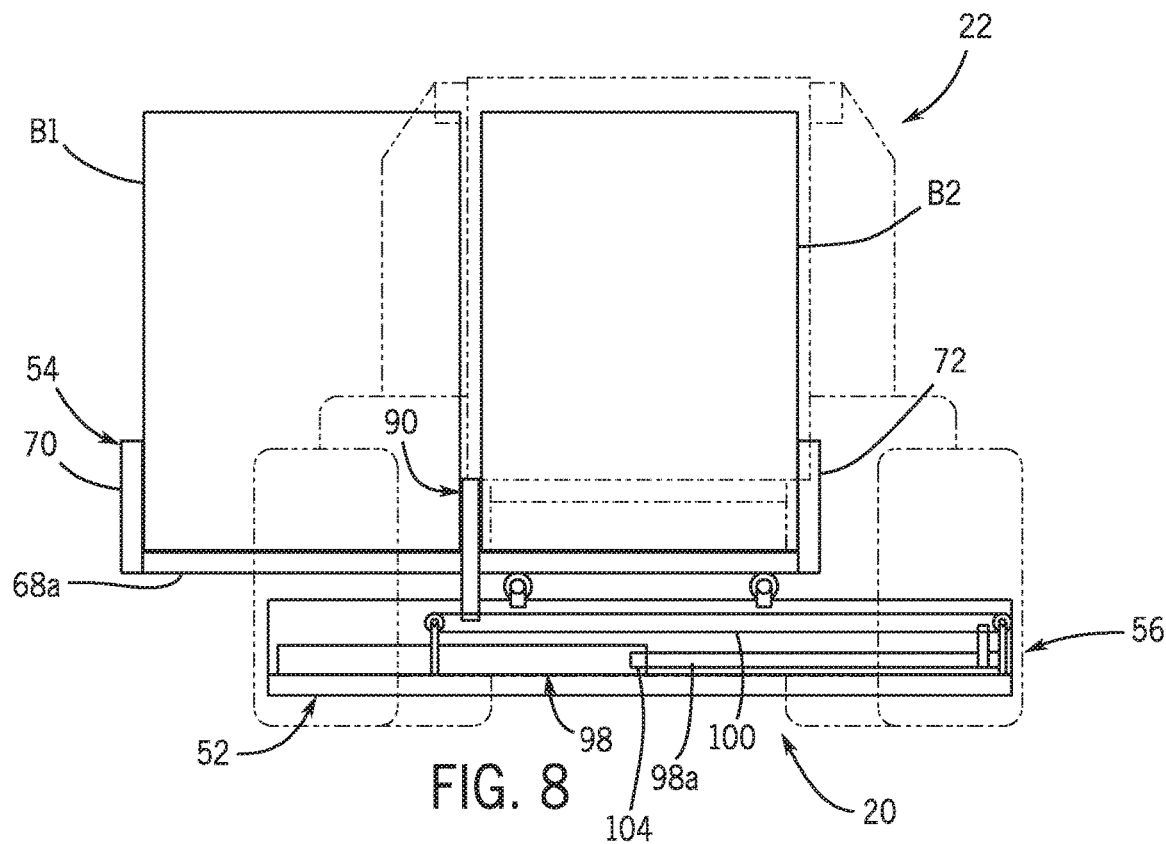

When the second bale B2 is completely formed in the manner known in the art, the discharge gate 38 is opened, the front rail 74 is moved downward, and the second bale B2 is deposited into the space 108 in the second bale receiving area 78b and onto the carriage 54 as shown in FIG. 8. The second bale B2 is deposited into the space 108 and onto the carriage 54 such that the second bale B2 is proximate to the right side of the bale separating member 90 and proximate to the right side wall 72, and thereafter the front rail 74 is moved up.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

Figure 9:
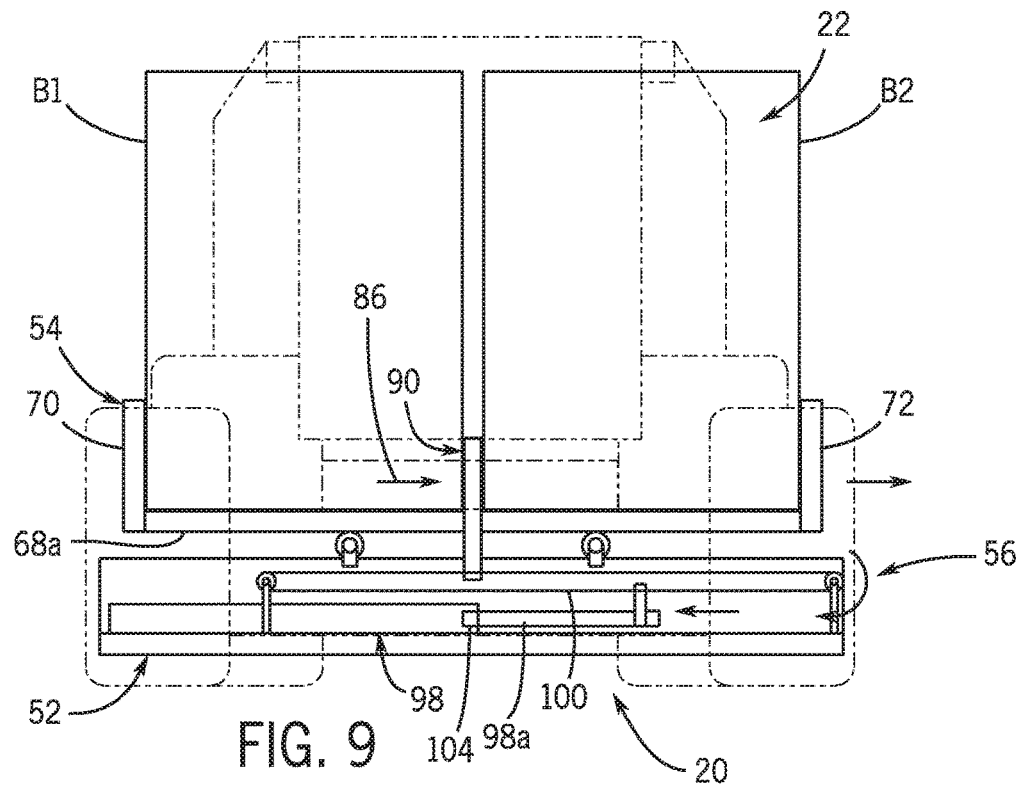

In some embodiments, the bale separating member actuator 92 is then actuated to move the bale separating member 90 laterally to the right in the second direction 86 as shown in FIG. 9. When the bale separating member 90 is moved laterally to the right, the bale separating member 90 contacts the side of the second bale B2, thereby pushing the second bale B2 against the right side wall 72 which causes the carriage 54 to move laterally rightward relative to the base frame 52. This lateral rightward movement is continued until the bale separating member 90 and the carriage 54 are positioned into a third position which is centered behind the baler 22 as shown in FIG. 9. This will cause the center of gravity of the loaded accumulator 20 to be in line with the center of gravity of the baler 22. The sensor(s) 104 sense the position of the bale separating member 90 relative to the carriage 54 and when the third position is sensed by the sensor(s) 104, the bale separating member actuator 92 is deactivated so that movement of the bale separating member 90 is stopped. Mechanical hard stops (not shown) may be provided to prevent further movement of the bale separating member actuator 92 in the second direction 86, thereby preventing the bale separating member actuator 92 from squeezing and deforming the second bale B2. Alternatively, the further movement of the bale separating member actuator 92 in the second direction 86 may be limited by the stroke of the cylinder 98.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be deposited onto the carriage 54. During this movement, the carriage 54 may extend laterally outwardly to one of the sides of the baler 22.

When the bales B1, B2 are ready to be discharged from the accumulator 20, the rear rail 76 is moved down and the bales B1, B2 are removed from the carriage 54. In an embodiment, the carriage 54 is pivotably coupled by suitable mechanisms (not shown) to the base frame 52 such that when the carriage 54 is empty, partially loaded, or fully loaded, the carriage 54 can be tilted rearward to discharge the bales B1, B2 to the ground.

As introduced above, the flow from the hydraulic pumps 224 may be controlled in various ways (e.g., through control of the various control valves 226), in order to cause movement of the hydraulic cylinders 42, 98. In this way, for example, a movement of the baler 22 and/or the accumulator 20 may be implemented by various control signals to the hydraulic pumps 224, control valves 226, and so on. Generally, each of the control valves 226 (and cooperating valves on other components) may be controlled by the controller 228 between one of three positions. In one example, the control valves 226 have a first, open position, in which hydraulic fluid from the hydraulic pumps 224 flows into a respective one of the hydraulic cylinders 42, 98; a second, open position, in which hydraulic fluid from the hydraulic pumps 224 is released from the respective one of the hydraulic cylinders 42, 98; and a third, closed position, in which hydraulic fluid from the hydraulic pumps 224 does not flow into the respective one of the hydraulic cylinders 42, 98 to maintain a hydraulic pressure within the respective one of the hydraulic cylinders 42, 98.

In various embodiments, the sensor(s) 104 are one or more flow sensors, such as volumetric flow sensors, that observe a volumetric flow rate associated with the hydraulic circuit and generate sensor signals based thereon, such as a volumetric flow rate associated with the bale separating member actuator 92 so that a position of the movable bale separating member 90 is observed relative to the base frame 52. Based on the volumetric flow rate associated with the bale separating member actuator 92, an amount of time the control valve 226 associated with the bale separating member actuator 92 is in the first, open position (which may be observed by the sensor(s) 104 or another module associated with the controller 228), and a known bore diameter of a housing 92b of the bale separating member actuator 92 (which may be stored in a memory associated with the controller 228), the controller 228 determines how far the piston rod 92a extends outward (an extended length of the hydraulic cylinder 98). Based on how far the piston rod 92a extends (the extended length of the hydraulic cylinder 98) and a known geometry of the bale separating member actuator 92 relative to the bale separating member 90 (which may be stored in a memory associated with the controller 228), the controller 228 determines a position of the bale separating member 90 relative to the base frame 52.

Sensor(s) 2118 are provided on the carriage actuator 2112 or on the base frame 52 which sense the position of the carriage pusher 2110 relative to the base frame 52.

Figure 10:
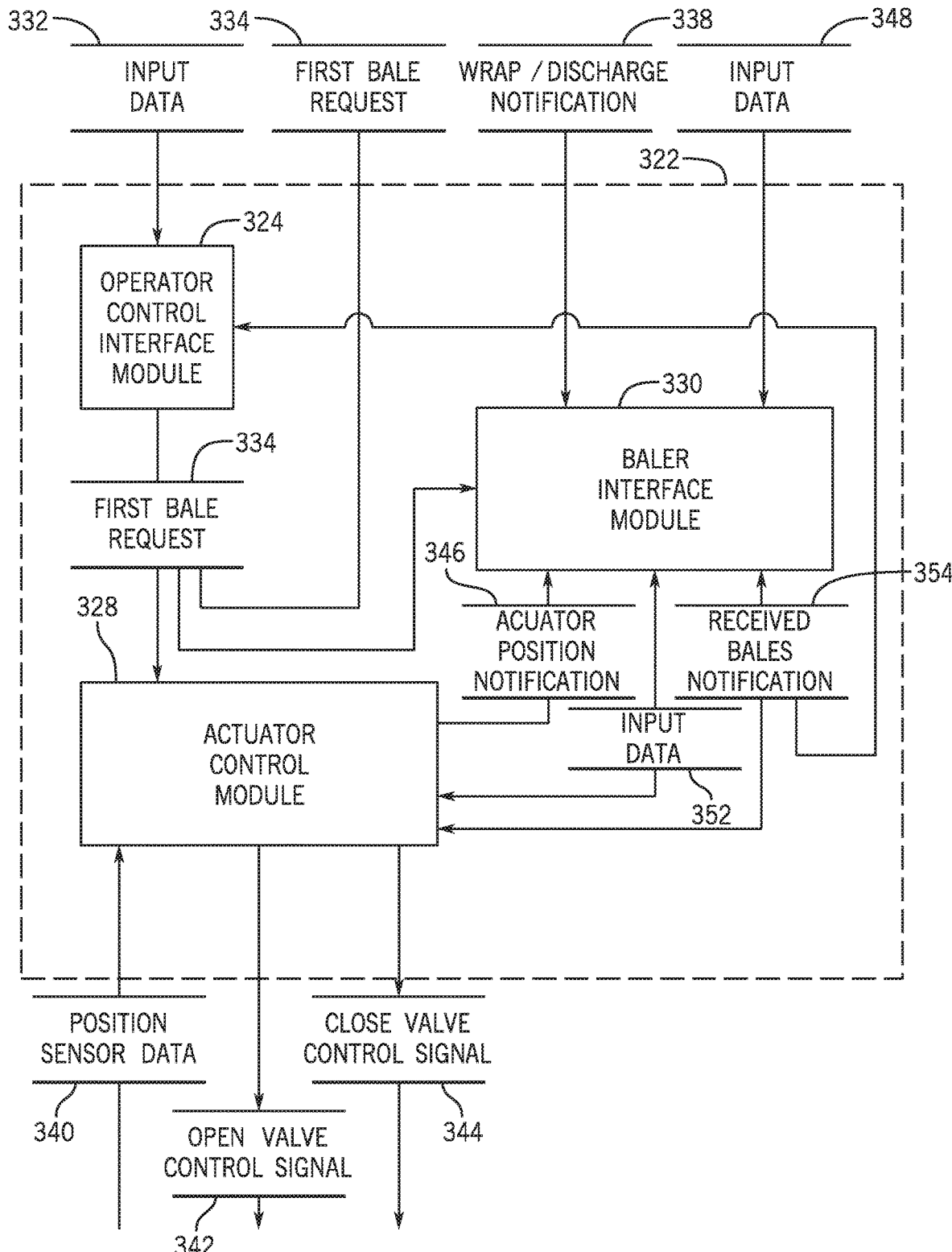
FIG. 10 is a dataflow diagram of an accumulation system of a bale accumulator control system for the accumulator.

Referring now also to FIG. 10, a dataflow diagram illustrates an embodiment of the bale accumulation control system 220, which may be implemented within an accumulation system controller 322 that may be embedded within the controller 228 or one or more separate controllers. The accumulation system controller 322 may communicate with elements of the baler 22, including other controllers, control modules, or ECUs of the baler 22, as well as actuators and sensors discussed below. Various embodiments of the accumulation system controller 322 according to the present disclosure can include any number of sub-modules. As can be appreciated, the sub-modules shown in FIG. 10 can be combined and/or further partitioned to similarly output one or more control signals to the control valves 226, the bale separating member actuator 92, and other systems of the baler 22. Inputs to the accumulation system controller 322 are received from the sensors 104, 232, received from the operator interface 230, received from other control modules (not shown) associated with the baler 22 and/or the accumulator 20, and/or determined/modeled by other sub-modules (not shown) within the controller 228. In various embodiments, the accumulation system controller 322 includes an operator interface control module 324, an actuator control module 328 and a baler interface module 330.

The operator interface control module 324 receives input data 332 from an operator's manipulation of the operator interface 230 that comprises input indicating an operator's desire to form the bales B1, B2 with the baler 22.

The operator interface control module 324 interprets the input data 332. If the input data 332 indicates that the operator desires to bale crop, the operator interface control module 324 sets a first bale request 334 for appropriate module or system of the baler 22, the actuator control module 328, and the baler interface module 330 to initiate a first bale routine. The first bale request 334 is a notification that the operator desires to form and accumulate bales on the accumulator 20. The first bale routine includes forming the first bale B1; receiving, by the accumulation system controller 322, position signals from the sensor 104 associated with the position of the bale separating member 90; determining, by the accumulation system controller 322, whether the bale separating member 90 is located within the first bale receiving area 78a of the crop package carrying area 78; and when the bale separating member 90 is determined to be within the first bale receiving area 78a, clearing, by the accumulation system controller 322 controlling the bale separating member actuator 92, the bale separating member 90 from the first bale receiving area 78a by moving the bale separating member 90 relative to the carriage 54, which in turn, causes the carriage 54 to move relative to the base frame 52.

In one example, the accumulation system controller 322 may receive a signal from the appropriate system of the baler 22 that indicates when the first bale B1 is fully formed in the bale forming chamber 34 as a wrap and discharge notification 338 for the baler interface module 330. Such indications may be based on, for example, sensor signals from sensors 232 on the baler 22. As such, the wrap and discharge notification 338 is provided to the baler interface module 330 and indicates that the first bale B1 in the bale forming chamber 34 is fully formed, and is to be wrapped and discharged.

The actuator control module 328 receives as input position sensor data 340 which indicates the position of the bale separating member 90. The input position sensor data 340 comprises sensor signals or sensor data received from the sensor 104, as an example. The actuator control module 328 processes the sensor signals, determines a current position of the movable bale separating member 90, and sets the position of the bale separating member 90 to the first position. In various embodiments, the actuator control module 328 compares the desired position to the current position, and if the current position is not equal to the desired position, the actuator control module 328 outputs open valve control signal 342. The open valve control signal 342 comprise a control signal for the control valves 226 to open to the first, open position to drive the bale separating member actuator 92 to move the movable bale separating member 90. Based on the outputting of the open valve control signal 342, the actuator control module 328 receives as input or resamples the input position sensor data 340. Based on the input position sensor data 340, the actuator control module 328 determines a current position of the movable bale separating member 90. If the current position of the movable bale separating member 90 is not equal to the desired position (set based on the input position sensor data 340), the actuator control module 328 moves the movable bale separating member 90 and continues to monitor or determine the current position of the movable bale separating member 90 until the current position of the movable bale separating member 90 is substantially equal to the desired position. Once the current position of the movable bale separating member 90 is equal to the desired position, the actuator control module 328 outputs close valve control signal 344. The close valve control signal 344 comprise control signal for the control valves 226 to move to the third, closed position to close to maintain the position of the movable bale separating member 90 in the first position. Once the current position of the movable bale separating member 90 is equal to the first position, the actuator control module 328 sets an actuator position notification 346 for the baler interface module 330. The actuator position notification 346 indicates that the movable bale separating member 90 is in the first position and ready to receive the first bale B1 from the baler 22.

The baler interface module 330 receives as input the wrap and discharge notification 338 from the ECU of the baler 22. Based on the wrap and discharge notification 338, the baler interface module 330 determines whether the actuator position notification 346 has been received that indicates that the movable bale separating member 90 is in the first position. If true, the baler interface module 330 outputs a discharge command 348. The discharge command 348 is a command that is output to appropriate elements of the baler 22 to command the baler 22 to activate the wrap feed and cut-off system of the baler 22 to apply wrap material about the first bale B1 in the bale forming chamber 34, open the discharge gate 38 and discharge the first bale B1 from the bale forming chamber, actuate the transfer mechanism 50 to move the first bale B1 into the carriage 54 after the first bale B1 has been wrapped and discharged, and close the discharge gate 38. After the first bale B1 is discharged from the baler 22, the discharge gate 38 is closed, and the baler 22 initiates the formation of the second bale B2 in the bale forming chamber 34.

After the first bale B1 is received on the carriage 54, the baler interface module 330 outputs a second bale request 352 to the actuator control module 328 to initiate a second bale routine. The second bale routine includes forming the second bale B2; receiving, by the accumulation system controller 322, position signals from the sensor 104 associated with the position of the bale separating member 90; determining, by the accumulation system controller 322, whether the bale separating member 90 is located within the first bale receiving area 78a of the crop package carrying area 78; and when the bale separating member 90 is determined to be within the first bale receiving area 78a, clearing, by the accumulation system controller 322 controlling the bale separating member actuator 92, the bale separating member 90 from the first bale receiving area 78a by moving the bale separating member 90 relative to the carriage 54, which in turn, causes the carriage 54 to move relative to the base frame 52.

In one example, the accumulation system controller 322 may receive a signal from an appropriate system of the baler 22 that indicates when the second bale B2 is fully formed in the bale forming chamber 34, again as the wrap and discharge notification 338. As such, the wrap and discharge notification 338 is provided to the baler interface module 330 and indicates that the second bale B2 in the bale forming chamber 34 is fully formed, and is to be wrapped and discharged.

The actuator control module 328 processes the sensor signals from the sensor 104, determines a current position of the movable bale separating member 90, and sets the position of the bale separating member 90 to the second position. Once the current position of the movable bale separating member 90 is equal to the second position, the actuator control module 328 sets the actuator position notification 346 for the baler interface module 330. The actuator position notification 346 indicates that the movable bale separating member 90 is in the second position and ready to receive the second bale B2 from the baler 22.

As noted above, based on the wrap and discharge notification 338, the baler interface module 330 determines whether the actuator position notification 346 has been received that indicates that the movable bale separating member 90 is in the second position. If true, the baler interface module 330 outputs the discharge command 348. The discharge command 348 is a command that is output to the appropriate elements of the baler 22 to command the baler 22 to activate the wrap feed and cut-off system of the baler 22 to apply wrap material about the second bale B2 in the bale forming chamber 34, open the discharge gate 38 and discharge the second bale B2 from the bale forming chamber, actuate the transfer mechanism 50 to move the second bale B2 into the carriage 54 after the second bale B2 has been wrapped and discharged, and close the discharge gate 38. After the second bale B2 is discharged from the baler 22, the discharge gate 38 is closed, and the baler 22 awaits the next command from the user.

In an embodiment, after the second bale B2 is received on the carriage 54, the baler interface module 330 outputs a received bales notification 354. The bales received notification 354 is sent to the actuator control module 328 which commands the actuator control module 328 to move the movable bale separating member 90 to the third position. The actuator control module 328 processes the sensor signals from the sensor 104, determines a current position of the movable bale separating member 90, and sets the position of the bale separating member 90 to the third position. The received bales notification 354 may be sent to the operator interface 230 to indicate to the operator that the bales B1, B2 are on the accumulator 20 and further action is ready to be taken, such as a command to tip the accumulator 20 to dump or deposit the bales B1, B2 onto the ground so that another baling operation can take place.

In some alternate embodiment, after the first bale B1 is received on the carriage 54, the baler interface module 330 outputs a centering notification to the actuator control module 328. In response, the actuator control module 328 commands the actuator control module 328 to move the movable bale separating member 90 to the third position. When the wrap and discharge notification 338 is received indicating that the first bale B1 is formed, the baler interface module 330 outputs a second position notification (not shown) to the actuator control module 328 which commands the actuator control module 328 to move the movable bale separating member 90 to the second position prior to receipt of the second bale B2 on the accumulator 20.

In some embodiments, the gate sensor 234 is configured to detect the position of the discharge gate 38; and the accumulation system controller 322 is configured to initiate each of the first bale routine and the second bale routine upon the accumulation system controller 322 receiving input signals from the gate sensor 234 that the discharge gate 38 is open or opening.

In a further embodiment, the accumulation control system 220 includes a tilt sensor 236 for detecting a roll angle of the accumulator 20 and/or the baler 22, for example when the accumulator 20 is traverses an inclined surface. The accumulation system controller 322 initiates a tilt compensation routine in which the controller 238 receives position signals from the sensor 104; receives tilt signals from the tilt sensor 236; determines, based on the position and tilt signals, whether one or more of the first bale and the second bale should be positioned at an uphill side of the accumulator; and moves one or more of the first bale B1 and the second bale B2 to the uphill side of the accumulator 20 by controlling the bale separating member actuator 92 to move the carriage 54 relative to the base frame 52.

Figure 11A:
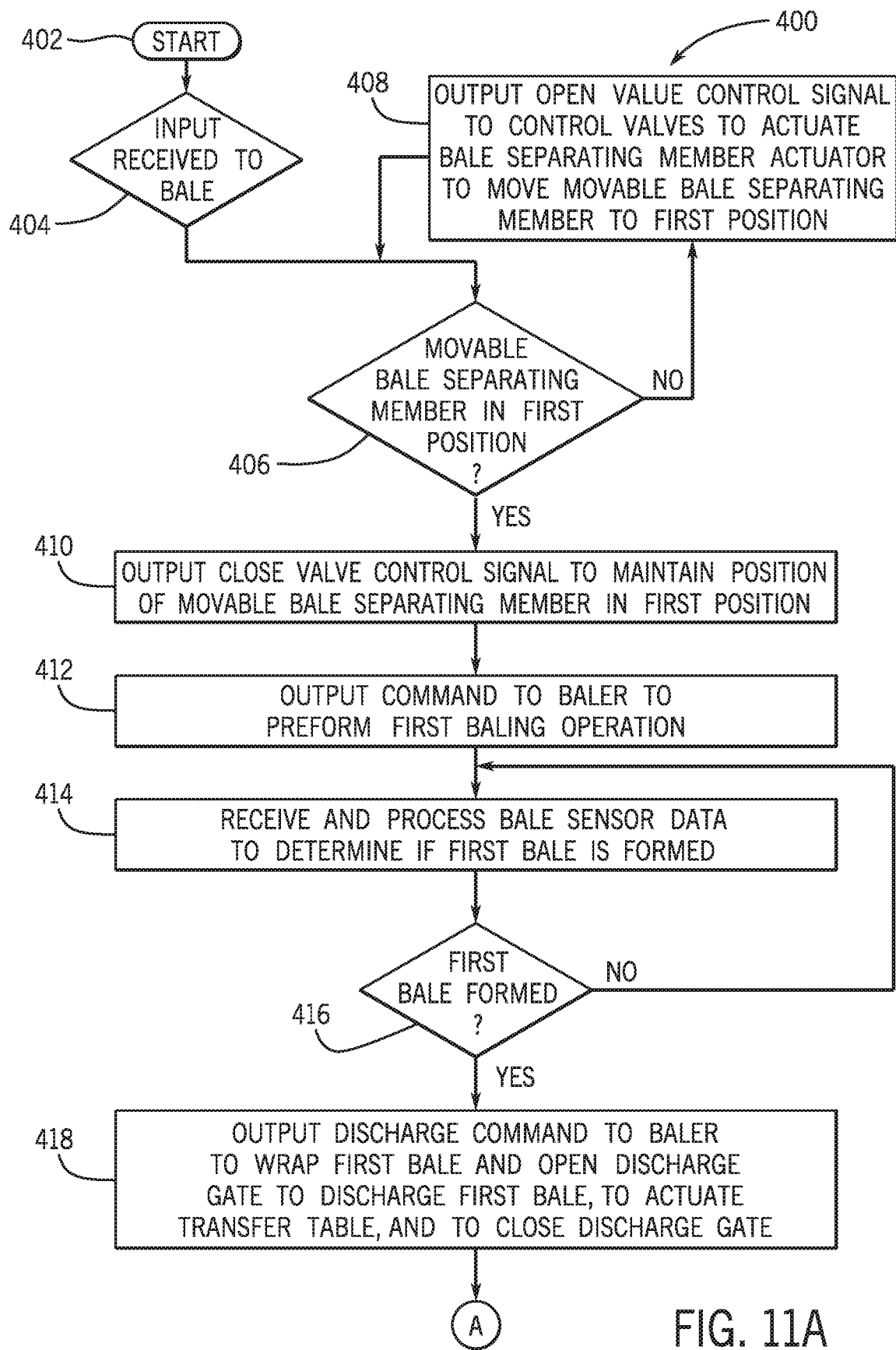
FIGS. 11A and 11B show a flowchart having example steps for use of the accumulator having the actuating mechanism of FIG. 3.
Figure 11B:
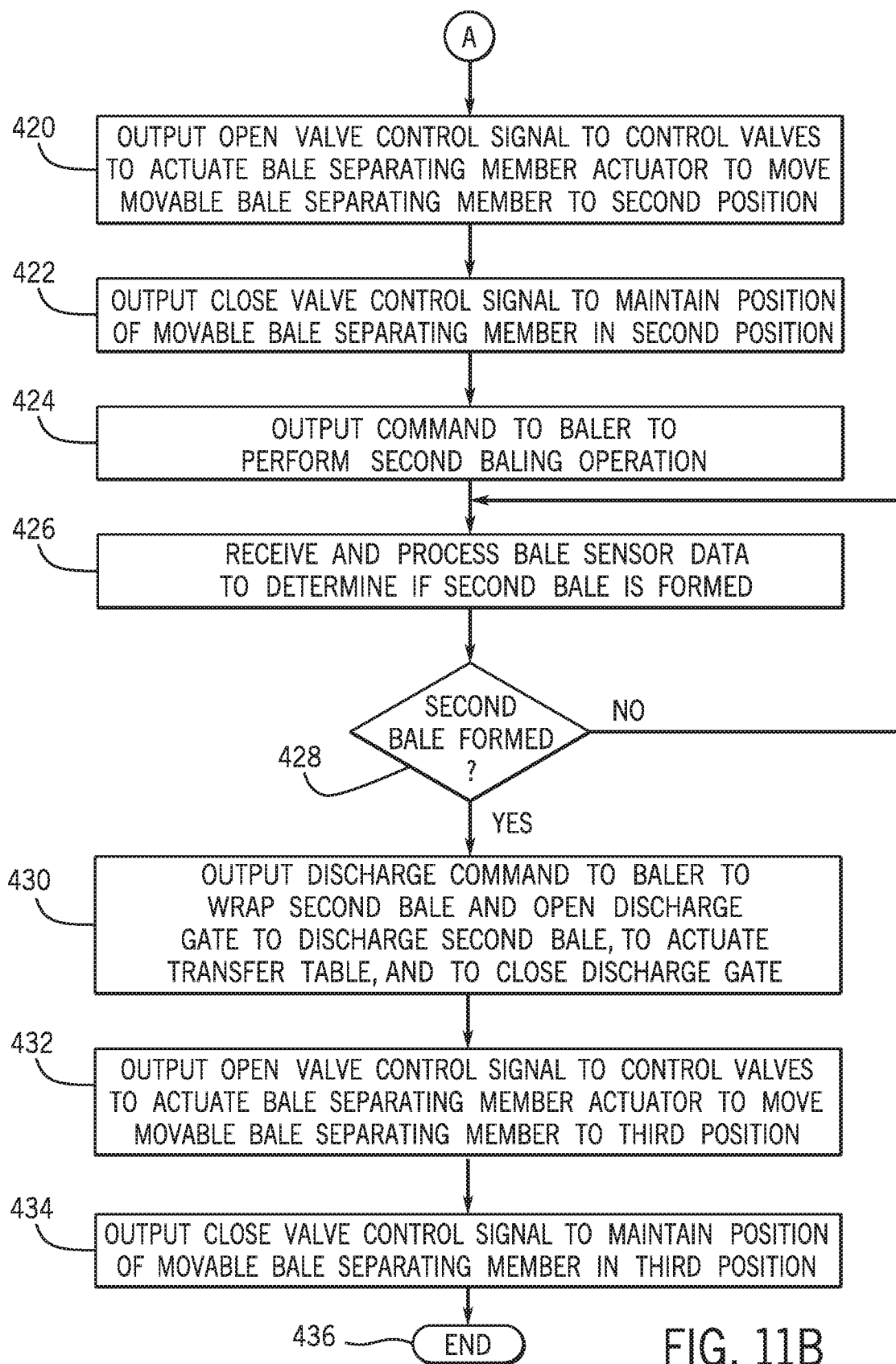

Referring now also to FIGS. 11A and 11B, a flowchart illustrates a method 400 that may be performed by the accumulation system controller 322 of FIG. 10 for use with the embodiments of FIGS. 1-10. The movement of the front rail 74 described above is not included in the flowchart, but appropriate steps would be provided for the movement of the front rail 74. As can be appreciated in light of the disclosure, the order of operation within the method 400 is not limited to the sequential execution as illustrated in FIGS. 11A and 11B, but may be performed in one or more varying orders as applicable and in accordance with the present disclosure.

In one example, the method 400 begins at step 402. At step 404, the method 400 determines whether bale input data 332 has been received, via the operator's manipulation of the human-machine or operator interface 230. If no, then at step 406, the method 400 loops to start step 402. If yes, the method 400 proceeds to step 406, and determines whether the bale separating member 90 is in the first position (by processing the input position sensor data 340). If no, then at step 408, the method 400 outputs the open valve control signal 342 to move the bale separating member 90 to the first position and then returns to step 406. If yes, the method 400 proceeds to step 410.

At step 410, the method 400 outputs the close valve control signal 344 to the control valves 226 to close the control valves 226 to maintain the first position of the bale separating member 90.

At 412, the method 400 outputs the first bale request 334 to the ECU of the baler 22 to start the first baling operation to form the first bale B1. At step 414, the method 400 receives and processes the sensor data 336 and determines if the first bale B1 is fully formed in the bale forming chamber 34. At step 416, the method 400 determines whether the first bale B1 is fully formed in the bale forming chamber 34. If no, the method 400 loops to step 414. If yes, the method 400 proceeds to 418. At step 418, the method 400 outputs the discharge command 348 to the baler 22.

The method 400 then proceeds to step 420. At step 420, the method 400 outputs the one or more open valve control signals 342 to move the bale separating member 90 from the first position to the second position.

At step 422, the method 400 outputs the close valve control signal 344 to the control valves 226 to close the control valves 226 to maintain the second position of the bale separating member 90.

At step 424, the method 400 outputs the outputs the second bale request 352 to the baler 22 to commence forming the second bale B2. It is to be understood that step 424 can be performed immediately after step 418. At step 426, the method 400 receives and processes the sensor data 336 and determines if the second bale B2 is fully formed in the bale forming chamber 34. At step 428, the method 400 determines whether the second bale B2 is fully formed in the bale forming chamber 34. If no, the method 400 loops to step 426. If yes, the method 400 proceeds to step 430. At step 430, the method 400 outputs the discharge command 348 to the baler 22.

The method 400 then proceeds to step 432. At step 432, the method 400 outputs the one or more open valve control signals 342 to move the bale separating member 90 from the second position to the third position.

At step 434, the method 400 outputs the close valve control signal 344 to the control valves 226 to close the control valves 226 to maintain the third position of the bale separating member 90.

At step 436, the method 400 ends.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be accepted onto the accumulator 20.

In FIGS. 12-18, a second embodiment of the actuating mechanism 1056 for use with the accumulation control system 220 is shown. Unless otherwise noted, the actuating mechanism 1056 may have elements similar to those discussed above with reference to actuating mechanism 56. The actuating mechanism 1056 includes a bale separating member 1090 coupled to a bale separating member actuator 1092 which is fixedly coupled to the carriage 54, and a carriage pusher 1110 coupled to a carriage actuator 1112 which is fixedly coupled to the base frame 52. The front and rear rails 74, 76 are not shown in FIGS. 13-18 for clarity.

The bale separating member 1090 includes a lower flange 1094 coupled to an upper flange 1096. The lower flange 1094 extends through the slot 80 in the platform 68 of the carriage 54, and is fixedly coupled to the bale separating member actuator 1092 which is mounted on a lower surface of the platform 68. The upper flange 1096 extends upwardly from the platform 68 to divide the crop package carrying area 78 into the into first and second bale receiving areas 78a, 78b. The bale separating member 1090 can be laterally slid relative to the carriage 54 by the bale separating member actuator 1092 in the directions 84, 86. In an embodiment, the crop package carrying area 78 defines a width which is slightly larger than the width of two bales B1, B2 and a width of the bale separating member 1090.

In an embodiment, the bale separating member actuator 1092 includes a hydraulic cylinder 1098 having an extendable and retractable piston rod 1098a mounted in a housing 1098b. The piston rod 1098a is attached to the lower flange 1094 of the bale separating member 1090. The hydraulic cylinder 1098 is fluidly coupled to the hydraulic system of the baler 22. For example, the bale separating member actuator 1092 may include one or more hydraulic lines that connect the hydraulic cylinder 1098 with the hydraulic supply. One or more electro-hydraulic control valves of the hydraulic system of the baler 22 may be in fluid communication with the bale separating member actuator 1092 and electrically activated according to signals that control the flow of hydraulic fluid between the hydraulic supply and the hydraulic cylinder 1098. The hydraulic cylinder 1098 is responsive to the hydraulic fluid received from the hydraulic system to move the bale separating member 1090. In an embodiment, the bale separating member actuator 1092 includes a worm gear or a rack and pinion system which is attached to the lower flange 1094 of the bale separating member 1090. Retraction of the bale separating member actuator 1092 moves the bale separating member 1090 in the first direction 84. Extension of the bale separating member actuator 1092 moves the bale separating member 1090 in the second direction 86. Other actuating mechanisms are within the scope of the present disclosure, provided movement of the bale separating member 1090 relative to the carriage 54 is provided.

Sensor(s) 1104 are provided on the bale separating member actuator 1092 or on the carriage 54 which sense the position of the bale separating member 1090 relative to the carriage 54.

The carriage actuator 1112 is mounted on the web 66 of the base frame 52. The carriage pusher 1110 is fixedly connected to the carriage actuator 1112 and to the underside of the carriage 54. The carriage 54 can be laterally slid relative to the base frame 52 by the carriage actuator 1112 in the directions 84, 86. In an embodiment, the carriage actuator 1112 includes a hydraulic cylinder 1116 having an extendable and retractable piston rod 1116a mounted in a housing 1116b. The hydraulic cylinder 1116 is fluidly coupled to the hydraulic system of the baler 22. For example, the carriage actuator 1112 may include one or more hydraulic lines that connect the hydraulic cylinder 1116 with the hydraulic supply. One or more electro-hydraulic control valves of the hydraulic system of the baler 22 may be in fluid communication with the carriage actuator 1112 and electrically activated according to signals from the ECU of the baler 22 to control the flow of hydraulic fluid between the hydraulic supply and the hydraulic cylinder 1116. The hydraulic cylinder 1116 is responsive to the hydraulic fluid received from the hydraulic system to move the carriage actuator 1112. In an embodiment, the carriage actuator 1112 includes a worm gear or a rack and pinion system which is attached to the carriage 54. Extension of the carriage actuator 1112 moves the carriage pusher 1110 and the carriage 54 in the first direction 84. Retraction of the carriage actuator 1112 moves the carriage pusher 1110 and the carriage 54 in the second direction 86. Other actuating mechanisms are within the scope of the present disclosure, provided movement of the carriage 54 relative to the base frame 52 is provided.

Sensor(s) 1118 are provided on the carriage actuator 1112 or on the base frame 52 which sense the position of the carriage pusher 1110 relative to the base frame 52.

Operation of the accumulator 20 is now described with regard to the accumulator 20 receiving two bales B1 and B2. For ease in description, the positioning of the carriage 54 is described to that shown in FIGS. 13-18.

Figure 13:
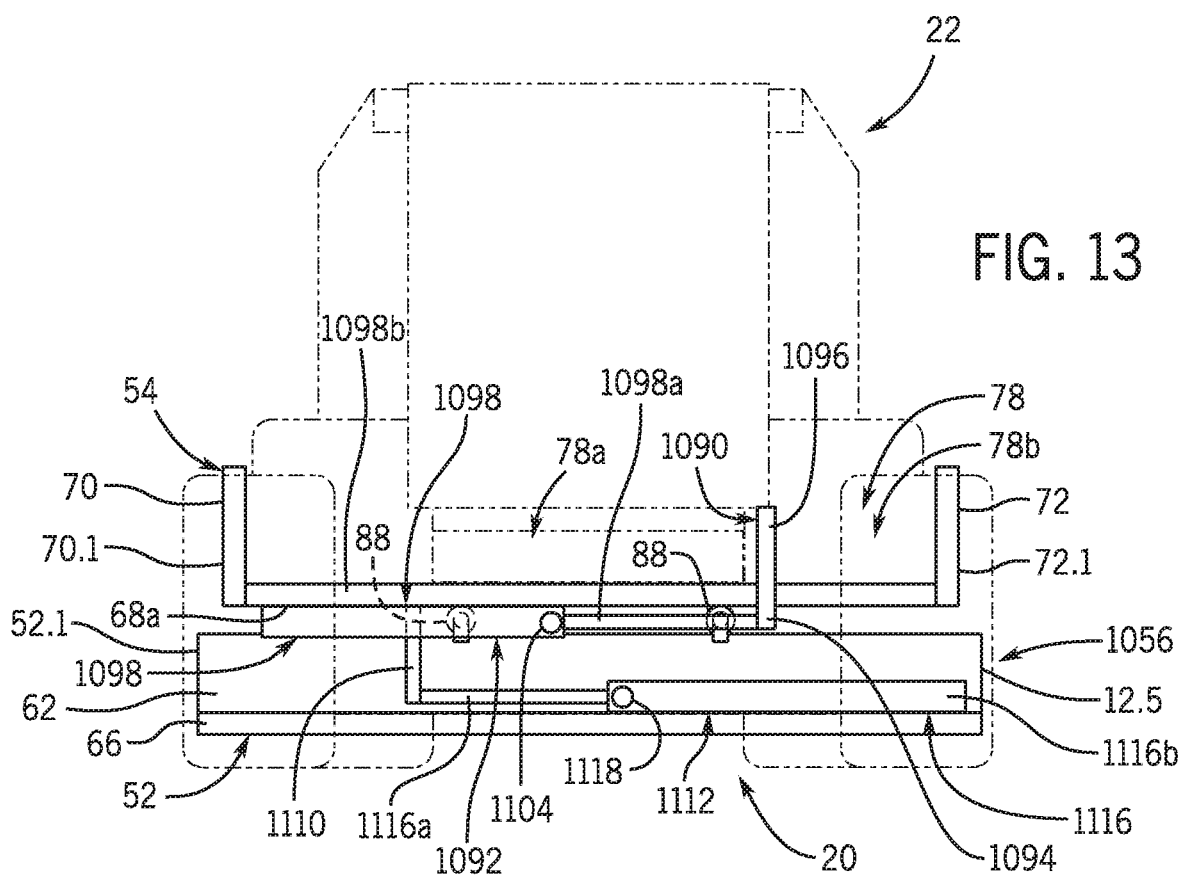
Figure 14:
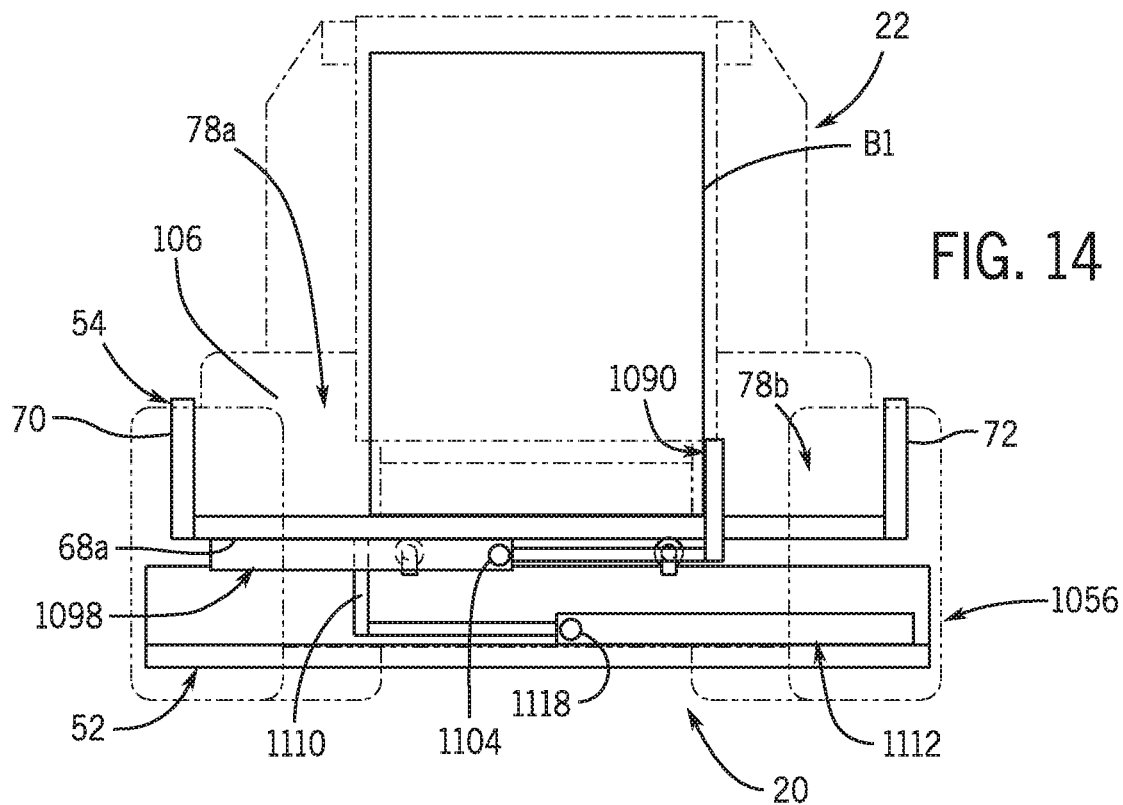

Initially, as shown in FIG. 13, the bale separating member 1090 and the carriage 54 are positioned a first position relative to the base frame 52 such that the bale separating member 1090 is positioned off to one side of the discharge gate 38 such that the crop package carrying area 78 is partitioned into the first and second bale receiving areas 78a, 78b and the carriage 54 is centered behind the baler 22. As such, in the first position, the bale separating member 1090 is positioned to the right of the center of the carriage 54 as shown in FIG. 13. The sensor(s) 1104, 1118 sense the position of the bale separating member 1090 relative to the carriage 54 and the carriage 54 relative to the base frame 52. If the bale separating member 1090 is not in the first position, then the bale separating member actuator 1092 is actuated to move the bale separating member 1090 until the bale separating member 1090 is in the first position. If the carriage 54 is not in the first position, then the carriage actuator 1112 is actuated to move the carriage pusher 1110 until the carriage 54 is in the first position.

The baler 22 forms a first bale B1 in a manner known in the art, the discharge gate 38 is opened, the front rail 74 is moved downward, and the first bale B1 is transferred into the first bale receiving area 78a by the transfer mechanism 50. Once the bale B1 is clear of the discharge gate 38, the discharge gate 38 is closed, the front rail 74 is moved upward, and the baler 22 commences forming a second bale B2 in the bale forming chamber 34. The first bale B1 is deposited onto the carriage 54 into the first bale receiving area 78a, see FIG. 14, which is proximate to the left side of the bale separating member 1090. A space 106 having a width which is equal to approximately half of the width of the first bale B1 is formed in the first bale receiving area 78a and is provided between the left end of the first bale B1 and the left side wall 70 of the carriage 54.

After the bale B1 has been deposited onto the carriage 54 into the first bale receiving area 78a, the bale separating member actuator 1092 is actuated to move the bale separating member 1090 laterally to the left in the first direction 84 relative to the carriage 54 as shown in FIG. 15. When the bale separating member 1090 is moved laterally to the left, the bale separating member 1090 contacts the side of the first bale B1 and slides the first bale B1 into the space 106 as shown in FIG. 15 until the opposite side of the first bale B1 is against the left side wall 70. The sensor(s) 1104 sense the position of the bale separating member 1090 relative to the carriage 54 and when a position is sensed by the sensor(s) 1104 that the first bale B1 is against the left side wall 70, the bale separating member actuator 1092 is deactivated so that movement of the bale separating member 1090 is stopped.

The carriage actuator 1112 is then actuated to cause the carriage 54 to move laterally to the left in the first direction 84 relative to the base frame 52 as shown in FIG. 16. This lateral movement is continued until the bale separating member 1090 is positioned at a second position which is on the left side of the discharge gate 38, and a space 108 is formed in the second bale receiving area 78b between the bale separating member 1090 and the right side wall 72 rearwardly of the discharge gate 38. The carriage 54 is moved until the bale separating member 1090 is positioned laterally outwardly of where a second bale B2 is discharged from the discharge gate 38 and such that the space 108 is provided between the right side of the bale separating member 1090 and the right side wall 72 which is wide enough to accommodate the second bale B2. The sensor(s) 1118 sense the position of the carriage pusher 1110 relative to the base frame 52 and when the second position is sensed by the sensor(s) 1118, the carriage actuator 1112 is deactivated so that movement of the carriage 54 is stopped.

The bale separating member actuator 1092 can be activated first and the carriage actuator 1112 actuated second in order to position the bale separating member 1090 into the second position. Alternatively, the carriage actuator 1112 can be activated first and the bale separating member actuator 1092 actuated second in order to position the bale separating member 1090 into the second position. Yet as a further alternative, the bale separating member actuator 1092 and the carriage actuator 1112 can be actuated simultaneously to move the carriage 54 and the bale separating member 1090 into the second position.

Mechanical hard stops (not shown) may be provided to prevent further movement of the bale separating member actuator 1092 in the first direction 84, thereby preventing the bale separating member actuator 1092 from squeezing and deforming the first bale B1. Alternatively, the further movement of the bale separating member actuator 1092 in the first direction 84 may be limited by the stroke of the cylinder 1098.

Figure 17:
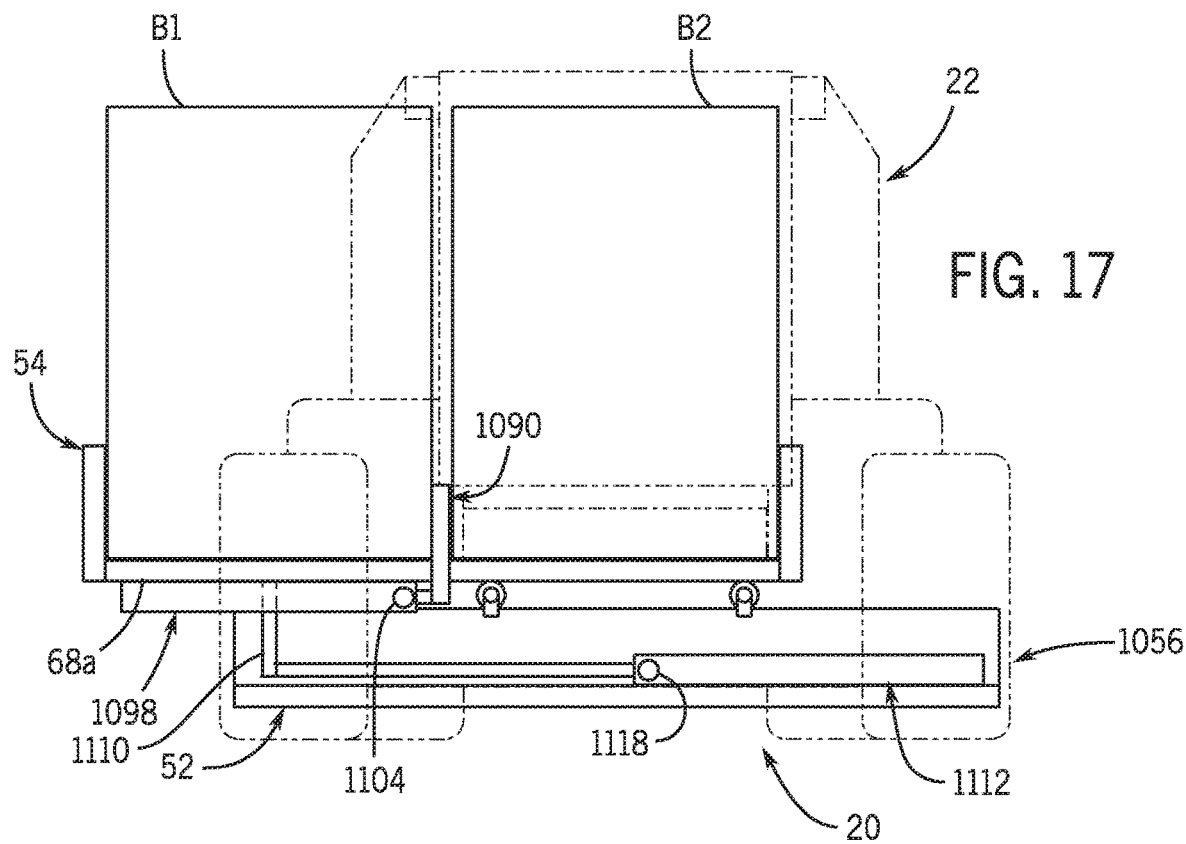

When the second bale B2 is completely formed in the manner known in the art, the discharge gate 38 is opened, the front rail 74 is moved downward, and the second bale B2 is deposited into the space 108 in the second bale receiving area 78b and onto the carriage 54 as shown in FIG. 17. The second bale B2 is deposited into the space 108 and onto the carriage 54 such that the second bale B2 is proximate to the right side of the bale separating member 1090 and proximate to the right side wall 72. Thereafter, the front rail 74 is moved upward.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

Figure 18:
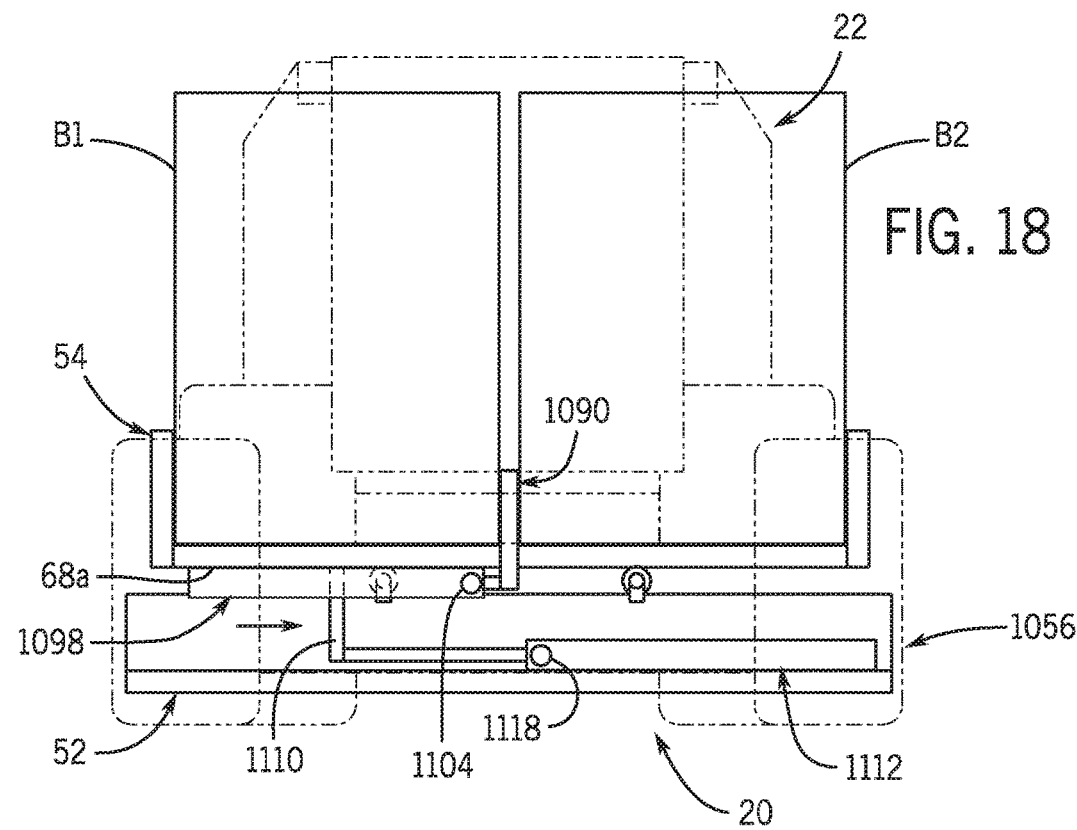

In some embodiments, the carriage actuator 1112 is then actuated to move the carriage 54 and thus the bale separating member 1090 laterally to the right in the second direction 86. This lateral rightward movement is continued until the carriage 54 and thus the bale separating member 1090 are positioned into a third position which is centered behind the baler 22 as shown in FIG. 18. This will cause the center of gravity of the loaded accumulator 20 to be in line with the center of gravity of the baler 22. The sensor(s) 1118 sense the position of the carriage 54 relative to the base frame 52 and when the third position is sensed by the sensor(s) 1118, the carriage actuator 1112 is deactivated so that movement of the carriage 54 is stopped. During this movement, the carriage 54 may extend laterally outwardly to one of the sides of the baler 22. Mechanical hard stops (not shown) may be provided to prevent further movement of the bale separating member actuator 1092 in the second direction 86, thereby preventing the bale separating member actuator 1092 from squeezing and deforming the second bale B2. Alternatively, the further movement of the bale separating member actuator 1092 in the second direction 86 may be limited by the stroke of the cylinder 1098.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be deposited onto the carriage 54.

When the bales B1, B2 are ready to be discharged from the accumulator 20, the rear rail 76 is moved down and the bales B1, B2 are removed from the carriage 54. In an embodiment, the carriage 54 is pivotably coupled by suitable mechanisms (not shown) to the base frame 52 such that when the carriage 54 is empty, partially loaded, or fully loaded, the carriage 54 can be tilted rearward to discharge the bales B1, B2 to the ground.

In some embodiments, passive or active mechanisms (not shown) which center the carriage 54 on the base frame 52 may be provided, such as springs, hydraulic cylinders, and so on. In some embodiments, passive or active mechanisms (not shown) which prevent the carriage 54 from moving relative to the base frame 52 when the carriage 54 is unloaded (no bales B1, B2 are on the carriage 54) or when the carriage only has a single bale B1 loaded thereon when the carriage 54 is any position relative to the base frame 52 are provided, such as springs, manual or automated latches, locks, keys or stops; bearings with prescribed rolling or sliding frictions; and so on.

With reference to the dataflow diagram of FIG. 10, the operator interface control module 324 receives input data 332 from an operator's manipulation of the operator interface 230 that comprises input that indicates an operator's desire to form the bales B1, B2 with the baler 22.

The operator interface control module 324 interprets the input data 332. If the input data 332 indicates that the operator desires to bale crop, the operator interface control module 324 sets a first bale request 334 for the appropriate module or system of the baler 22, the actuator control module 328 and the baler interface module 330 to initiate a first bale routine. The first bale request 334 is a notification that the operator desires to form and accumulate bales on the accumulator 20. The first bale routine includes forming the first bale B1; receiving, by the accumulation system controller 322, position signals from the sensors 1104, 1118 associated with the position of the bale separating member 1090 and the carriage 54; determining, by the accumulation system controller 322, whether the bale separating member 1090 is located within the first bale receiving area 78a of the crop package carrying area 78; and when the bale separating member 1090 is determined to be within the first bale receiving area 78a, clearing, by the accumulation system controller 322 controlling the bale separating member actuator 92 and/or the carriage actuator 1112, the bale separating member 90 from the first bale receiving area 78a by moving the bale separating member 90 relative to the carriage 54 and/or moving the carriage 54 relative to the base frame 52.

In one example, the accumulation system controller 322 may receive a signal from the appropriate system of the baler 22 that indicates when the first bale B1 is fully formed in the bale forming chamber 34 as a wrap and discharge notification 338 for the baler interface module 330. Such indications may be based on, for example, sensor signals from sensors 232 on the baler 22. As such, the wrap and discharge notification 338 is provided to the baler interface module 330 and indicates that the first bale B1 in the bale forming chamber 34 is fully formed, and is to be wrapped and discharged.

The actuator control module 328 receives as input position sensor data 340 which indicates the position of the bale separating member 1090 and the carriage 54. The input position sensor data 340 comprises sensor signals or sensor data received from the sensors 1104, 1118. The actuator control module 328 processes the sensor signals from the sensors 1104, 1118, determines a current position of the movable bale separating member 1090 and the carriage 54, and sets the position of the bale separating member 1090 and the carriage 54 to the first position. In various embodiments, the actuator control module 328 compares the desired position to the current position, and if the current position is not equal to the desired position, the actuator control module 328 outputs open valve control signal 342. The open valve control signal 342 comprise control signals for the control valves 226 to open to the first, open position to drive the bale separating member actuator 1092 to move the movable bale separating member 1090 and/or to drive the carriage actuator 1112 to move the movable carriage 54. Based on the outputting of the open valve control signal 342, the actuator control module 328 receives as input or resamples the input position sensor data 340. Based on the input position sensor data 340, the actuator control module 328 determines a current position of the movable bale separating member 1090 and the carriage 54. If the current position of the movable bale separating member 1090 and the carriage 54 is not equal to the desired position (set based on the input position sensor data 340), the actuator control module 328 moves the movable bale separating member 1090 and/or the carriage 54 and continues to monitor or determine the current position of the movable bale separating member 1090 and the carriage 54 until the current position of the movable bale separating member 1090 and the carriage 54 is substantially equal to the desired position. Once the current position of the movable bale separating member 1090 and the carriage 54 is equal to the desired position, the actuator control module 328 outputs close valve control signal 344. The close valve control signal 344 comprise control signal for the control valves 226 to move to the third, closed position to close to maintain the position of the movable bale separating member 1090 and the carriage 54 in the first position. Once the current position of the movable bale separating member 1090 and the carriage 54 is equal to the first position, the actuator control module 328 sets an actuator position notification 346 for the baler interface module 330. The actuator position notification 346 indicates that the movable bale separating member 1090 and the carriage 54 are in the first position and ready to receive the first bale B1 from the baler 22.

The baler interface module 330 receives as input the wrap and discharge notification 338 from the baler 22. Based on the wrap and discharge notification 338, the baler interface module 330 determines whether the actuator position notification 346 has been received that indicates that the movable bale separating member 1090 and the carriage 54 are in the first position. If true, the baler interface module 330 outputs a discharge command 348. The discharge command 348 is a command that is output to the appropriate system of the baler 22 to command the baler 22 to activate the wrap feed and cut-off system of the baler 22 to apply wrap material about the first bale B1 in the bale forming chamber 34, open the discharge gate 38 and discharge the first bale B1 from the bale forming chamber, actuate the transfer mechanism 50 to move the first bale B1 into the carriage 54 after the first bale B1 has been wrapped and discharged, and close the discharge gate 38. After the first bale B1 is discharged from the baler 22, the discharge gate 38 is closed, and the baler 22 initiates the formation of the second bale B2 in the bale forming chamber 34.

After the first bale B1 is received on the carriage 54, the baler interface module 330 outputs a second bale request 352 to the actuator control module 328 to initiate a second bale routine. The second bale routine includes forming the second bale B2; receiving, by the accumulation system controller 322, position signals from the sensors 1104, 1118 associated with the position of the bale separating member 1090 and the carriage 54; determining, by the accumulation system controller 322, whether the bale separating member 1090 is located within the first bale receiving area 78a of the crop package carrying area 78; and when the bale separating member 1090 is determined to be within the first bale receiving area 78a, clearing, by the accumulation system controller 322 controlling the bale separating member actuator 92 and/or the carriage actuator 1112, the bale separating member 90 from the first bale receiving area 78a by moving the bale separating member 90 relative to the carriage 54 and/or moving the carriage 54 relative to the base frame 52.

In one example, the accumulation system controller 322 may receive a signal from an appropriate system of the baler 22 that indicates that the second bale B2 is fully formed in the bale forming chamber 34, again as the wrap and discharge notification 338. As such, the wrap and discharge notification 338 is provided to the baler interface module 330 and indicates that the second bale B2 in the bale forming chamber 34 is fully formed, and is to be wrapped and discharged.

The actuator control module 328 processes the sensor signals from the sensors 1104, 1118, determines a current position of the movable bale separating member 1090, and sets the position of the bale separating member 1090 and the carriage 54 to the second position. Once the current position of the movable bale separating member 1090 and the carriage 54 are equal to the second position, the actuator control module 328 sets the actuator position notification 346 for the baler interface module 330. The actuator position notification 346 indicates that the movable bale separating member 1090 and the carriage 54 are in the second position and ready to receive the second bale B2 from the baler 22.

As noted above, based on the wrap and discharge notification 338, the baler interface module 330 determines whether the actuator position notification 346 has been received that indicates that the movable bale separating member 1090 and the carriage 54 are in the second position.

If true, the baler interface module 330 outputs the discharge command 348. The discharge command 348 is a command that is output to the ECU of the baler 22 to command the baler 22 to activate the wrap feed and cut-off system of the baler 22 to apply wrap material about the second bale B2 in the bale forming chamber 34, open the discharge gate 38 and discharge the second bale B2 from the bale forming chamber, actuate the transfer mechanism 50 to move the second bale B2 into the carriage 54 after the second bale B2 has been wrapped and discharged, and close the discharge gate 38. After the second bale B2 is discharged from the baler 22, the discharge gate 38 is closed, and the baler 22 awaits the next command from the user.

In an embodiment, after the second bale B2 is received on the carriage 54, the baler interface module 330 outputs a received bales notification. The bales received notification is sent to the actuator control module 328 which commands the actuator control module 328 to move the movable bale separating member 1090 and the carriage 54 to the third position. The actuator control module 328 processes the sensor signals from the sensors 1104, 1118, determines a current position of the movable bale separating member 1090 and the carriage 54, and sets the position of the bale separating member 1090 and the carriage 54 to the third position. The received bales notification 354 may be sent to the operator interface 230 to indicate to the operator that the bales B1, B2 are on the accumulator 20 and further action is ready to be taken, such as a command to tip the accumulator 20 to dump or deposit the bales B1, B2 onto the ground so that another baling operation can take place.

In an embodiment, after the first bale B1 is received on the carriage 54, the baler interface module 330 outputs a centering notification to the actuator control module 328. In response, the actuator control module 328 commands the actuator control module 328 to move the movable bale separating member 1090 and the carriage 54 to the third position. When the wrap and discharge notification 338 is received indicating that the first bale B1 is formed, the baler interface module 330 outputs a second position notification to the actuator control module 328 which commands the actuator control module 328 to move the movable bale separating member 1090 and the carriage 54 to the second position prior to receipt of the second bale B2 on the accumulator 20

In some embodiments, the gate sensor 234 is configured to detect the position of the discharge gate 38; and the accumulation system controller 322 is configured to initiate each of the first bale routine and the second bale routine upon the accumulation system controller 322 receiving input signals from the gate sensor 234 that the discharge gate 38 is open or opening.

In a further embodiment, the accumulation control system 220 includes a tilt sensor 236 for detecting a roll angle of the accumulator 20 and/or the baler 22, for example when the accumulator 20 is traverses an inclined surface. The accumulation system controller 322 initiates a tilt compensation routine in which the controller 238 receives position signals from the sensor 104; receives tilt signals from the tilt sensor 236; determines, based on the position and tilt signals, whether one or more of the first bale and the second bale should be positioned at an uphill side of the accumulator; and moves one or more of the first bale B1 and the second bale B2 to the uphill side of the accumulator 20 by controlling the bale separating member actuator 92 to move the carriage 54 relative to the base frame 52.

Figure 19B:
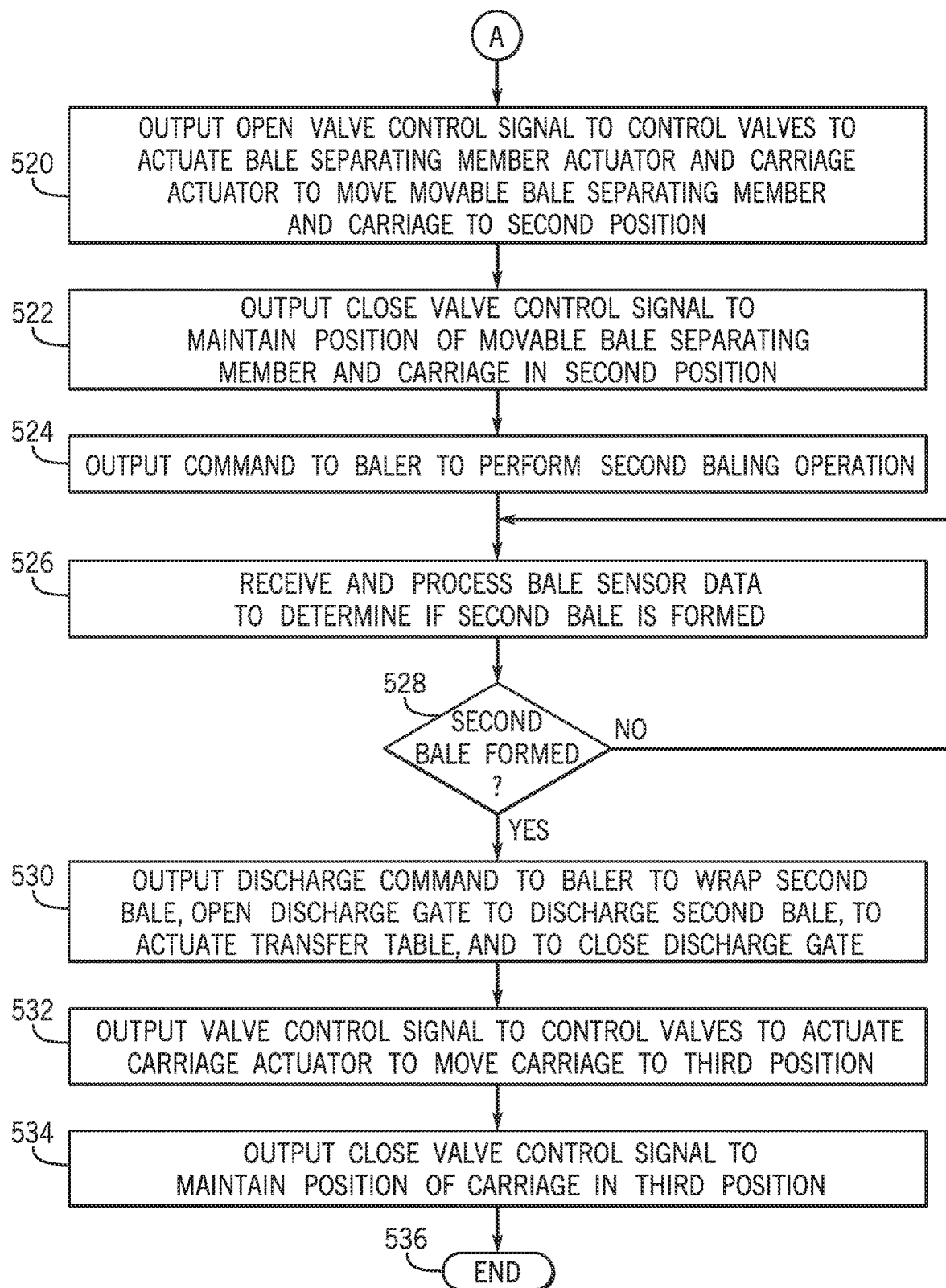

Referring now also to FIGS. 19A and 19B, a flowchart illustrates a method 500 that may be performed by the accumulation system controller 322 of FIG. 10 for use with the embodiments of FIGS. 12-18. The movement of the front rail 74 described above is not included in the flowchart, but appropriate steps would be provided for the movement of the front rail 74. As can be appreciated in light of the disclosure, the order of operation within the method 500 is not limited to the sequential execution as illustrated in FIGS. 19A and 19B, but may be performed in one or more varying orders as applicable and in accordance with the present disclosure.

In one example, the method 500 begins at step 502. At step 504, the method 500 determines whether bale input data 332 has been received, via the operator's manipulation of the human-machine or operator interface 230. If no, then at step 506, the method 500 loops to start step 502. If yes, the method 500 proceeds to step 506, and determines whether the bale separating member 90 and the carriage 54 are in the first position (by processing the input position sensor data 340). If no, then at step 508, the method 500 outputs the open valve control signal 342 to move the bale separating member 90 and the carriage 54 to the first position and then returns to step 506. If yes, the method 500 proceeds to step 510.

At step 510, the method 500 outputs the close valve control signal 344 to the control valves 226 to close the control valves 226 to maintain the first position of the bale separating member 90 and the carriage 54.

At 512, the method 500 outputs the first bale request 334 to the ECU of the baler 22 to start the first baling operation to form the first bale B1. At step 514, the method 500 receives and processes the sensor data 336 and determines if the first bale B1 is fully formed in the bale forming chamber 34. At step 516, the method 500 determines whether the first bale B1 is fully formed in the bale forming chamber 34. If no, the method 500 loops to step 514. If yes, the method 500 proceeds to 518. At step 518, the method 500 outputs the discharge command 348 to the baler 22.

The method 500 then proceeds to step 520. At step 520, the method 500 outputs the one or more open valve control signals 342 to move the bale separating member 90 and the carriage 54 from the first position to the second position.

At step 522, the method 500 outputs the close valve control signal 344 to the control valves 226 to close the control valves 226 to maintain the second position of the bale separating member 90 and the carriage 54.

At step 524, the method 500 outputs the outputs the second bale request 352 to the baler 22 to commence forming the second bale B2. It is to be understood that step 524 can be performed immediately after step 518. At step 526, the method 500 receives and processes the sensor data 336 and determines if the second bale B2 is fully formed in the bale forming chamber 34. At step 528, the method 500 determines whether the second bale B2 is fully formed in the bale forming chamber 34. If no, the method 500 loops to step 526. If yes, the method 500 proceeds to step 530. At step 530, the method 500 outputs the discharge command 348 to the baler 22.

The method 500 then proceeds to step 532. At step 532, the method 500 outputs the one or more open valve control signals 342 to move the bale separating member 90 and the carriage 54 from the second position to the third position.

At step 534, the method 500 outputs the close valve control signal 344 to the control valves 226 to close the control valves 226 to maintain the third position of the bale separating member 90 and the carriage 54.

At step 536, the method 500 ends.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be accepted onto the accumulator 20.

In FIGS. 20-26, a third embodiment of the actuating mechanism 2056 for use with the accumulation control system 220 is shown. Unless otherwise noted, the actuating mechanism 1056 may have elements similar to those discussed above with reference to actuating mechanism 56. The actuating mechanism 2056 includes a bale separating member 2090 fixedly coupled to the carriage 54, and a carriage pusher 2110 coupled to a carriage actuator 2112. The front and rear rails 74, 76 are not shown in FIGS. 21-26 for clarity.

The bale separating member 2090 includes a flange coupled to the upper surface of the platform 68 and which extends upwardly from the platform 68. In FIGS. 20-26, the two rails 68a, 68b which form the platform 68 can be replaced by a single plate which extends between the side walls 70, 72. The bale separating member 2090 divides the crop package carrying area 78 into the into first and second bale receiving areas 78a, 78b. In an embodiment, the crop package carrying area 78 defines a width which is slightly larger than the width of two bales B1, B2 and a width of the bale separating member 2090.

The carriage actuator 2112 is mounted on the web 66 of the base frame 52. The carriage pusher 2110 is fixedly connected to the carriage actuator 2112 and to the underside of the carriage 54. The carriage 54 and the attached fixed bale separating member 2090 can be laterally slid relative to the base frame 52 by the carriage actuator 2112 in the directions 84, 86. In an embodiment, the carriage actuator 2112 includes a hydraulic cylinder 2116 having an extendable and retractable piston rod 2116a mounted in a housing 2116b. The hydraulic cylinder 2116 is fluidly coupled to the hydraulic system of the baler 22. For example, the carriage actuator 2112 may include one or more hydraulic lines that connect the hydraulic cylinder 2116 with the hydraulic supply. One or more electro-hydraulic control valves of the hydraulic system of the baler 22 may be in fluid communication with the carriage actuator 2112 and electrically activated according to signals that control the flow of hydraulic fluid between the hydraulic supply and the hydraulic cylinder 2116. The hydraulic cylinder 2116 is responsive to the hydraulic fluid received from the hydraulic system to move the carriage actuator 2112. In an embodiment, the carriage actuator 2112 includes a worm gear or a rack and pinion system which is attached to the carriage 54. As shown, extension of the carriage actuator 2112 moves the carriage pusher 2110 and the carriage 54 in the first direction 84, and retraction of the carriage actuator 2112 moves the carriage pusher 2110 and the carriage 54 in the second direction 86. The carriage actuator 2122 can be flipped so that retraction of the carriage actuator 2112 moves the carriage pusher 2110 and the carriage 54 in the first direction 84, and extension of the carriage actuator 2112 moves the carriage pusher 2110 and the carriage 54 in the second direction 86. Other actuating mechanisms are within the scope of the present disclosure, provided movement of the carriage 54 relative to the base frame 52 is provided.

Operation of the accumulator 20 is now described with regard to the accumulator 20 receiving two bales B1 and B2. For ease in description, the positioning of the carriage 54 is described to that shown in FIGS. 21-26.

Figure 21:
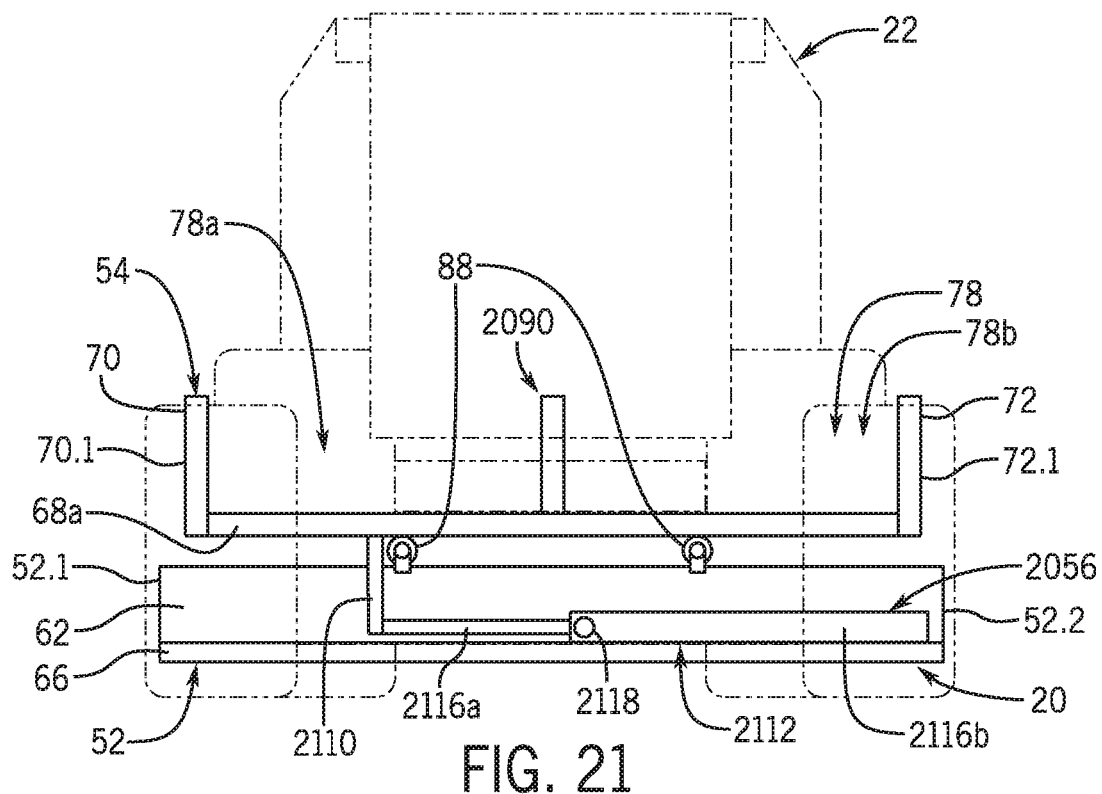
FIGS. 21-26 are rear elevation views showing example positions of the accumulator having the actuating mechanism of FIG. 20 during use.
Figure 22:
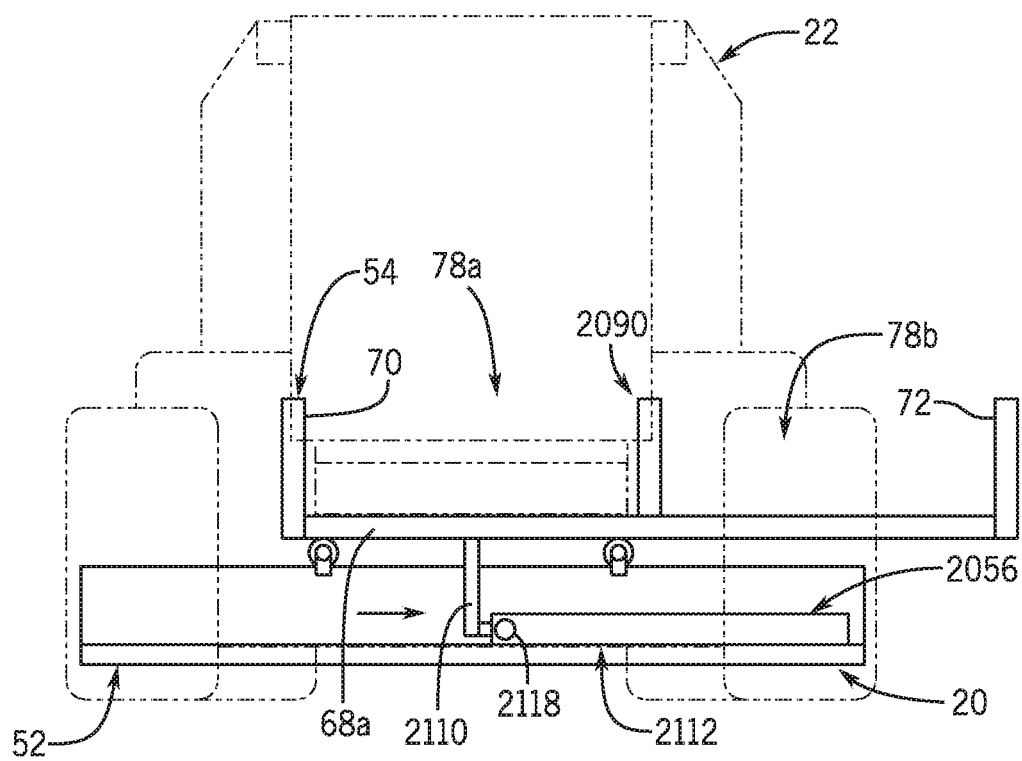
Figure 23:
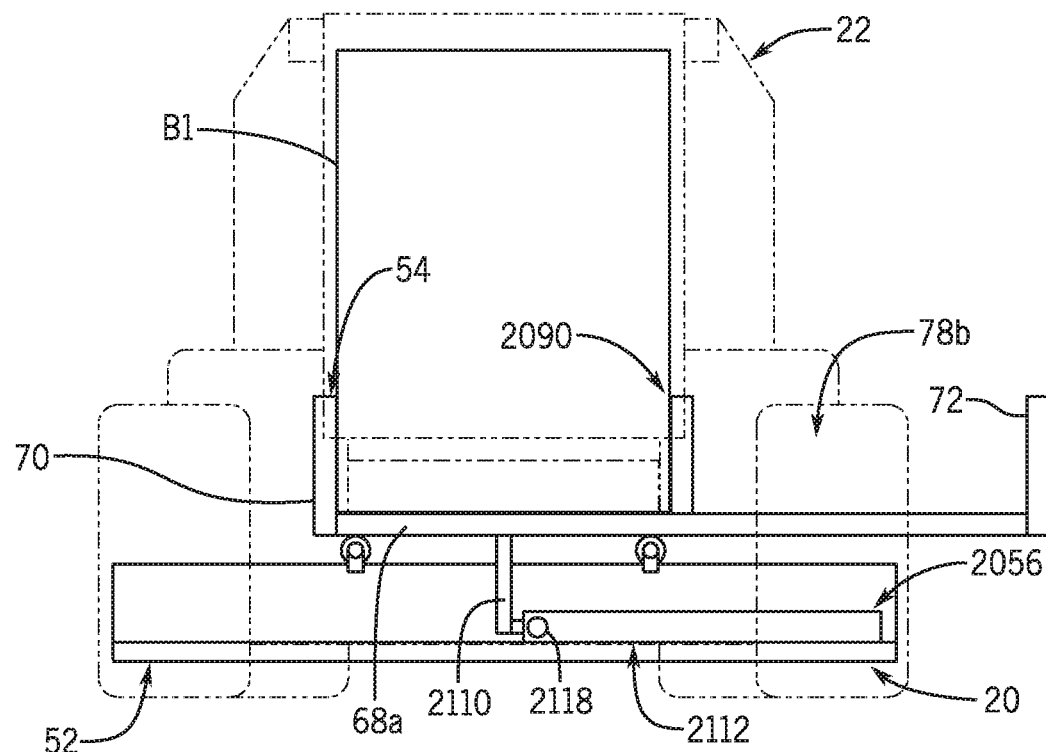

FIG. 21 shows the carriage 54 and the bale separating member 2090 positioned directly behind the baler 22. To receive the first bale B1, initially, as shown in FIG. 22, the carriage 54 and bale separating member 2090 are moved to be positioned a first position relative to the base frame 52 such that the bale separating member 2090 is positioned off to one side of the discharge gate 38 and the carriage 54 is off-center from behind the baler 22. As such, in the first position, the bale separating member 2090 is positioned to the right of the center of the carriage 54 as shown in FIG. 22. The sensor(s) 2118 sense the position of the carriage 54 and thus the bale separating member 2090 relative to the base frame 52. If the carriage 54 is not in the first position, then the carriage actuator 2112 is actuated to move the carriage 54 until the carriage 54 and the bale separating member 2090 are in the first position.

The baler 22 forms a first bale B1 in a manner known in the art, the discharge gate 38 is opened, the front rail 74 is moved downward, the first bale B1 is transferred into the first bale receiving area 78a by the transfer mechanism 50. Once the bale B1 is clear of the discharge gate 38, the discharge gate 38 is closed and the baler 22 commences forming a second bale B2 in the bale forming chamber 34. The first bale B1 is deposited onto the carriage 54 into the first bale receiving area 78a, see FIG. 23, which is between to the left side of the bale separating member 2090 and the right side of the left side wall 70 of the carriage 54. Thereafter, the front rail 74 is moved upward.

Figure 24:
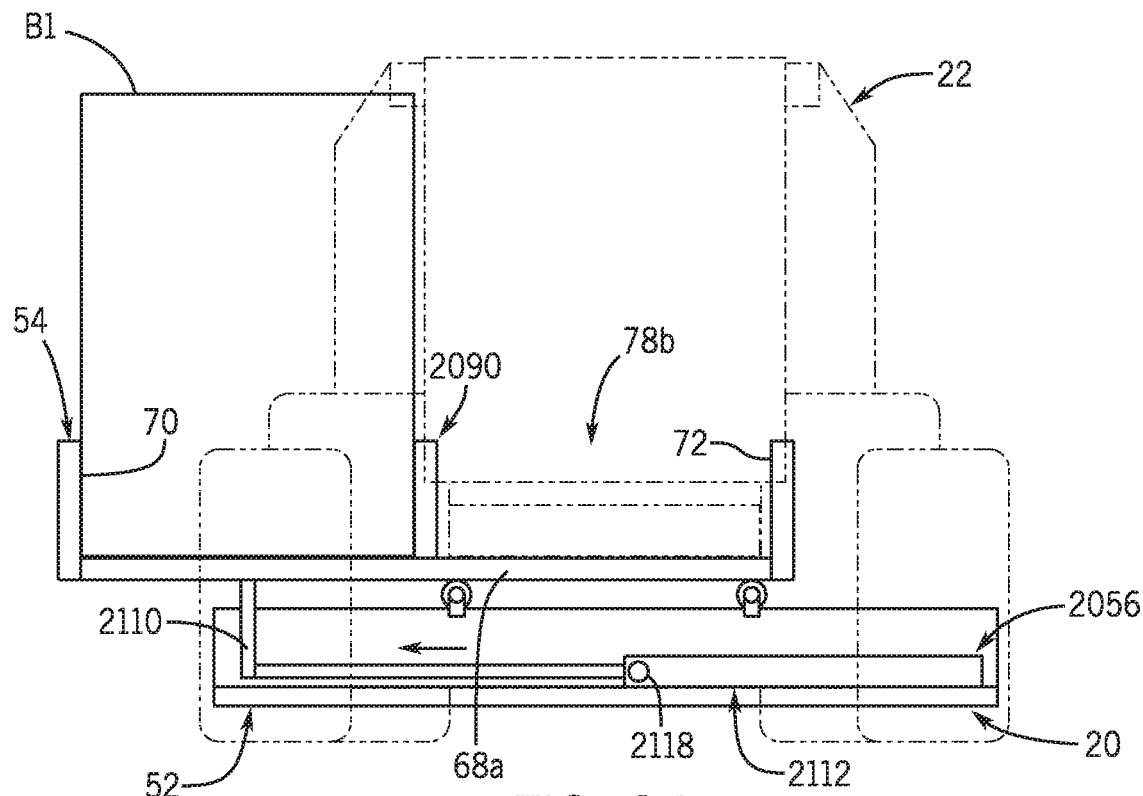

After the bale B1 has been deposited onto the carriage 54 into the first bale receiving area 78a, the carriage actuator 2112 is actuated to cause the carriage 54 to move laterally to the left in the first direction 84 relative to the base frame 52 as shown in FIG. 24. This lateral movement is continued until the bale separating member 2090 is positioned at a second position which is on the left side of the discharge gate 38, and the second bale receiving area 78b is rearward of the discharge gate 38. The carriage 54 is moved until the bale separating member 2090 is positioned laterally outwardly of where a second bale B2 is discharged from the discharge gate 38. The sensor(s) 2118 sense the position of the carriage pusher 2110 relative to the base frame 52 and when the second position is sensed by the sensor(s) 2118, the carriage actuator 2112 is deactivated so that movement of the carriage 54 is stopped.

Figure 25:
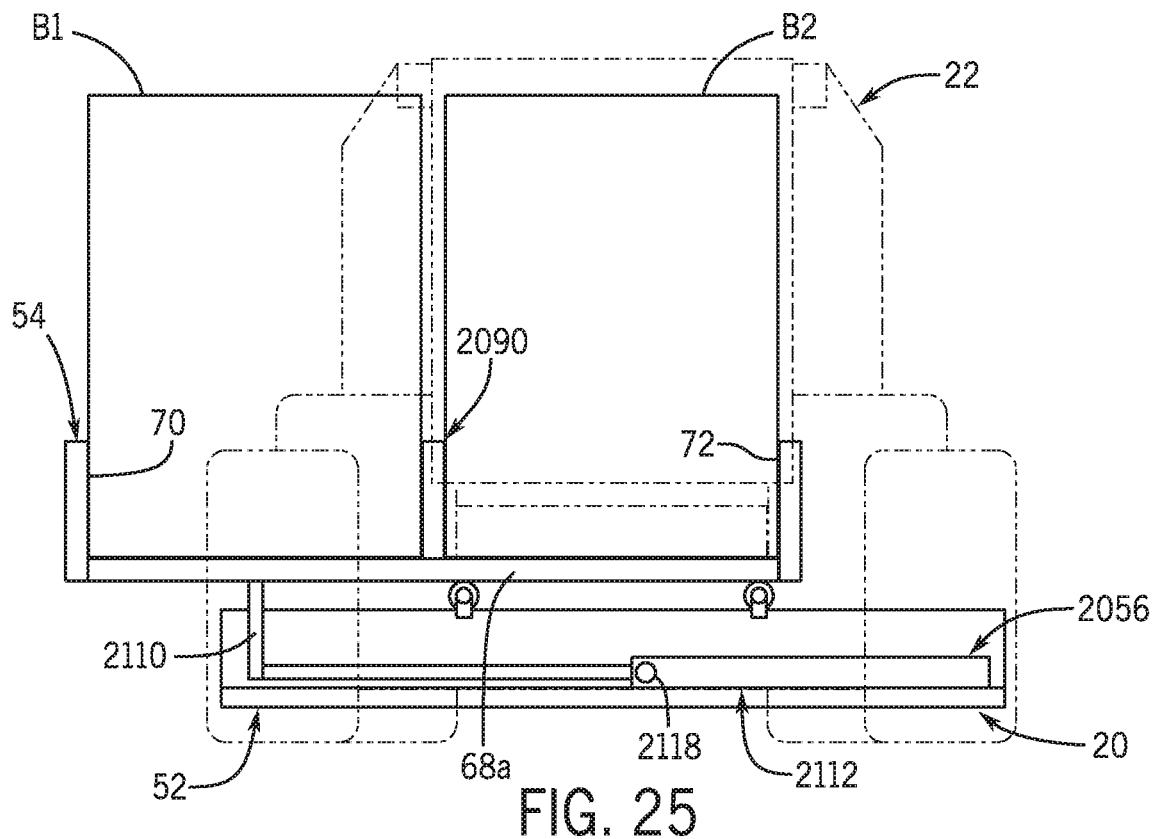

When the second bale B2 is completely formed in the manner known in the art, the discharge gate 38 is opened, the front rail 74 is moved downward, and the second bale B2 is deposited into the second bale receiving area 78b and onto the carriage 54 as shown in FIG. 25. The second bale B2 is deposited onto the carriage 54 such that the second bale B2 is proximate to the right side of the bale separating member 2090 and proximate to the right side wall 72. Thereafter, the front rail 74 is moved upward.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

Figure 26:
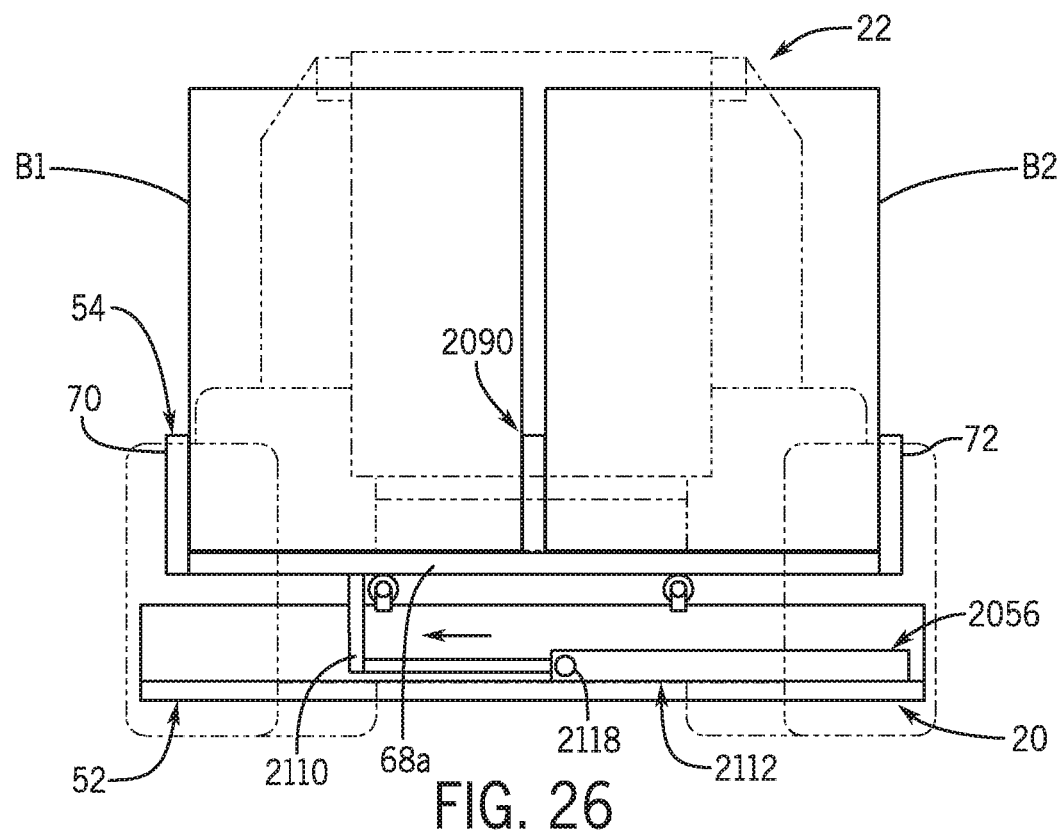
Figure 27:
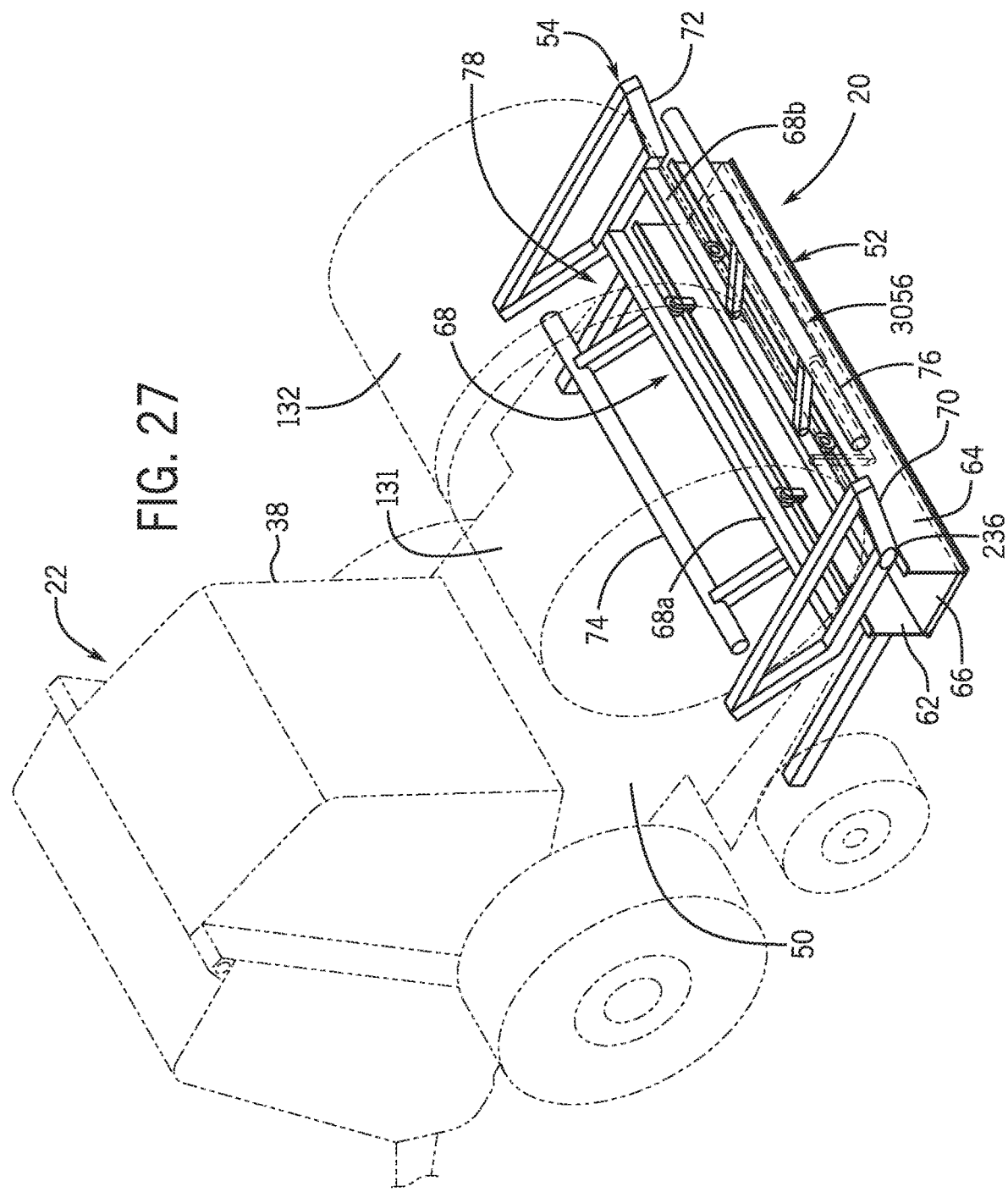
FIG. 27 is a perspective view of the accumulator having an actuating mechanism thereon in accordance with a fourth embodiment, with the baler and bales shown in phantom lines.
Figure 28:
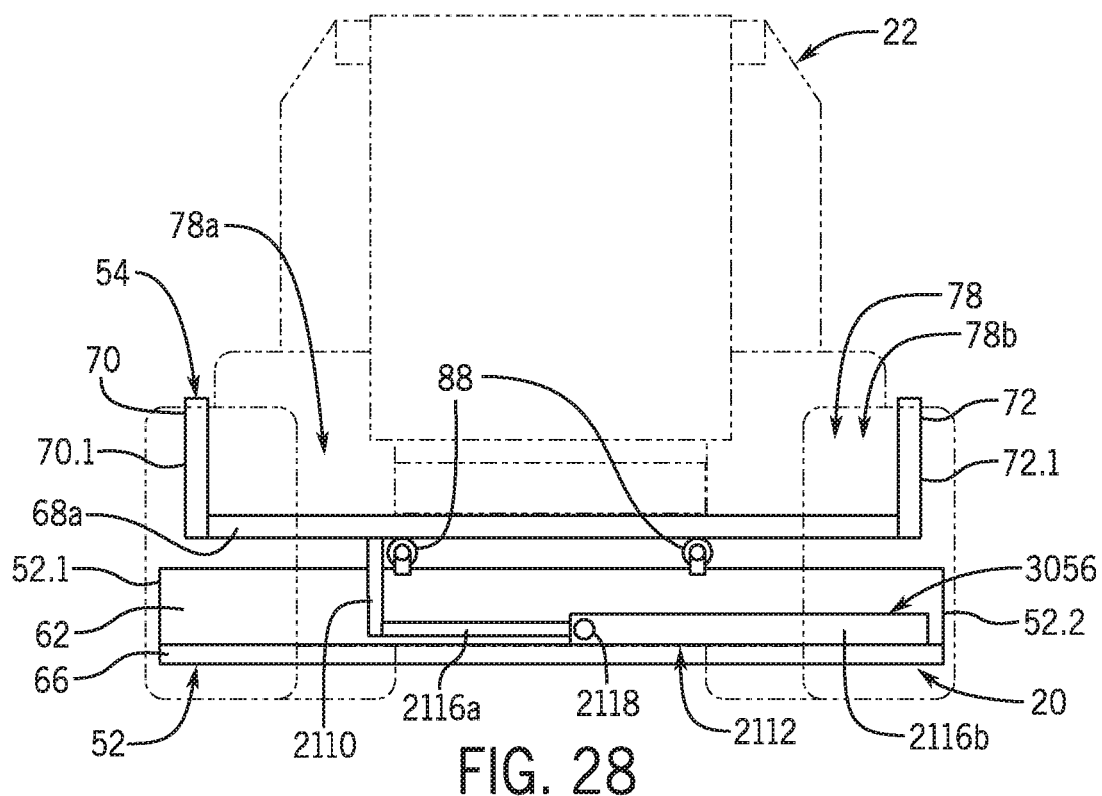
FIGS. 28-33 are rear elevation views showing example positions of the accumulator having the actuating mechanism of FIG. 21 during use.
Figure 29:
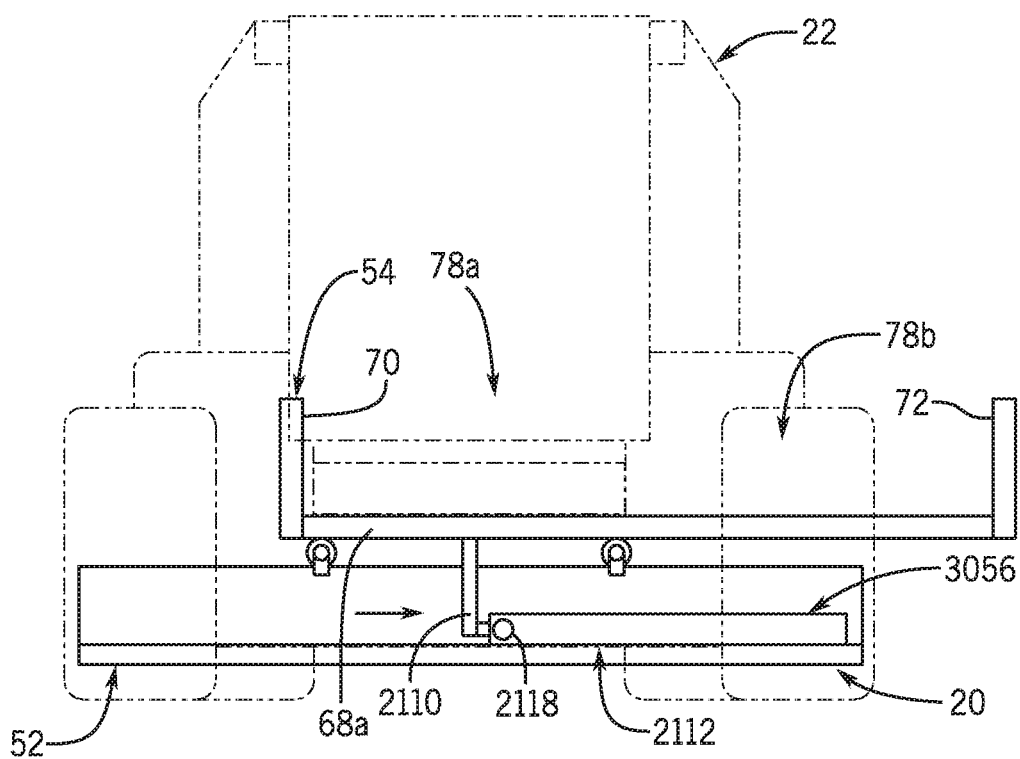
Figure 30:
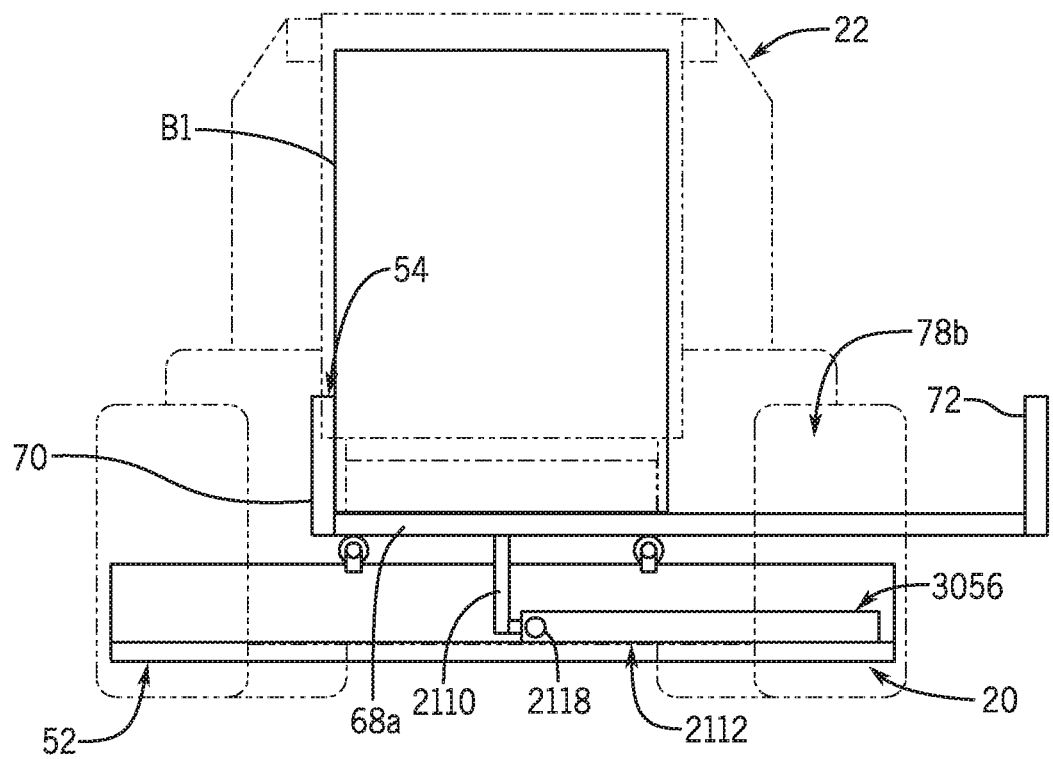
Figure 31:
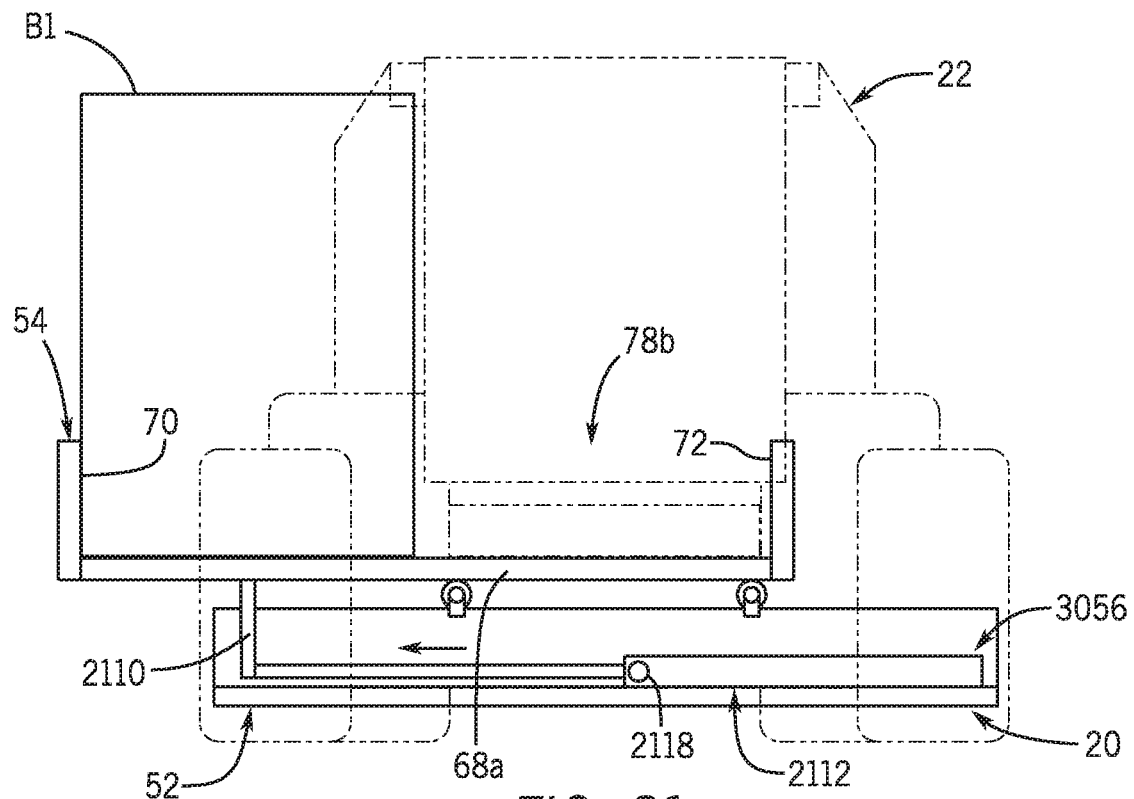
Figure 32:
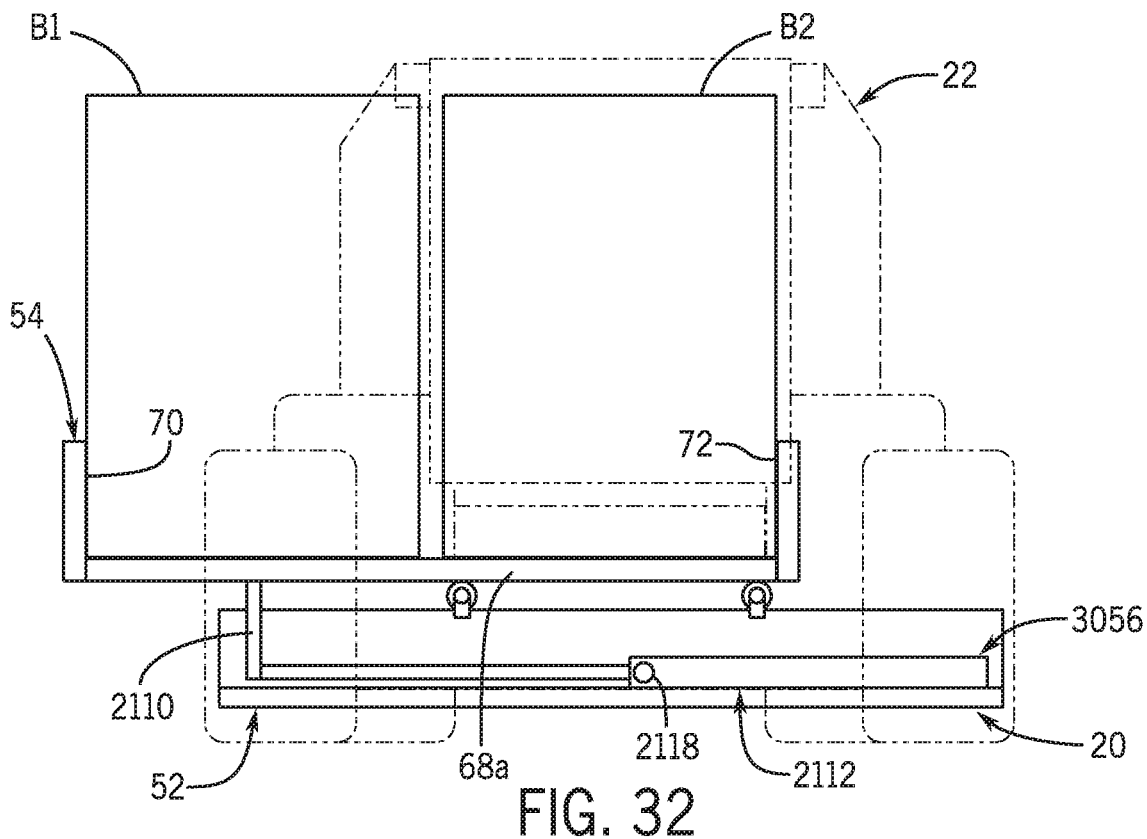
Figure 33:
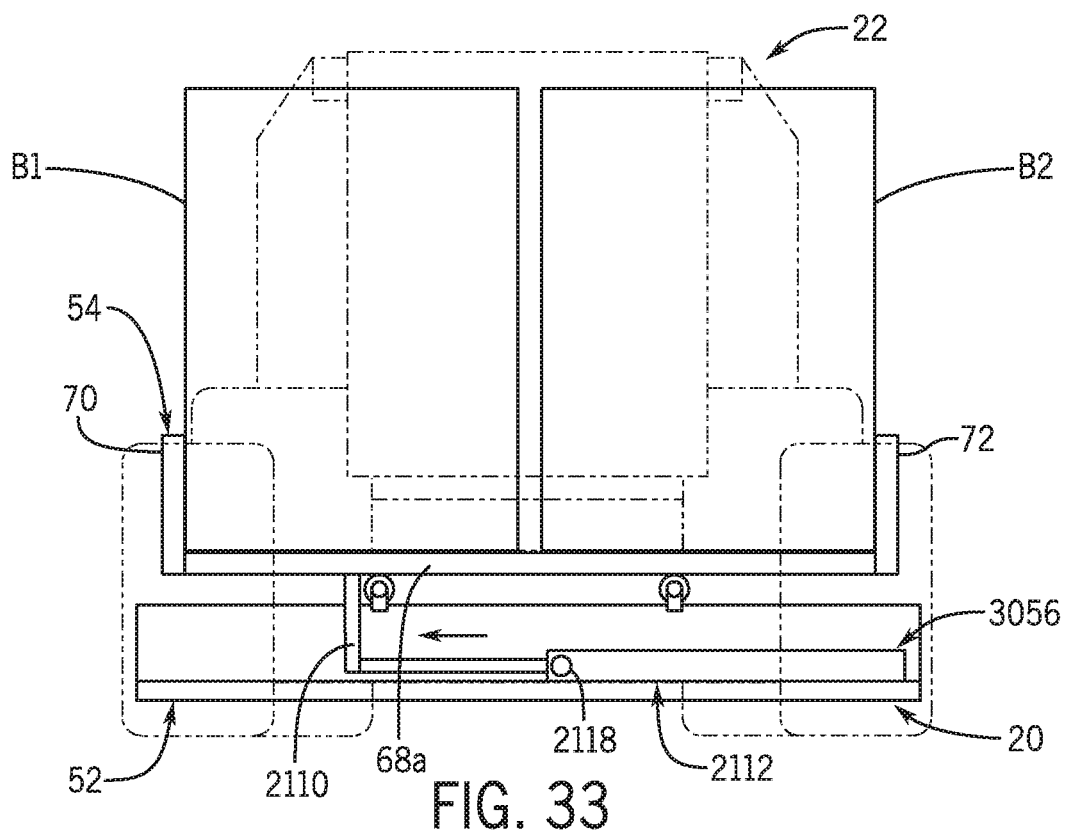
Figure 34A:
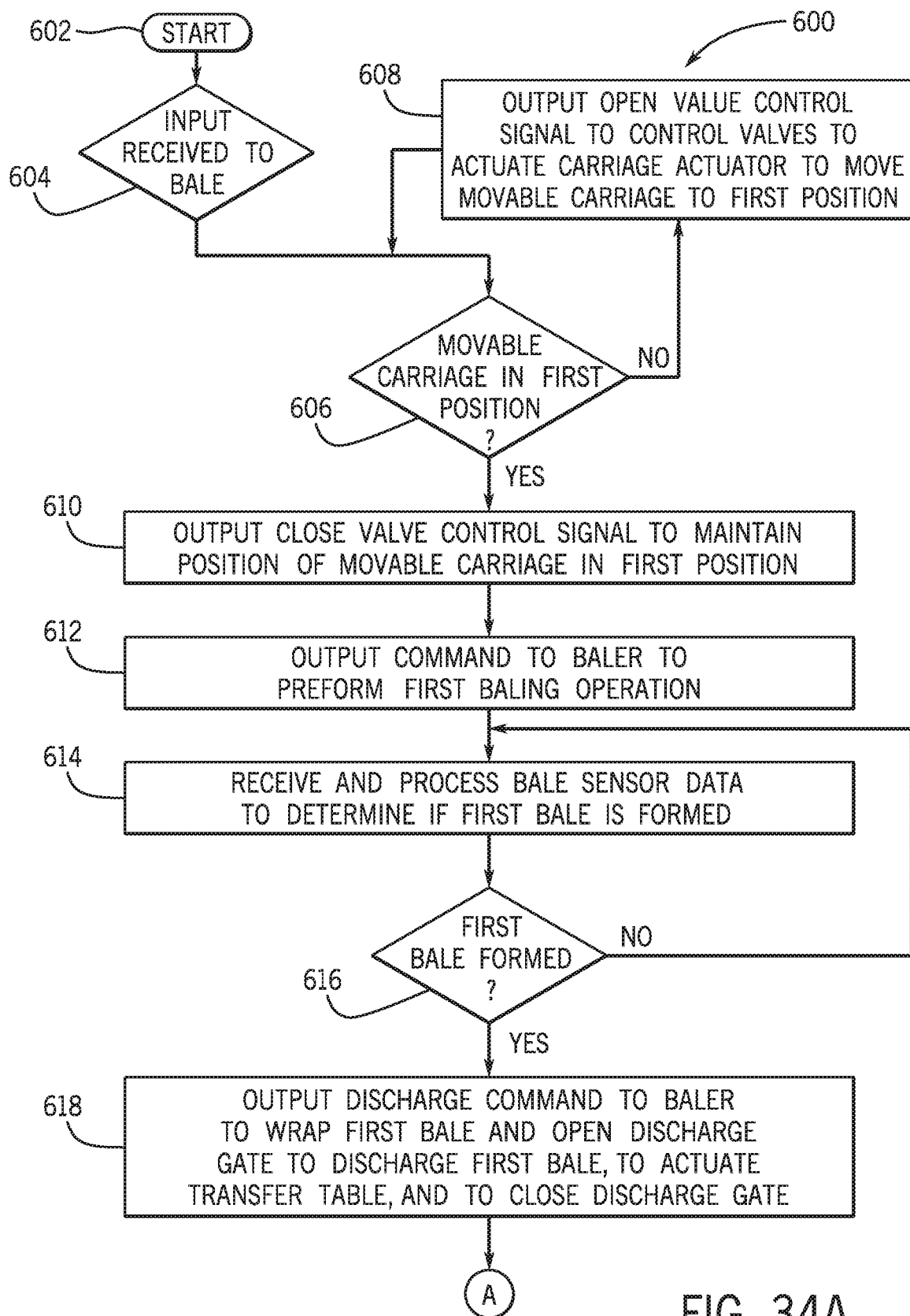
FIGS. 34A and 34B show a flowchart having example steps for use of the accumulator having the actuating mechanism of FIG. 20 or FIG. 27.
Figure 34B:
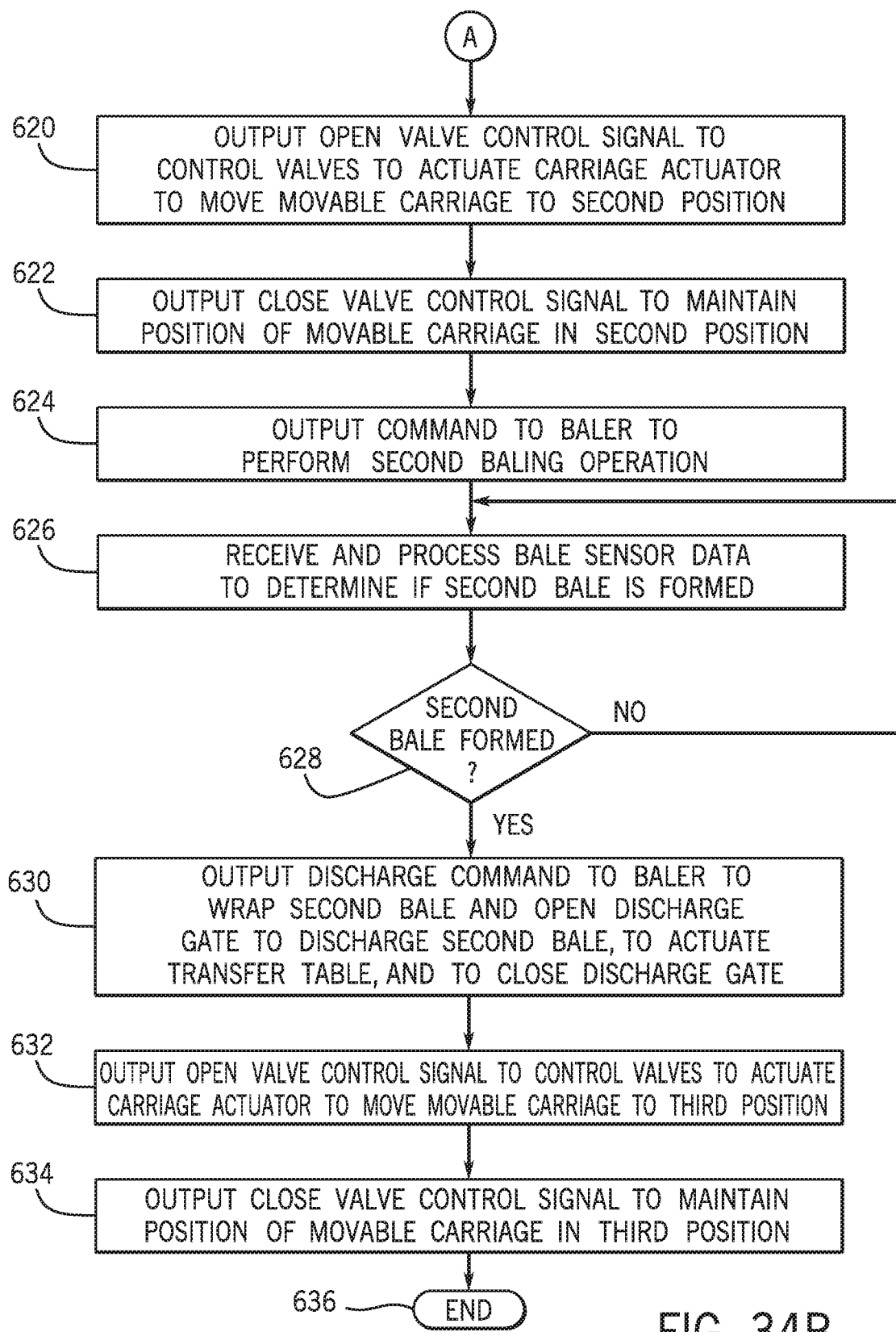

Thereafter, the carriage actuator 2112 is actuated to move the carriage 54 and thus the bale separating member 2090 laterally to the right in the second direction 86 as shown in FIG. 26. This lateral rightward movement is continued until the carriage 54 and the bale separating member 2090 are positioned into a third position which is centered behind the baler 22 as shown in FIG. 26. This will cause the center of gravity of the loaded accumulator 20 to be in line with the center of gravity of the baler 22. The sensor(s) 2118 sense the position of the carriage 54 and thus the bale separating member 2090 relative to the base frame 52 and when the third position is sensed by the sensor(s) 2118, the carriage actuator 2112 is deactivated so that movement of the carriage 54 is stopped. During this movement, the carriage 54 may extend laterally outwardly to one of the sides of the baler 22.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be deposited onto the carriage 54.

When the bales B1, B2 are ready to be discharged from the accumulator 20, the rear rail 76 is moved down and the bales B1, B2 are removed from the carriage 54. In an embodiment, the carriage 54 is pivotably coupled by suitable mechanisms (not shown) to the base frame 52 such that when the carriage 54 is empty, partially loaded, or fully loaded, the carriage 54 can be tilted rearward to discharge the bales B1, B2 to the ground.

With reference to the dataflow diagram of FIG. 10, the operator interface control module 324 receives input data 332 from an operator's manipulation of the operator interface 230 that comprises input that indicates an operator's desire to form the bales B1, B2 with the baler 22.

The operator interface control module 324 interprets the input data 332. If the input data 332 indicates that the operator desires to bale crop, the operator interface control module 324 sets a first bale request 334 for the appropriate module or system of the baler 22, the actuator control module 328 and the baler interface module 330 to initiate a first bale routine. The first bale request 334 is a notification that the operator desires to form and accumulate bales on the accumulator 20. The first bale routine includes forming the first bale B1; receiving, by the accumulation system controller 322, position signals from the sensor 2118 associated with the position of the carriage 54 and the affixed bale separating member 2090; determining, by the accumulation system controller 322, whether the first bale receiving area 78a of the carriage 54 is located behind the discharge gate 38; and when the first bale receiving area 78a of the carriage 54 is determined not to be located behind the discharge gate 38, moving, by the accumulation system controller 322 controlling the carriage actuator 2112, the carriage 54 and the affixed bale separating member 2090 into the first position by moving the carriage 54 relative to the base frame 52.

In one example, the accumulation system controller 322 may receive a signal from the appropriate system of the baler 22 that indicates when the first bale B1 is fully formed in the bale forming chamber 34 as a wrap and discharge notification 338 for the baler interface module 330. Such indications may be based on, for example, sensor signals from sensors 232 on the baler 22. As such, the wrap and discharge notification 338 is provided to the baler interface module 330 and indicates that the first bale B1 in the bale forming chamber 34 is fully formed, and is to be wrapped and discharged.

The actuator control module 328 receives as input position sensor data 340 which indicates the position of the bale separating member 2090. The input position sensor data 340 comprises sensor signals or sensor data received from the sensor 2118. The actuator control module 328 processes the sensor signals from the sensor 2118, determines a current position of the bale separating member 2090, and sets the position of the carriage 54 and the bale separating member 2090 to the first position. In various embodiments, the actuator control module 328 compares the desired position to the current position, and if the current position is not equal to the desired position, the actuator control module 328 outputs open valve control signal 342. The open valve control signal 342 comprise a control signal for the control valves 226 to open to the first, open position to drive the carriage actuator 2112 to move the movable carriage 54 and the affixed bale separating member 2090. Based on the outputting of the open valve control signal 342, the actuator control module 328 receives as input or resamples the input position sensor data 340. Based on the input position sensor data 340, the actuator control module 328 determines a current position of the movable carriage 54 and the affixed bale separating member 2090. If the current position of the movable carriage 54 and the affixed bale separating member 2090 is not equal to the desired position (set based on the input position sensor data 340), the actuator control module 328 moves the movable carriage 54 and the affixed bale separating member 2090 and continues to monitor or determine the current position of the movable carriage 54 and the affixed bale separating member 2090 until the current position of the movable carriage 54 and the affixed bale separating member 2090 is substantially equal to the desired position. Once the current position of the movable carriage 54 and the affixed bale separating member 2090 is equal to the desired position, the actuator control module 328 outputs close valve control signal 344. The close valve control signal 344 comprise control signal for the control valves 226 to move to the third, closed position to close to maintain the position of the movable carriage 54 and the affixed bale separating member 2090 in the first position. Once the current position of the movable carriage 54 and the affixed bale separating member 2090 is equal to the first position, the actuator control module 328 sets an actuator position notification 346 for the baler interface module 330. The actuator position notification 346 indicates that the movable carriage 54 and the affixed bale separating member 2090 is in the first position and ready to receive the first bale B1 from the baler 22.

The baler interface module 330 receives as input the wrap and discharge notification 338 from the baler 22. Based on the wrap and discharge notification 338, the baler interface module 330 determines whether the actuator position notification 346 has been received that indicates that the movable carriage 54 and the affixed bale separating member 2090 is in the first position. If true, the baler interface module 330 outputs a discharge command 348. The discharge command 348 is a command that is output to the appropriate system of the baler 22 to command the baler 22 to activate the wrap feed and cut-off system of the baler 22 to apply wrap material about the first bale B1 in the bale forming chamber 34, open the discharge gate 38 and discharge the first bale B1 from the bale forming chamber, actuate the transfer mechanism 50 to move the first bale B1 into the carriage 54 after the first bale B1 has been wrapped and discharged, and close the discharge gate 38. After the first bale B1 is discharged from the baler 22, the discharge gate 38 is closed, and the baler 22 initiates the formation of the second bale B2 in the bale forming chamber 34.

After the first bale B1 is received on the carriage 54, the baler interface module 330 outputs a second bale request 352 to the actuator control module 328 to initiate a second bale routine. The second bale routine includes forming the second bale B2; receiving, by the accumulation system controller 322, position signals from the sensor 2118 associated with the position of the carriage 54 and the affixed bale separating member 2090; determining, by the accumulation system controller 322, whether the second bale receiving area 78b of the carriage 54 is located behind the discharge gate 38; and when the second bale receiving area 78b of the carriage 54 is determined not to be located behind the discharge gate 38, moving, by the accumulation system controller 322 controlling the carriage actuator 2112, the carriage 54 and the affixed bale separating member 2090 into the second position by moving the carriage 54 relative to the base frame 52.

In one example, the accumulation system controller 322 may receive a signal from an appropriate system of the baler 22 that indicates that the second bale B2 is fully formed in the bale forming chamber 34, again as the wrap and discharge notification 338. As such, the wrap and discharge notification 338 indicates that the second bale B2 in the bale forming chamber 34 is fully formed, and is to be wrapped and discharged.

The actuator control module 328 processes the sensor signals from the sensor 2118, determines a current position of the movable carriage 54 and the affixed bale separating member 2090, and sets the position of the bale separating member 2090 to the second position. Once the current position of the movable carriage 54 and the affixed bale separating member 2090 is equal to the second position, the actuator control module 328 sets the actuator position notification 346 for the baler interface module 330. The actuator position notification 346 indicates that the movable carriage 54 and the affixed bale separating member 2090 is in the second position and ready to receive the second bale B2 from the baler 22.

As noted above, based on the wrap and discharge notification 338, the baler interface module 330 determines whether the actuator position notification 346 has been received that indicates that the movable carriage 54 and the affixed bale separating member 2090 is in the second position. If true, the baler interface module 330 outputs the discharge command 348. The discharge command 348 is a command that is output to the ECU of the baler 22 to command the baler 22 to activate the wrap feed and cut-off system of the baler 22 to apply wrap material about the second bale B2 in the bale forming chamber 34, open the discharge gate 38 and discharge the second bale B2 from the bale forming chamber, actuate the transfer mechanism 50 to move the second bale B2 into the carriage 54 after the second bale B2 has been wrapped and discharged, and close the discharge gate 38. After the second bale B2 is discharged from the baler 22, the discharge gate 38 is closed, and the baler 22 awaits the next command from the user.

In an embodiment, after the second bale B2 is received on the carriage 54, the baler interface module 330 outputs a received bales notification. The bales received notification is sent to the actuator control module 328 which commands the actuator control module 328 to move the movable carriage 54 and the affixed bale separating member 2090 to the third position. The actuator control module 328 processes the sensor signals from the sensor 2118, determines a current position of the movable carriage 54 and the affixed bale separating member 2090, and sets the position of the bale separating member 2090 to the third position. The received bales notification 354 may be sent to the operator interface 230 to indicate to the operator that the bales B1, B2 are on the accumulator 20 and further action is ready to be taken, such as a command to tip the accumulator 20 to dump or deposit the bales B1, B2 onto the ground so that another baling operation can take place.

In an embodiment, after the first bale B1 is received on the carriage 54, the baler interface module 330 outputs a centering notification to the actuator control module 328. In response, the actuator control module 328 commands the actuator control module 328 to move the movable carriage 54 and the affixed bale separating member 2090 to the third position. When the wrap and discharge notification 338 is received indicating that the first bale B1 is formed, the baler interface module 330 outputs a second position notification to the actuator control module 328 which commands the actuator control module 328 to move the movable carriage 54 and the affixed bale separating member 2090 to the second position prior to receipt of the second bale B2 on the accumulator 20.

In some embodiments, the gate sensor 234 is configured to detect the position of the discharge gate 38; and the accumulation system controller 322 is configured to initiate each of the first bale routine and the second bale routine upon the accumulation system controller 322 receiving input signals from the gate sensor 234 that the discharge gate 38 is open or opening.

In a further embodiment, the accumulation control system 220 includes a tilt sensor 236 for detecting a roll angle of the accumulator 20 and/or the baler 22, for example when the accumulator 20 is traverses an inclined surface. The accumulation system controller 322 initiates a tilt compensation routine in which the controller 238 receives position signals from the sensor 2118; receives tilt signals from the tilt sensor 236; determines, based on the position and tilt signals, whether one or more of the first bale and the second bale should be positioned at an uphill side of the accumulator; and moves one or more of the first bale B1 and the second bale B2 to the uphill side of the accumulator 20 by controlling the bale separating member actuator 92 to move the carriage 54 relative to the base frame 52.

In FIGS. 27-33, a fourth embodiment of the actuating mechanism 3056 for use with the accumulation control system 220 is shown. Unless otherwise noted, the actuating mechanism 1056 may have elements similar to those discussed above with reference to actuating mechanism 56. The actuating mechanism 3056 is identical to the actuating mechanism 2056, except that the bale separating member 2090 has been eliminated. Therefore, like reference numerals are used to denote like elements. The front and rear rails 74, 76 are not shown in FIGS. 27-33 for clarity.

In FIGS. 27-33, the two rails 68a, 68b which form the platform 68 can be replaced by a single plate which extends between the side walls 70, 72. In an embodiment, the crop package carrying area 78 defines a width which is slightly larger than the width of two bales B1, B2. Alternatively, the crop package carrying area 78 defines a width which is slightly larger than the width of two bales B1, B2 and a width of a space which may be equal to the bale separating member 2090 of FIGS. 20-26.

The carriage actuator 2112 is mounted on the web 66 of the base frame 52. The carriage pusher 2110 is fixedly connected to the carriage actuator 2112 and to the underside of the carriage 54. The carriage 54 can be laterally slid relative to the base frame 52 by the carriage actuator 2112 in the directions 84, 86. In an embodiment, the carriage actuator 2112 includes a hydraulic cylinder 2116 having an extendable and retractable piston rod 2116a mounted in a housing 2116b. The hydraulic cylinder 2116 is fluidly coupled to the hydraulic system of the baler 22. For example, the carriage actuator 2112 may include one or more hydraulic lines that connect the hydraulic cylinder 2116 with the hydraulic supply. One or more electro-hydraulic control valves of the hydraulic system of the baler 22 may be in fluid communication with the carriage actuator 2112 and electrically activated according to signals that control the flow of hydraulic fluid between the hydraulic supply and the hydraulic cylinder 2116. The hydraulic cylinder 2116 is responsive to the hydraulic fluid received from the hydraulic system to move the carriage actuator 2112. In an embodiment, the carriage actuator 2112 includes a worm gear or a rack and pinion system which is attached to the carriage 54. As shown, extension of the carriage actuator 2112 moves the carriage pusher 2110 and the carriage 54 in the first direction 84, and retraction of the carriage actuator 2112 moves the carriage pusher 2110 and the carriage 54 in the second direction 86. The carriage actuator 2122 can be flipped so that retraction of the carriage actuator 2112 moves the carriage pusher 2110 and the carriage 54 in the first direction 84, and extension of the carriage actuator 2112 moves the carriage pusher 2110 and the carriage 54 in the second direction 86. Other actuating mechanisms are within the scope of the present disclosure, provided movement of the carriage 54 relative to the base frame 52 is provided.

Sensor(s) 2118 are provided on the carriage actuator 2112 or on the base frame 52 which sense the position of the carriage pusher 2110 relative to the base frame 52.

Operation of the accumulator 20 is now described with regard to the accumulator 20 receiving two bales B1 and B2. For ease in description, the positioning of the carriage 54 is described to that shown in FIGS. 21-26.

FIG. 21 shows the carriage 54 positioned directly behind the baler 22. To receive the first bale B1, initially, as shown in FIG. 22, the carriage 54 is moved to be positioned a first position relative to the base frame 52 such that the carriage 54 is off-center from behind the baler 22. The sensor(s) 2118 sense the position of the carriage 54 relative to the base frame 52. If the carriage 54 is not in the first position, then the carriage actuator 2112 is actuated to move the carriage 54 until the carriage 54 is in the first position.

The baler 22 forms a first bale B1 in a manner known in the art, the discharge gate 38 is opened, the front rail 74 is moved downward, the first bale B1 is transferred into the first bale receiving area 78a by the transfer mechanism 50. Once the bale B1 is clear of the discharge gate 38, the discharge gate 38 is closed and the baler 22 commences forming a second bale B2 in the bale forming chamber 34. The first bale B1 is deposited onto the carriage 54 into the first bale receiving area 78a, see FIG. 29, which is proximate to the right side of the left side wall 70 of the carriage 54. Thereafter, the front rail 74 is moved upward.

After the bale B1 has been deposited onto the carriage 54 into the first bale receiving area 78a, the carriage actuator 2112 is actuated to cause the carriage 54 to move laterally to the left in the first direction 84 relative to the base frame 52 as shown in FIG. 24. This lateral movement is continued until the second bale receiving area 78b is rearward of the discharge gate 38. The sensor(s) 2118 sense the position of the carriage pusher 2110 relative to the base frame 52 and when the second position is sensed by the sensor(s) 2118, the carriage actuator 2112 is deactivated so that movement of the carriage 54 is stopped.

When the second bale B2 is completely formed in the manner known in the art, the discharge gate 38 is opened, the front rail 74 is moved downward, and the second bale B2 is deposited into the second bale receiving area 78b and onto the carriage 54 as shown in FIG. 25. The second bale B2 is deposited onto the carriage 54 such that the second bale B2 is proximate to the right side wall 72. Thereafter, the front rail 74 is moved upward.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

Thereafter, the carriage actuator 2112 is actuated to move the carriage 54 laterally to the right in the second direction 86 as shown in FIG. 26. This lateral rightward movement is continued until the carriage 54 is positioned into a third position which is centered behind the baler 22 as shown in FIG. 26. This will cause the center of gravity of the loaded accumulator 20 to be in line with the center of gravity of the baler 22. The sensor(s) 2118 sense the position of the carriage 54 relative to the base frame 52 and when the third position is sensed by the sensor(s) 2118, the carriage actuator 2112 is deactivated so that movement of the carriage 54 is stopped. During this movement, the carriage 54 may extend laterally outwardly to one of the sides of the baler 22.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be deposited onto the carriage 54.

When the bales B1, B2 are ready to be discharged from the accumulator 20, the rear rail 76 is moved down and the bales B1, B2 are removed from the carriage 54. In an embodiment, the carriage 54 is pivotably coupled by suitable mechanisms (not shown) to the base frame 52 such that when the carriage 54 is empty, partially loaded, or fully loaded, the carriage 54 can be tilted rearward to discharge the bales B1, B2 to the ground.

With reference to the dataflow diagram of FIG. 10, the operator interface control module 324 receives input data 332 from an operator's manipulation of the operator interface 230 that comprises input that indicates an operator's desire to form the bales B1, B2 with the baler 22.

The operator interface control module 324 interprets the input data 332. If the input data 332 indicates that the operator desires to bale crop, the operator interface control module 324 sets a first bale request 334 for the appropriate module or system of the baler 22, the actuator control module 328 and the baler interface module 330 to initiate a first bale routine. The first bale request 334 is a notification that the operator desires to form and accumulate bales on the accumulator 20. The first bale routine includes forming the first bale B1; receiving, by the accumulation system controller 322, position signals from the sensor 2118 associated with the position of the carriage 54; determining, by the accumulation system controller 322, whether the first bale receiving area 78a of the carriage 54 is located behind the discharge gate 38; and when the first bale receiving area 78a of the carriage 54 is determined not to be located behind the discharge gate 38, moving, by the accumulation system controller 322 controlling the carriage actuator 2112, the carriage 54 into the first position by moving the carriage 54 relative to the base frame 52.

In one example, the accumulation system controller 322 may receive a signal from the appropriate system of the baler 22 that indicates when the first bale B1 is fully formed in the bale forming chamber 34 as a wrap and discharge notification 338 for the baler interface module 330. Such indications may be based on, for example, sensor signals from sensors 232 on the baler 22. As such, the wrap and discharge notification 338 is provided to the baler interface module 330 and indicates that the first bale B1 in the bale forming chamber 34 is fully formed, and is to be wrapped and discharged.

The actuator control module 328 receives as input position sensor data 340 which indicates the position of the carriage 54. The input position sensor data 340 comprises sensor signals or sensor data received from the sensor 2118. The actuator control module 328 processes the sensor signals from the sensor 2118, determines a current position of the carriage 54, and sets the position of the carriage 54 to the first position. In various embodiments, the actuator control module 328 compares the desired position to the current position, and if the current position is not equal to the desired position, the actuator control module 328 outputs open valve control signal 342. The open valve control signal 342 comprise a control signal for the control valves 226 to open to the first, open position to drive the carriage actuator 2112 to move the movable carriage 54. Based on the outputting of the open valve control signal 342, the actuator control module 328 receives as input or resamples the input position sensor data 340. Based on the input position sensor data 340, the actuator control module 328 determines a current position of the movable carriage 54. If the current position of the movable carriage 54 is not equal to the desired position (set based on the input position sensor data 340), the actuator control module 328 moves the movable carriage 54 and continues to monitor or determine the current position of the movable carriage 54 until the current position of the movable carriage 54 is substantially equal to the desired position. Once the current position of the movable carriage 54 is equal to the desired position, the actuator control module 328 outputs close valve control signal 344. The close valve control signal 344 comprise control signal for the control valves 226 to move to the third, closed position to close to maintain the position of the movable carriage 54 in the first position. Once the current position of the movable carriage 54 is equal to the first position, the actuator control module 328 sets an actuator position notification 346 for the baler interface module 330. The actuator position notification 346 indicates that the movable carriage 54 is in the first position and ready to receive the first bale B1 from the baler 22.

The baler interface module 330 receives as input the wrap and discharge notification 338 from the baler 22. Based on the wrap and discharge notification 338, the baler interface module 330 determines whether the actuator position notification 346 has been received that indicates that the movable carriage 54 is in the first position. If true, the baler interface module 330 outputs a discharge command 348. The discharge command 348 is a command that is output to the appropriate system of the baler 22 to command the baler 22 to activate the wrap feed and cut-off system of the baler 22 to apply wrap material about the first bale B1 in the bale forming chamber 34, open the discharge gate 38 and discharge the first bale B1 from the bale forming chamber, actuate the transfer mechanism 50 to move the first bale B1 into the carriage 54 after the first bale B1 has been wrapped and discharged, and close the discharge gate 38. After the first bale B1 is discharged from the baler 22, the discharge gate 38 is closed, and the baler 22 initiates the formation of the second bale B2 in the bale forming chamber 34.

After the first bale B1 is received on the carriage 54, the baler interface module 330 outputs a second bale request 352 to the actuator control module 328 to initiate a second bale routine. The second bale request 352 is a notification that the operator desires to form and accumulate a second bale B2 on the accumulator 20. The second bale routine includes forming the second bale B2; receiving, by the accumulation system controller 322, position signals from the sensor 2118 associated with the position of the carriage 54; determining, by the accumulation system controller 322, whether the second bale receiving area 78b of the carriage 54 is located behind the discharge gate 38; and when the second bale receiving area 78b of the carriage 54 is determined not to be located behind the discharge gate 38, moving, by the accumulation system controller 322 controlling the carriage actuator 2112, the carriage 54 into the second position by moving the carriage 54 relative to the base frame 52.

In one example, the accumulation system controller 322 may receive a signal from an appropriate system of the baler 22 that indicates that the second bale B2 is fully formed in the bale forming chamber 34, again as the wrap and discharge notification 338. As such, the wrap and discharge notification 338 indicates that the second bale B2 in the bale forming chamber 34 is fully formed, and is to be wrapped and discharged.

The actuator control module 328 processes the sensor signals from the sensor 2118, determines a current position of the movable carriage 54, and sets the position of the carriage 54 to the second position. Once the current position of the movable carriage 54 is equal to the second position, the actuator control module 328 sets the actuator position notification 346 for the baler interface module 330. The actuator position notification 346 indicates that the movable carriage 54 is in the second position and ready to receive the second bale B2 from the baler 22.

As noted above, based on the wrap and discharge notification 338, the baler interface module 330 determines whether the actuator position notification 346 has been received that indicates that the movable carriage 54 is in the second position. If true, the baler interface module 330 outputs the discharge command 348. The discharge command 348 is a command that is output to the ECU of the baler 22 to command the baler 22 to activate the wrap feed and cut-off system of the baler 22 to apply wrap material about the second bale B2 in the bale forming chamber 34, open the discharge gate 38 and discharge the second bale B2 from the bale forming chamber, actuate the transfer mechanism 50 to move the second bale B2 into the carriage 54 after the second bale B2 has been wrapped and discharged, and close the discharge gate 38. After the second bale B2 is discharged from the baler 22, the discharge gate 38 is closed, and the baler 22 awaits the next command from the user.

In an embodiment, after the second bale B2 is received on the carriage 54, the baler interface module 330 outputs a received bales notification. The bales received notification is sent to the actuator control module 328 which commands the actuator control module 328 to move the movable carriage 54 to the third position. The actuator control module 328 processes the sensor signals from the sensor 2118, determines a current position of the movable carriage 54, and sets the position of the carriage 54 to the third position. The received bales notification 354 may be sent to the operator interface 230 to indicate to the operator that the bales B1, B2 are on the accumulator 20 and further action is ready to be taken, such as a command to tip the accumulator 20 to dump or deposit the bales B1, B2 onto the ground so that another baling operation can take place.

In an embodiment, after the first bale B1 is received on the carriage 54, the baler interface module 330 outputs a centering notification to the actuator control module 328. In response, the actuator control module 328 commands the actuator control module 328 to move the movable carriage 54 to the third position. When the wrap and discharge notification 338 is received indicating that the first bale B1 is formed, the baler interface module 330 outputs a second position notification to the actuator control module 328 which commands the actuator control module 328 to move the movable carriage 54 to the second position prior to receipt of the second bale B2 on the accumulator 20.

In some embodiments, the gate sensor 234 is configured to detect the position of the discharge gate 38; and the accumulation system controller 322 is configured to initiate each of the first bale routine and the second bale routine upon the accumulation system controller 322 receiving input signals from the gate sensor 234 that the discharge gate 38 is open or opening.

In a further embodiment, the accumulation control system 220 includes a tilt sensor 236 for detecting a roll angle of the accumulator 20 and/or the baler 22, for example when the accumulator 20 is traverses an inclined surface. The accumulation system controller 322 initiates a tilt compensation routine in which the controller 238 receives position signals from the sensor 2118; receives tilt signals from the tilt sensor 236; determines, based on the position and tilt signals, whether one or more of the first bale and the second bale should be positioned at an uphill side of the accumulator; and moves one or more of the first bale B1 and the second bale B2 to the uphill side of the accumulator 20 by controlling the bale separating member actuator 92 to move the carriage 54 relative to the base frame 52.

Referring now also to FIGS. 27A and 27B, a flowchart illustrates a method 600 that may be performed by the accumulation system controller 322 of the controller 228 of FIG. 10 in accordance with the present disclosure for use with the embodiments of FIGS. 20-26. The movement of the front rail 74 described above is not included in the flowchart, but appropriate steps would be provided for the movement of the front rail 74. As can be appreciated in light of the disclosure, the order of operation within the method 600 is not limited to the sequential execution as illustrated in FIGS. 27A and 27B, but may be performed in one or more varying orders as applicable and in accordance with the present disclosure.

In one example, the method 600 begins at step 602. At step 604, the method 600 determines whether bale input data 332 has been received, via the operator's manipulation of the human-machine or operator interface 230. If no, then at step 606, the method 600 loops to start step 602. If yes, the method 600 proceeds to step 606, and determines whether the carriage 54, and thus the bale separating member 90, is in the first position (by processing the input position sensor data 340). If no, then at step 608, the method 600 outputs the open valve control signal 342 to move the carriage 54 and the bale separating member 90 to the first position and then returns to step 606. If yes, the method 600 proceeds to step 610.

At step 610, the method 600 outputs the close valve control signal 344 to the control valves 226 to close the control valves 226 to maintain the first position of the carriage 54 and the bale separating member 90.

At 612, the method 600 outputs the first bale request 334 to the ECU of the baler 22 to start the first baling operation to form the first bale B1. At step 614, the method 600 receives and processes the sensor data 336 and determines if the first bale B1 is fully formed in the bale forming chamber 34. At step 616, the method 600 determines whether the first bale B1 is fully formed in the bale forming chamber 34. If no, the method 600 loops to step 614. If yes, the method 600 proceeds to 618. At step 618, the method 600 outputs the discharge command 348 to the baler 22.

The method 600 then proceeds to step 620. At step 620, the method 600 outputs the one or more open valve control signals 342 to move the carriage 54 and the bale separating member 90 from the first position to the second position.

At step 622, the method 600 outputs the close valve control signal 344 to the control valves 226 to close the control valves 226 to maintain the second position of the carriage 54 and the bale separating member 90.

At step 624, the method 600 outputs the outputs the second bale request 352 to the baler 22 to commence forming the second bale B2. It is to be understood that step 624 can be performed immediately after step 618. At step 626, the method 600 receives and processes the sensor data 336 and determines if the second bale B2 is fully formed in the bale forming chamber 34. At step 628, the method 600 determines whether the second bale B2 is fully formed in the bale forming chamber 34. If no, the method 600 loops to step 626. If yes, the method 600 proceeds to step 630. At step 630, the method 600 outputs the discharge command 348 to the baler 22.

The method 600 then proceeds to step 632. At step 632, the method 600 outputs the one or more open valve control signals 342 to move the carriage 54 and the bale separating member 90 from the second position to the third position.

At step 634, the method 600 outputs the close valve control signal 344 to the control valves 226 to close the control valves 226 to maintain the third position of the carriage 54 and the bale separating member 90.

At step 636, the method 600 ends.

It is to be appreciated that the movement of the carriage 54 relative to the base frame 52 only needs to be affected prior to the depositing of the second bale B2 onto the accumulator 20. Therefore, the movement of the carriage 54 relative to the base frame 52 may be affected immediately after the first bale B1 is deposited onto the carriage 54, or at any time thereafter so long as this occurs prior to the second bale B2 being deposited onto the carriage 54.

If the movement of the carriage 54 relative to the base frame 52 is affected immediately after the first bale B1 is deposited onto the accumulator 20 or at some time thereafter but prior to the second bale B2 being ready to be deposited onto the carriage 54, the carriage 54 may again be moved relative to the base frame 52 to center the carriage 54 behind the baler 22 while the second bale B2 is being formed and thereafter moved based to the second position so that the second bale B2 can be accepted onto the accumulator 20.

In each embodiment, the accumulator 20 is positioned at a distance away from the baler 22 by the transfer mechanism 50 such that the discharge gate 38 of the baler 22 can be opened when a bale B1 or B2 is on the accumulator 20.

In each embodiment, while the accumulator 20 is described with regard to receiving two bales B1 and B2, the accumulator 20 and its control system can be modified to receive more than two bales.

Figure 35:
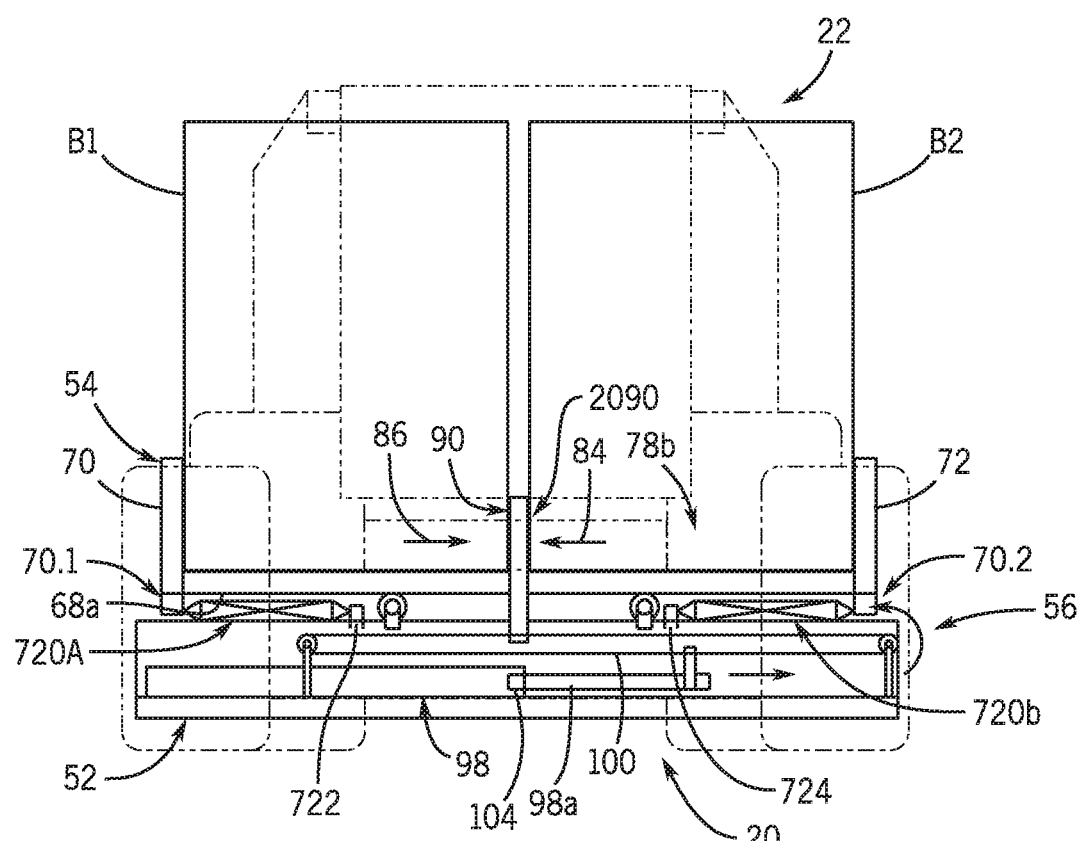
FIG. 35 is a rear elevation view of the accumulator having a modified actuating mechanism.

FIG. 35 shows a modified embodiment of the actuating mechanism 2056. The actuating mechanism 2056 additionally includes at least one biasing member 720a, 720b which provides for automatic centering of the carriage 54 on the base frame 52. As shown, the at least one biasing member is a pair of springs 720a, 720b. Biasing member 720a is connected between an end 70.1 of the carriage side wall 70 and the base frame 52 via a rigid mount 722. Biasing member 720b is connected between an opposite end 70.2 of the carriage side wall 72 and the base frame 52 via a rigid mount 724. When the hydraulic cylinder 98 is pressurized with hydraulic fluid to move the separating member 2090 relative to the carriage 54 in the direction 84, the biasing member 720a expands and the biasing member 720b compresses when a bale B1 is present. If no bale B1 is present, then the carriage 54 remains centered relative to the base frame 52. When the hydraulic cylinder 98 is pressurized with hydraulic fluid to move the separating member 2090 relative to the carriage 54 in the direction 86, when a bale B2 is present, the biasing member 720a compresses and the biasing member 720b expands. If no bale B2 is present, the carriage 54 remains centered relative to the base frame 52. It should be understood that any number of passive devices could be used to hold the carriage 54 centered relative to the base frame 52. An example of an active device would be a hydraulic cylinder 1098 as seen in previous embodiments and in FIG. 15.

Also, the following examples are provided, which are numbered for easier reference.

1. A control system for accumulating bales processed by a baling chamber on an accumulator, the baling chamber and the accumulator configured to move in a direction of travel across a field, the accumulator having a base frame and a carriage laterally movable relative to the base frame, the lateral direction being transverse to the direction of travel, the carriage having a platform and first and second upstanding side walls defining a crop package receiving area therebetween, the control system comprising:
at least one actuator mounted to the base frame and configured to move the carriage relative to the base frame or to move the carriage in response to a bale engaging one of the upstanding side walls, such that the platform and the first and second upstanding side walls are moved laterally relative to the base frame, wherein the crop package receiving area has a fixed lateral width during all movement of the carriage relative to the base frame; at least one sensor configured to detect a position of one or more of the carriage and the at least one actuator relative to the base frame; and a controller, having a processor and memory architecture, configured to receive position signals from the at least one sensor and control the at least one actuator based on the received position signals to move at least the carriage in the lateral direction relative to the base frame to sequentially accumulate multiple bales on the carriage.

2. The control system of example 1,
wherein at least one actuator includes a bale separating member extending into the crop packaging receiving, wherein the controller is configured to initiate a first bale routine which includes:
receiving, by the controller, the position signals from the at least one sensor associated with the position of the bale separating member;
determining, by the controller, whether the bale separating member is located within a first bale receiving area of the crop package carrying area; and
when the bale separating member is determined to be within the first bale receiving area, clearing, by the controller controlling the at least one actuator, the bale separating member from the first bale receiving area by moving one or more of the bale separating member relative to the carriage and the carriage relative to the base frame.

3. The control system of example 2, wherein the first bale routine further includes:
receiving, by the controller, the position signals from the at least one sensor associated with the position of the carriage; and
centering the carriage on the base frame by the controller controlling the at least one actuator to move the carriage relative to the base frame.

4. The control system of example 1,
wherein at least one actuator includes a bale separating member extending into the crop packaging receiving,
wherein the controller is configured to initiate a first bale routine which includes:
receiving, by the controller, position signals from the at least one sensor associated with the bale separating member;
moving the bale separating member to a first side of the crop package carrying area by the controller controlling the at least one actuator to move one or more of the bale separating member relative to the carriage and the carriage relative to the base frame.

5. The control system of example 4, wherein the first bale routine causes the bale separating member to move a first bale deposited in the crop package carrying area relative to the carriage.

6. The control system of example 4, wherein the controller is configured to initiate a second bale routine which includes:
receiving, by the controller, the position signals from the at least one sensor associated with the position of the bale separating member;
determining, by the controller, whether a first bale or the bale separating member is located within the first bale receiving area; and
when the first bale or the bale separating member is determined to be within the first bale receiving area, clearing, by the controller controlling the at least one actuator, the first bale and the bale separating member from the first bale receiving area by moving the carriage relative to the base frame.

7. The control system of example 6, wherein the carriage is moved relative to the base frame by the at least one actuator moving the bale separating member relative to the carrier into engagement with the first bale and then by moving the bale separating member after the first bale is engaged with one of the upstanding side walls of the carriage.

8. The control system of example 7, wherein the at least one sensor includes a tilt sensor for detecting a roll angle of one or more of the accumulator and the agricultural baler; and
wherein controller is configured to initiate a tilt compensation routine in which the controller:
receives position signals from the at least one sensor associated with the position of the carriage;
receives tilt signals associated with the roll angle;

determines, based on the position and tilt signals, whether one or more of the first bale and a second bale should be positioned at an uphill side of the accumulator; and moves one or more of the first bale and second bale to the uphill side of the accumulator by controlling the at least one actuator to move the carriage relative to the base frame.

9. The control system of example 1, wherein the at least one actuator includes a bale separating member extending into the crop packaging receiving, a first actuator coupled to the bale separating member and a second actuator coupled to the carriage;

wherein the bale separating member is movable relative to the carriage; and wherein the controller is configured to control the first actuator to move the bale separating member relative to carriage and to control the second actuator to move the carriage laterally relative to the base frame.

10. The control system of example 1, wherein the at least one actuator includes an actuator coupled to the carriage; and wherein the controller is configured to control the actuator to move the carriage relative to the base frame.

11. The control system of example 10, wherein a bale separating member extends from the platform and into the bale receiving area.

12. A method for sequentially accumulating multiple bales processed by an agricultural baler on an accumulator, the method comprising:

sensing, by a controller receiving position signals from at least one sensor, a position of one or more of a carriage and a bale separating member relative to a base frame, the carriage being laterally movable relative to the base frame, the carriage having a platform and first and second upstanding side walls defining a crop package receiving area therebetween, the bale separating member extending into the crop package receiving area;

actuating, by the controller after processing the received position signals, one or more actuators to move one or more of the bale separating member and the carriage relative to the base frame into position to accept a first bale from the baler with the bale separating member positioned outside of a first bale receiving area of the crop package carrying area; and actuating, by the controller after processing the received position signals, the one or more actuators to move the bale separating member and the carriage relative to the base frame into a position to accept a second bale from the baler in a second bale receiving area of the crop package carrying area with the bale separating member and the first bale outside of the second bale receiving area, wherein the crop package receiving area has a fixed lateral width during all movement of the carriage relative to the base frame.

13. The method of example 12, further comprising:

initiating a first bale routine which includes:

determining, by the controller, whether the bale separating member is located within the first bale receiving area; and when the bale separating member is determined to be within the first bale receiving area, clearing, by the controller controlling the at least one actuator, the bale separating member from the first bale receiving area by moving one or more of the bale separating member relative to the carriage and the carriage relative to the base frame.

14. The method of example 12, further comprising:

initiating a bale index routine which includes moving the bale separating member to move the first bale to a first side of the crop package carrying area by the controller controlling the at least one actuator to move one or more of the bale separating member relative to the carriage and the carriage relative to the base frame.

15. The method of example 14, wherein the bale index routine causes the bale separating member to move a first bale deposited at the crop package carrying area relative to the carriage.

16. The method of example 15, further comprising:

initiating a second bale routine which includes:

determining, by the controller, whether the first bale or the bale separating member is located within the crop package carrying area; and when the first bale or the bale separating member is determined to be within the crop package carrying area, clearing, by the controller controlling the at least one actuator, the first bale and the bale separating member from the second bale receiving area by moving the carriage relative to the base frame.

17. The method of example 16, wherein the carriage is moved across the crop package carrying area relative to the base frame by the at least one actuator first moving the bale separating member relative to the carrier into engagement with the first bale and then by moving the bale separating member after the first bale is engaged with an upstanding end of the carriage.

18. The method of example 17, further comprising:

sensing, by the at least one sensor, a state of a gate of the baler; and initiating each of the first bale routine and the second bale routine upon the controller receiving input signals from the at least one sensor indicating that the baler gate is open or opening.

19. A method for sequentially accumulating multiple bales processed by an agricultural baler on an accumulator, the method comprising:

sensing, by a controller receiving position signals from at least one sensor, a position of one or more of a carriage and at least one actuator relative to a base frame, the carriage being laterally movable relative to the base frame, the carriage having a platform and first and second upstanding side walls defining a crop package receiving area therebetween;

actuating, by the controller after processing the received position signals, one or more actuators to move the carriage relative to the base frame into position to accept a first bale from the baler; and actuating, by the controller after processing the received position signals, the one or more actuators to move the carriage relative to the base frame into a position to accept a second bale from the baler, wherein the crop package receiving area has a fixed lateral width during all movement of the carriage relative to the base frame.

20. The method of example 19, wherein a bale separating member extends from the platform and into the bale receiving area.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Certain terminology may be used in the following description for the purpose of reference only, and thus are not intended to be limiting. For example, terms such as "top", "bottom", "upper", "lower", "above", and "below" could be used to refer to directions in the drawings to which reference is made. Terms such as "front", "back", "rear", "side", "outboard", and "inboard" could be used to describe the orientation and/or location of portions of the component within a consistent but arbitrary base frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for accumulating bales processed by a baling chamber on an accumulator, the baling chamber and the accumulator configured to move in a direction of travel across a field, the accumulator having a base frame and a carriage laterally movable relative to the base frame, the lateral direction being transverse to the direction of travel, the carriage having a platform and first and second upstanding side walls defining a crop package receiving area therebetween sized and configured to receive a bale from the baling chamber, the control system comprising:

at least one actuator mounted to the base frame and configured to move the carriage in response to the bale engaging one of the upstanding side walls, such that the platform and the first and second upstanding side walls are moved laterally relative to the base frame, wherein the carriage has a fixed lateral width and the crop package receiving area has a fixed lateral width during all movement of the carriage relative to the base frame;

at least one sensor configured to detect a position of one or more of the carriage or the at least one actuator relative to the base frame, the at least one actuator including a bale separating member extending into the crop package receiving area; and a controller, having a processor and memory architecture, configured to receive position signals from the at least one sensor and control the at least one actuator based on the received position signals to move at least the carriage in the lateral direction relative to the base frame to sequentially accumulate multiple bales on the carriage, wherein the controller is configured to initiate a first bale routine which includes:

receiving, by the controller, position signals from the at least one sensor associated with the bale separating member;

moving the bale separating member to a first side of the crop package carrying area by the controller controlling the at least one actuator to move one or more of the bale separating member relative to the carriage or the carriage relative to the base frame.

2. The control system of claim 1, wherein the first bale routine further includes:

determining, by the controller, whether the bale separating member is located within a first bale receiving area of the crop package carrying area; and when the bale separating member is determined to be within the first bale receiving area, clearing, by the controller controlling the at least one actuator, the bale separating member from the first bale receiving area by moving one or more of the bale separating member relative to the carriage or the carriage relative to the base frame.

3. The control system of claim 2, wherein the first bale routine further includes:

receiving, by the controller, the position signals from the at least one sensor associated with the position of the carriage; and centering the carriage on the base frame by the controller controlling the at least one actuator to move the carriage relative to the base frame.

4. The control system of claim 1, wherein the first bale routine causes the bale separating member to move a first bale deposited in the crop package carrying area relative to the carriage.

5. The control system of claim 1, wherein the controller is configured to initiate a second bale routine which includes:

receiving, by the controller, the position signals from the at least one sensor associated with the position of the bale separating member;

determining, by the controller, whether a first bale or the bale separating member is located within the first bale receiving area; and when the first bale or the bale separating member is determined to be within the first bale receiving area, clearing, by the controller controlling the at least one actuator, the first bale and the bale separating member from the first bale receiving area by moving the carriage relative to the base frame.

6. The control system of claim 5, wherein the carriage is moved relative to the base frame by the at least one actuator moving the bale separating member relative to the carrier into engagement with the first bale and then by moving the bale separating member after the first bale is engaged with one of the upstanding side walls of the carriage.

7. The control system of claim 6, wherein the at least one sensor includes a tilt sensor for detecting a roll angle of one or more of the accumulator or the agricultural baler; and wherein controller is configured to initiate a tilt compensation routine in which the controller:

receives position signals from the at least one sensor associated with the position of the carriage;

receives tilt signals associated with the roll angle;

determines, based on the position and tilt signals, whether one or more of the first bale or a second bale should be positioned at an uphill side of the accumulator; and moves one or more of the first bale or the second bale to the uphill side of the accumulator by controlling the at least one actuator to move the carriage relative to the base frame.

8. The control system of claim 1, wherein the at least one actuator includes a first actuator coupled to the bale separating member and a second actuator coupled to the carriage;

wherein the bale separating member is movable relative to the carriage; and wherein the controller is configured to control the first actuator to move the bale separating member relative to carriage and to control the second actuator to move the carriage laterally relative to the base frame.

9. The control system of claim 1, wherein the at least one actuator includes an actuator coupled to the carriage; and wherein the controller is configured to control the actuator to move the carriage relative to the base frame.

10. The control system of claim 9, wherein the bale separating member extends from the platform and into the bale receiving area.

11. A method for sequentially accumulating multiple bales processed by an agricultural baler on an accumulator, the method comprising:

sensing, by a controller receiving position signals from at least one sensor, a position of one or more of a carriage or a bale separating member relative to a base frame, the carriage being laterally movable relative to the base frame, the carriage having a platform and first and second upstanding side walls defining a crop package receiving area therebetween that is sized and configured to receive a bale from the baler, the bale separating member extending into the crop package receiving area;

actuating, by the controller after processing the received position signals, one or more actuators to move one or more of the bale separating member or the carriage relative to the base frame into position to accept a first bale from the baler with the bale separating member positioned outside of a first bale receiving area of the crop package carrying area; and actuating, by the controller after processing the received position signals, the one or more actuators to move one or more of the bale separating member or the carriage relative to the base frame into a position to accept a second bale from the baler in a second bale receiving area of the crop package carrying area with the bale separating member and the first bale outside of the second bale receiving area;

initiating a bale index routine which includes moving the bale separating member to move the first bale to a first side of the crop package carrying area by the controller controlling the at least one actuator to move the carriage in response to the first bale engaging the first upstanding side wall, wherein the carriage has a fixed lateral width and the crop package receiving area has a fixed lateral width during all movement of the carriage relative to the base frame.

12. The method of claim 11, further comprising:
initiating a first bale routine which includes:
  determining, by the controller, whether the bale separating member is located within the first bale receiving area; and
  when the bale separating member is determined to be within the first bale receiving area, clearing, by the controller controlling the at least one actuator, the bale separating member from the first bale receiving area by moving one or more of the bale separating member relative to the carriage or the carriage relative to the base frame.

13. The method of claim 11, wherein the bale index routine causes the bale separating member to move the first bale deposited at the crop package carrying area relative to the carriage.

14. The method of claim 13, further comprising:
initiating a second bale routine which includes:
  determining, by the controller, whether the first bale or the bale separating member is located within the crop package carrying area; and
  when the first bale or the bale separating member is determined to be within the crop package carrying area, clearing, by the controller controlling the at least one actuator, the first bale and the bale separating member from the second bale receiving area by moving the carriage relative to the base frame.

15. The method of claim 14, wherein the carriage is moved across the crop package carrying area relative to the base frame by the at least one actuator first moving the bale separating member relative to the carrier into engagement with the first bale and then by moving the bale separating member after the first bale is engaged with the first upstanding side wall.

16. The method of claim 15, further comprising:
sensing, by the at least one sensor, a state of a gate of the baler; and
initiating each of the first bale routine and the second bale routine upon the controller receiving input signals from the at least one senor indicating that the baler gate is open or opening.

17. A method for sequentially accumulating multiple bales processed by an agricultural baler on an accumulator, the method comprising:

sensing, by a controller receiving position signals from at least one sensor, a position of one or more of a carriage or at least one actuator relative to a base frame, the carriage being laterally movable relative to the base frame, the carriage having a platform and first and second upstanding side walls defining a crop package receiving area therebetween that is sized and configured to receive a bale from the baler;

actuating, by the controller after processing the received position signals, one or more actuators to move the carriage relative to the base frame into position to accept a first bale from the baler; and actuating, by the controller after processing the received position signals, the one or more actuators to move the carriage relative to the base frame into a position to accept a second bale from the baler;

initiating a bale index routine which includes moving the bale separating member to move the first bale to a first side of the crop package carrying area by the controller controlling the at least one actuator to move the carriage in response to the first bale engaging the first upstanding side wall, wherein the carriage has a fixed lateral width and the crop package receiving area has a fixed lateral width during all movement of the carriage relative to the base frame.

18. The method of claim 17, wherein a bale separating member extends from the platform and into the bale receiving area.

* * * * *

UNITED STATES PATENT AND TRADEMARK OFFICE
CERTIFICATE OF CORRECTION

| | |
|---|---|
| PATENT NO. | : 11,240,967 B2 |
| APPLICATION NO. | : 16/417995 |
| DATED | : February 8, 2022 |
| INVENTOR(S) | : Austin J. Jones et al. |

It is certified that error appears in the above-identified patent and that said Letters Patent is hereby corrected as shown below:

In the Claims

In Column 46, Claim 16, Line 17, delete "senor" and insert -- sensor --, therefor.

Signed and Sealed this
Twenty-fourth Day of May, 2022

Katherine Kelly Vidal
Director of the United States Patent and Trademark Office